United States Patent
Fan

(10) Patent No.: US 11,849,700 B2
(45) Date of Patent: Dec. 26, 2023

(54) ANIMAL WASTE HANDLING DEVICE AND METHOD

(71) Applicant: PERKY CREATIONS (SHENZHEN) TECHNOLOGY CO., LTD., Shenzhen (CN)

(72) Inventor: Chao Fan, Shenzhen (CN)

(73) Assignee: PERKY CREATIONS (SHENZHEN) TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/953,279

(22) Filed: Sep. 26, 2022

(65) Prior Publication Data
US 2023/0103710 A1    Apr. 6, 2023

Related U.S. Application Data

(63) Continuation of application No. 17/522,971, filed on Nov. 10, 2021, now Pat. No. 11,457,604, and a continuation of application No. PCT/CN2021/119461, filed on Sep. 18, 2021.

(51) Int. Cl.
*A01K 1/01* (2006.01)
(52) U.S. Cl.
CPC .......... *A01K 1/0114* (2013.01); *A01K 1/0146* (2013.01)
(58) Field of Classification Search
CPC .............................. A01K 1/011; A01K 1/0114
USPC ......................................................... 119/166
See application file for complete search history.

(56) References Cited

U.S. PATENT DOCUMENTS

| | | | |
|---|---|---|---|
| 4,061,111 A | 12/1977 | Smith | |
| 5,662,066 A | 9/1997 | Reitz | |
| 7,278,372 B2* | 10/2007 | Colsky | A01K 1/0114 |
| | | | 119/166 |
| 9,433,186 B2* | 9/2016 | Romano | A01K 1/0151 |
| 10,098,315 B2* | 10/2018 | Couto | A01K 1/0114 |
| 2002/0139312 A1 | 10/2002 | Reitz | |

(Continued)

FOREIGN PATENT DOCUMENTS

| | | |
|---|---|---|
| CN | 109287495 A | 2/2019 |
| CN | 210298952 U | 4/2020 |

(Continued)

OTHER PUBLICATIONS

First Office Action issued in corresponding CN Patent Application No. 202180006296.6, 13 pages.

(Continued)

*Primary Examiner* — Magdalena Topolski
*Assistant Examiner* — Morgan T Jordan
(74) *Attorney, Agent, or Firm* — BAYES PLLC

(57) ABSTRACT

A device is capable of filtering animal waste with an improved sifting method. The device includes a support bracket, a chamber attached to the support bracket, and a screen filter configured to locate within the chamber when the animal deposits the waste. The chamber has an opening adapted to accommodate the animal to deposit the waste inside the chamber. The chamber is rotatable between a first position and a second position. The screen filter is movable between a third position and a fourth position. The rotation of the chamber and the movement of the screen filter can be independently managed, thus achieving a better result for animal waste handling.

20 Claims, 34 Drawing Sheets

(56) References Cited

U.S. PATENT DOCUMENTS

| | | | |
|---|---|---|---|
| 2003/0051672 A1* | 3/2003 | Gordon | A01K 1/0114 119/166 |
| 2007/0056520 A1* | 3/2007 | Hamada | A01K 1/0114 119/161 |
| 2007/0089679 A1 | 4/2007 | Horanoff | |
| 2007/0144448 A1 | 6/2007 | Fairhall | |
| 2008/0017123 A1 | 1/2008 | Chin | |
| 2009/0107408 A1* | 4/2009 | Waters | A01K 1/0114 119/166 |
| 2017/0251627 A1 | 9/2017 | Sage, Jr. | |
| 2020/0037572 A1 | 2/2020 | Hernandez Barrera | |
| 2020/0060221 A1 | 2/2020 | Fan et al. | |
| 2021/0267158 A1 | 9/2021 | Ma et al. | |

FOREIGN PATENT DOCUMENTS

| | | |
|---|---|---|
| CN | 111328722 A | 6/2020 |
| CN | 212281954 U | 1/2021 |
| CN | 212436840 U | 2/2021 |
| CN | 113163730 A | 7/2021 |
| CN | 214126434 U | 9/2021 |

OTHER PUBLICATIONS

International Search Report issued in corresponding international application No. PCT/CN2021/119461, dated Sep. 18, 2021, 11 pages.

Written opinion of the International Searching Authority issued in corresponding international application No. PCT/CN2021/119461, dated Sep. 18, 2021, 5 pages.

\* cited by examiner

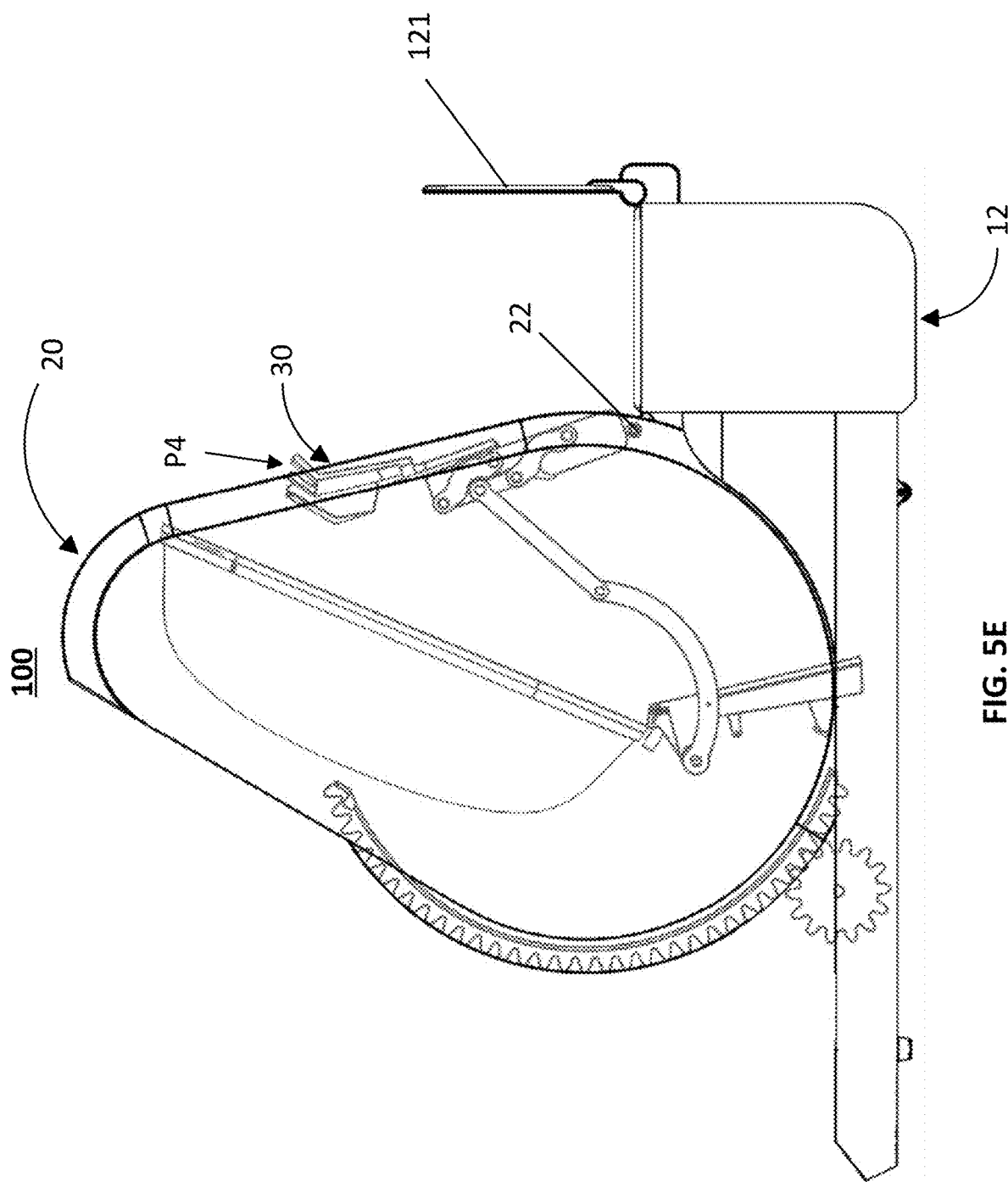

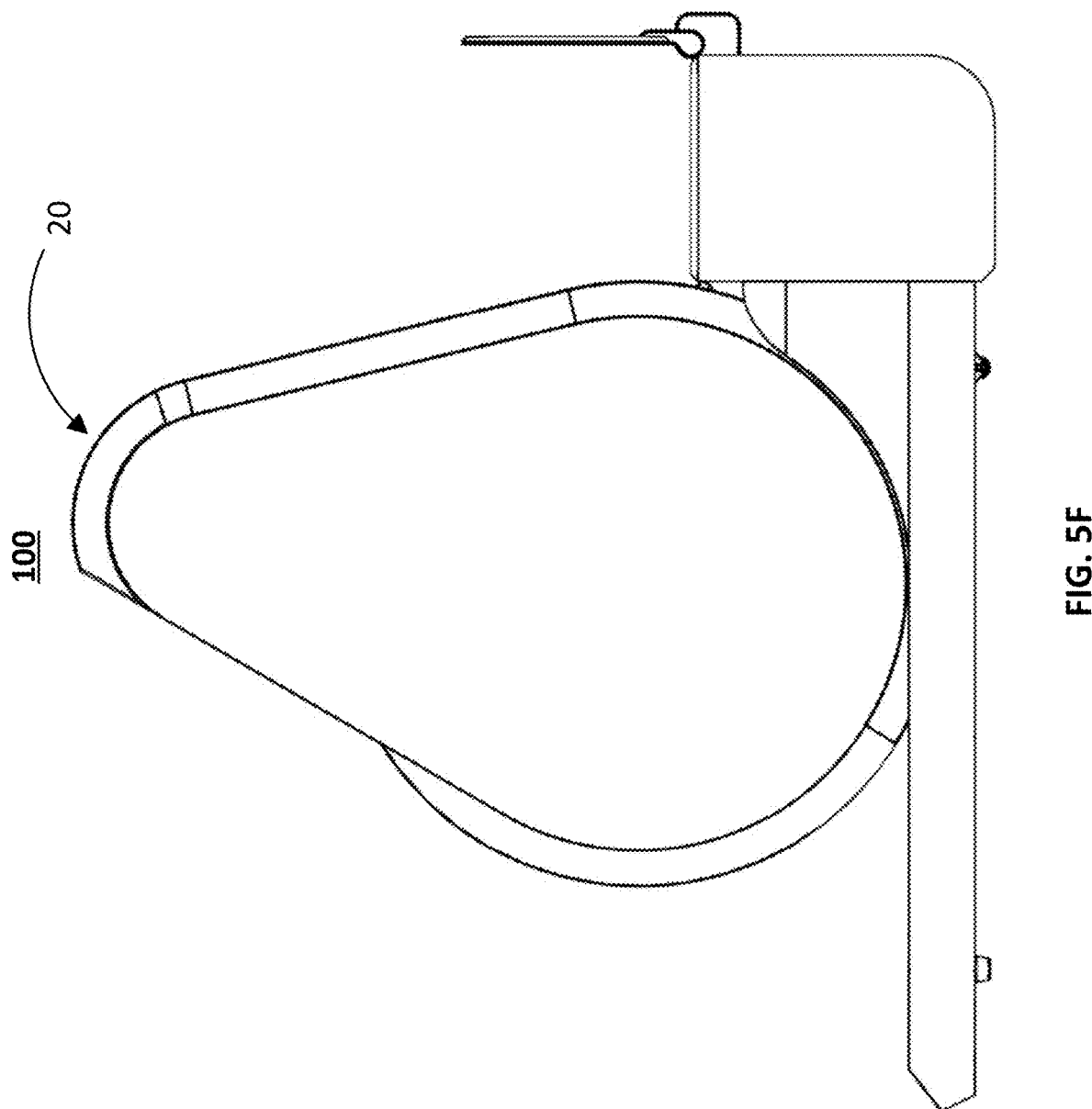

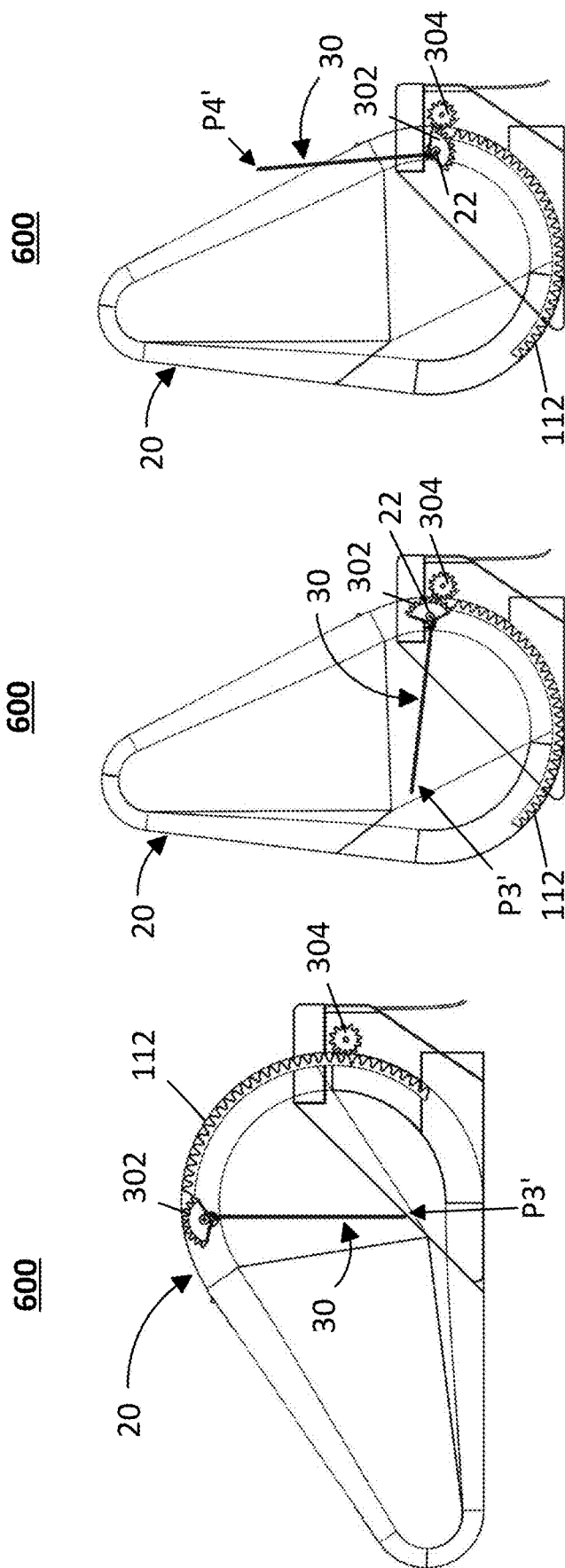

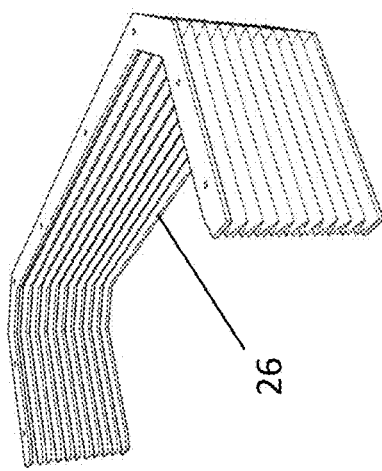
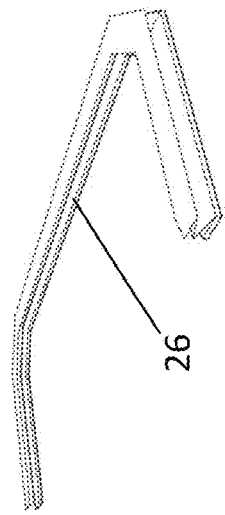
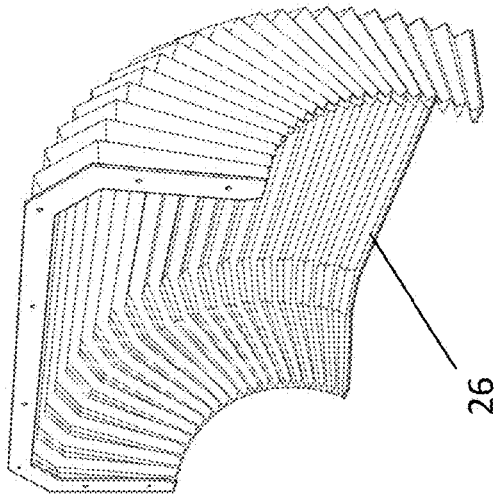

Provide a device for handling animal waste, comprising a support bracket, a chamber attached to the support bracket, and a screen filter attached to the chamber
S1800

Rotate the chamber between a first position and a second position
S1802

Move the screen filter between a third position and a fourth position
S1804

1800

ANIMAL WASTE HANDLING DEVICE AND METHOD

CROSS-REFERENCE TO RELATED APPLICATIONS

This application is a continuation of U.S. patent application Ser. No. 17/522,971, filed Nov. 10, 2021, which is a bypass continuation of PCT application No. PCT/CN2021/119461 filed Sep. 18, 2021, the contents of both of which are incorporated herein by reference in their entireties.

TECHNICAL FIELD

The present disclosure relates to a device for handling waste deposited by an animal, and more particularly, to an improved self-cleaning device that separates animal waste from litter material.

BACKGROUND

A potty device filled with litter material, such as sand, dried clay, or cat litter, can be used to let pet animals excrete waste. After the excretion, the waste sticks to or soils the litter material to form soiled animal waste so that the potty device can be easily cleaned up. However, the used litter material must be cleaned before the animal waste piled up to a certain extent. In an effort to relieve pet owners from performing a highly unpleasant recurring task of cleaning the animal waste, such as animal excrement or coagulated litter, from the unsoiled litter material, various types of self-cleaning potty device are designed to separate animal waste automatically from the litter material for the ease of disposal. One method is to use a motor to drive a separation device, such as rake, porous scoop, sifting screen, filtration grid, or sifting drawer, through the litter material and thus separate the animal waste from the litter material. Another method is to lift the litter material and let the litter material fall through a filter structure, where the litter material passes the filter structure and the waste are left on the filter structure, thus the animal waste is separated from the litter material. The separated animal waste is then pushed to a waste collector, such as storage bag or waste compartment placed outside the chamber, for cleaning.

Some conventional self-cleaning potty devices are usually structured with a sphere-shaped chamber partially filled with litter material. One exemplary self-cleaning potty device includes a filter mechanism inside the chamber. After an animal excretes waste onto the litter material, the self-cleaning potty device operates to separate the waste from the litter material. During the operation, the sphere-shaped chamber rotates to sift the litter material so that the unsoiled litter material can roll down along the inner surface of the chamber and fall through the filter mechanism. At the same time, the animal waste agglomerates with the litter material to form soiled particles much bigger than those of the litter material, and therefore is left on the filter mechanism and separated therefrom by the self-cleaning potty device. After separation of the waste, the self-cleaning potty device keeps rotating the chamber and the waste falls from the filter mechanism to a waste collector at the bottom of the chamber.

However, these conventional self-cleaning potty devices may pose danger to the animals using the devices, because the opening that allows the animals to enter or exit the chamber thereof or the opening through which the waste is dumped is closed during the rotation of the chamber, thus possibly squeezing or clamping the animals and causing injury thereto. They also have a limited space for the animals to use because the sphere-shaped chamber forms a dome, thus limiting the height of the space on the peripheral of the dome. The limited space makes animals feel uncomfortable and hard to turn their body around when inside, and may accidentally cause the waste to attach to their coats. The closed space in the chamber is dark and unfriendly for vision-impaired animals. It also lacks enough ventilation and may cause bacteria to grow inside. Conventionally, to mitigate these negative effects, the chamber and eventually the self-cleaning potty device including the chamber are usually oversized and thus take up a large living space. Besides, the bottom of the conventional self-cleaning potty device is arc-shaped, so the litter material near the edge of the bottom tends to spread very thin. When an animal excretes near the edge, the waste is hard to be covered and may stick to the sidewall or bottom of the chamber. The unevenness of the litter material becomes worse after the rotation of the chamber.

Moreover, the waste collector is positioned below the bottom of the chamber, therefore increasing the height of the entrance and the difficulty for animals to get into the chamber. In addition, due to its lower height, the waste collector beneath the chamber would cause uneven stacking of the disposed waste at a few locations, rather than being spread out across the bottom of the waste collector, therefore reducing the usage efficiency thereof to less than 50% of the volume of the waste collector. Due to their complexity, the conventional self-cleaning potty devices are also hard for pet owners to clean and maintain.

Embodiments of the present disclosure address the above problems by providing a litter collection device for separating animal waste using an improved sifting method for filtering the animal waste without posing any danger to the animals.

SUMMARY

Embodiments of the present disclosure provide a device for handling waste deposited by an animal. The device includes a support bracket, a chamber attached to the support bracket, and a screen filter configured to locate within the chamber when the animal deposits the waste. The chamber has an opening adapted to accommodate the animal to deposit the waste inside the chamber. The chamber is rotatable between a first position and a second position. The screen filter is movable between a third position and a fourth position.

Embodiments of the present disclosure also provide a method for handling animal waste with a device. The device includes a support bracket, a chamber attached to the support bracket, and a screen filter attached to the chamber. The method includes rotating the chamber between a first position and a second position, and moving the screen filter between a third position and a fourth position.

It is to be understood that both the foregoing general description and the following detailed description are exemplary and explanatory only and are not restrictive of the invention, as claimed.

BRIEF DESCRIPTION OF THE DRAWINGS

FIGS. 5A-5F respectively illustrate various perspective views and a side view of the animal waste handling device, according to certain embodiments of the present disclosure.

FIGS. 6A-6C respectively illustrate various views of another animal waste handling device, according to certain embodiments of the present disclosure.

FIGS. 12A-12E illustrate various views of a foldable protector of the animal waste handling device, according to certain embodiments of the present disclosure.

DETAILED DESCRIPTION

Figure 1A:
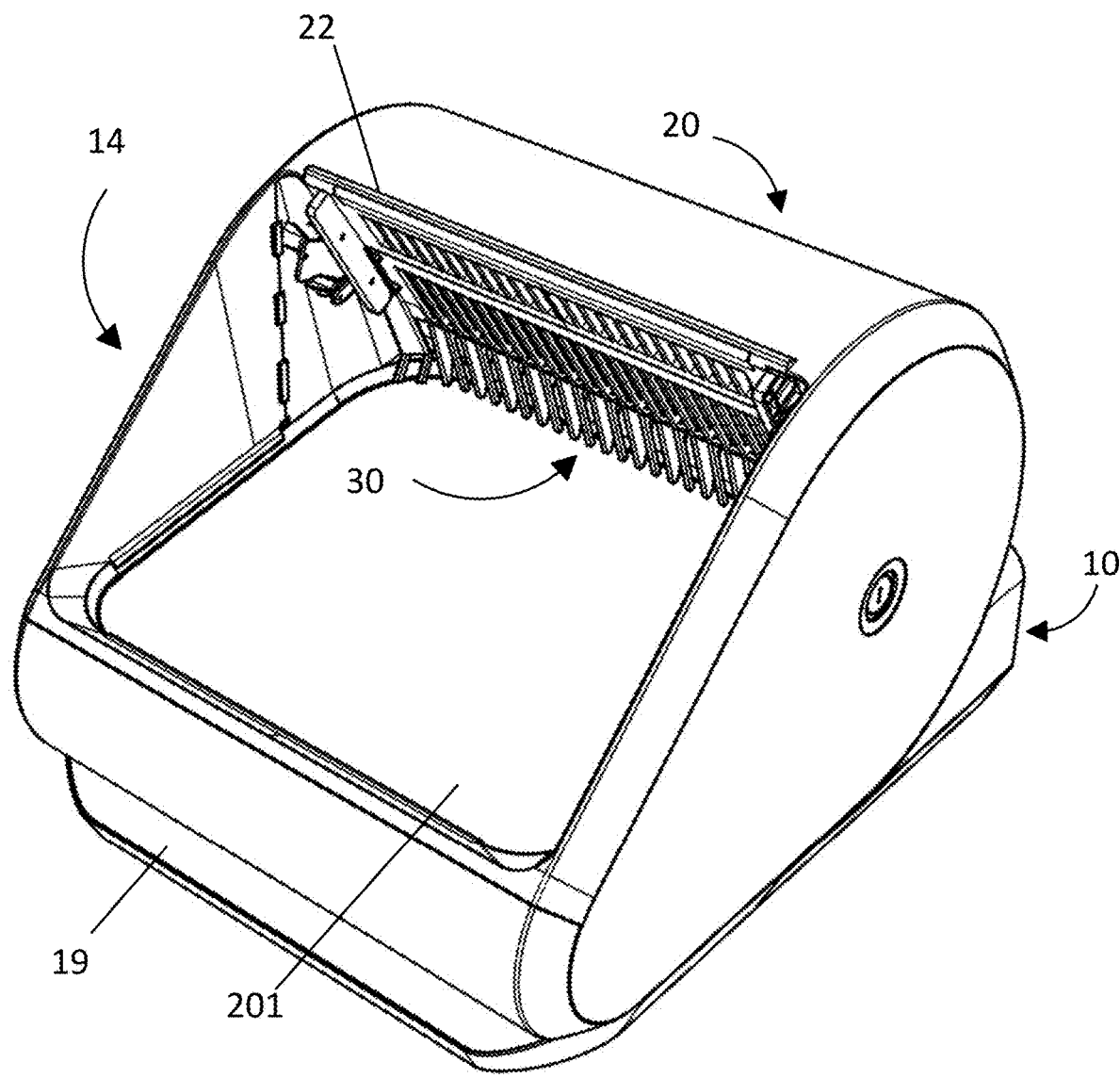
FIGS. 1A-1D respectively illustrate a perspective view, a side view, a front view and a back view of an animal waste handling device, according to certain embodiments of the present disclosure.

Reference will now be made in detail to the exemplary embodiments, examples of which are illustrated in the accompanying drawings. Wherever possible, the same reference numbers will be used throughout the drawings to refer to the same or like parts.

The following terms are used herein in the specification and appended claims. The term "litter material" as used herein is any granular or particulate material that serves as a waste holding media into which the animal may deposit bodily wastes, such as sand, dried clay, or cat litter. The term "unsoiled litter material" as used herein refers to the litter material that is substantially uncontaminated. The term "animal waste" as used herein means both animal excrement, clumps of litter, and soiled litter material which is the litter material after contacting with animal excrement or urine.

When introducing elements of the present disclosure or the preferred embodiments thereof, the articles "a," "an" and "the" are not intended to denote a limitation of quantity, but rather to denote the presence of at least one of the items being referred to, unless otherwise indicated or clearly contradicted by context. Further, the terms "comprises," "comprising," "including" and "having" are intended to be inclusive and mean that there may be additional elements other than the listed elements.

Terms such as "upper," "lower," "inner," "outer," "front," "rear," and variations thereof herein are used for ease of description to explain the positioning of one element relative to a second element, and are not intended to be limiting to a specific orientation or position.

Terms such as "first," "second," and variations thereof herein are used to describe various elements, regions, sections, etc. and are not intended to be limiting.

Terms such as "connected," "in communication with," "mounted," and variations thereof herein are used broadly and encompass direct and indirect connections, communication and mountings; and are not restricted to electrical, physical or mechanical attachments, connections, or mountings.

Embodiments of the present disclosure provide an improved device for handling waste deposited by an animal. The device may have a support bracket and a chamber. The chamber may be attached to the support bracket. The chamber may have an opening to accommodate the animal to deposit the waste therein. The chamber may also connect to a screen filter inside the chamber to deposit the waste. Furthermore, other desirable features and characteristics will become apparent from the subsequent detailed description and the appended claims, taken in conjunction with the accompanying drawings and this background of the present disclosure.

The animal waste handling devices described herein (such as an animal waste handling device 100 shown in FIGS. 1A-1D and 2) can be used for separating litter material (such as litter material 50 shown in FIG. 7A) of substantially smaller size from animal waste (such as waste 51 shown in FIG. 7A) of substantially larger size, and disposing the animal waste. In some embodiments, the particle size of the litter material, when unsoiled, may be between 0.1 $mm^3$ and 50 $mm^3$ (such as 0.1 $mm^3$, 0.2 $mm^3$, 0.5 $mm^3$, 1 $mm^3$, 2 $mm^3$, 5 $mm^3$, 10 $mm^3$, 15 $mm^3$, 20 $mm^3$, 25 $mm^3$, 30 $mm^3$, 35 $mm^3$, 40 $mm^3$, 45 $mm^3$, and 50 $mm^3$, any range bounded by the lower end by any of these values, or in any range defined by any two of these values). The particle size of the animal waste may be between 1 $cm^3$ and 1,000 $cm^3$ (such as 1 $cm^3$, 2 $cm^3$, 3 $cm^3$, 5 $cm^3$, 10 $cm^3$, 15 $cm^3$, 20 $cm^3$, 25 $cm^3$, 30 $cm^3$, 35 $cm^3$, 40 $cm^3$, 45 $cm^3$, 50 $cm^3$, 100 $cm^3$, 150 $cm^3$, 200 $cm^3$, 300 $cm^3$, 500 $cm^3$, and 1,000 $cm^3$, any range bounded by the lower end by any of these values, or in any range defined by any two of these values). It is contemplated that so long as the particle size of the litter material is substantially smaller than that of the animal waste, it can be separated from the animal waste by the animal waste handling devices. The particle size of the litter material and that of the animal waste are not limited to the sizes disclosed above, and they can be of any other size as long as the objective of the present disclosure is achieved. The animal waste handling devices according to the present disclosure may be used by any domesticated animals, such as cats, dogs, ferrets, squirrels, rabbits, or guinea pigs, or other pet animals.

Figure 1B:
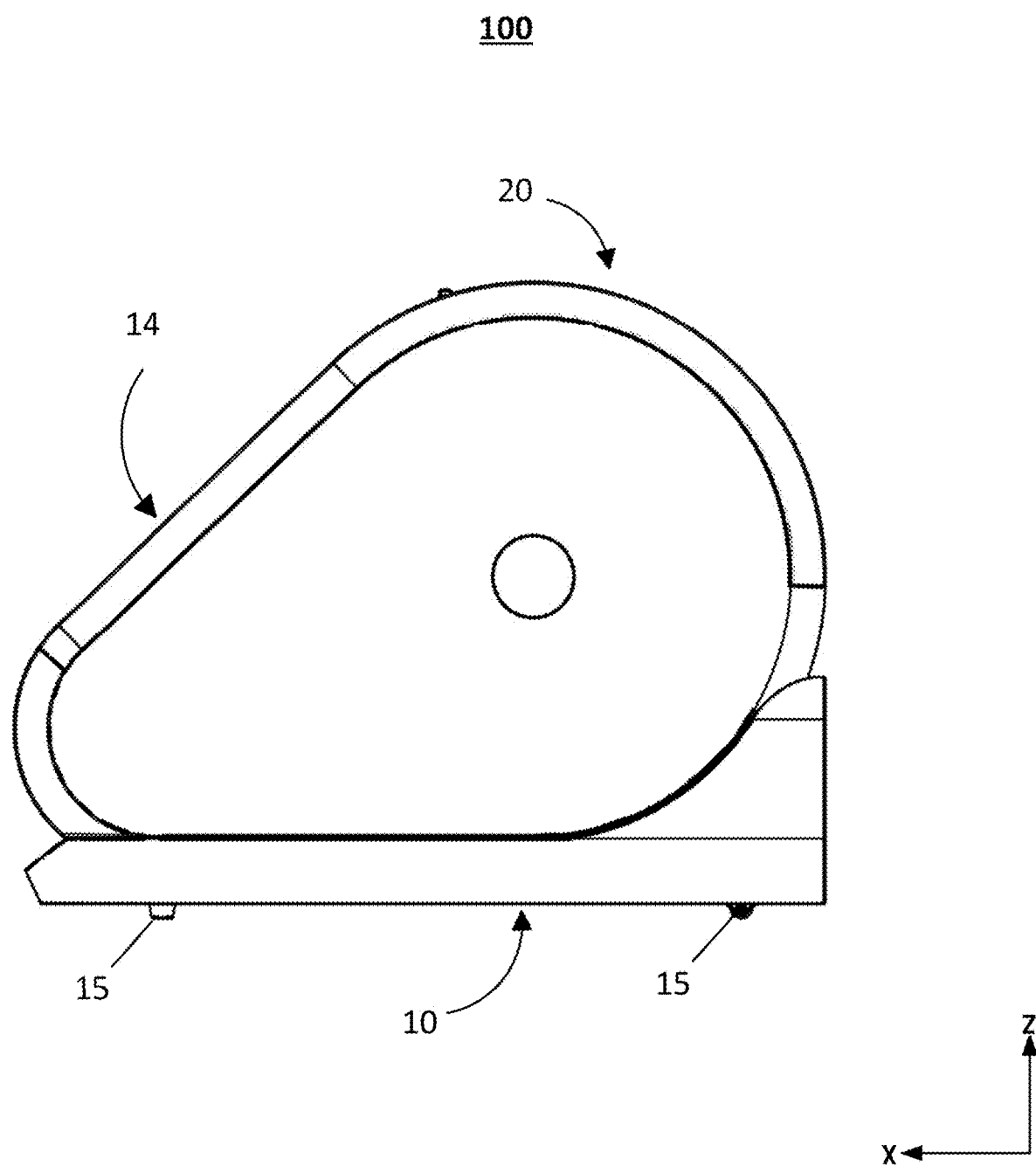
Figure 1C:
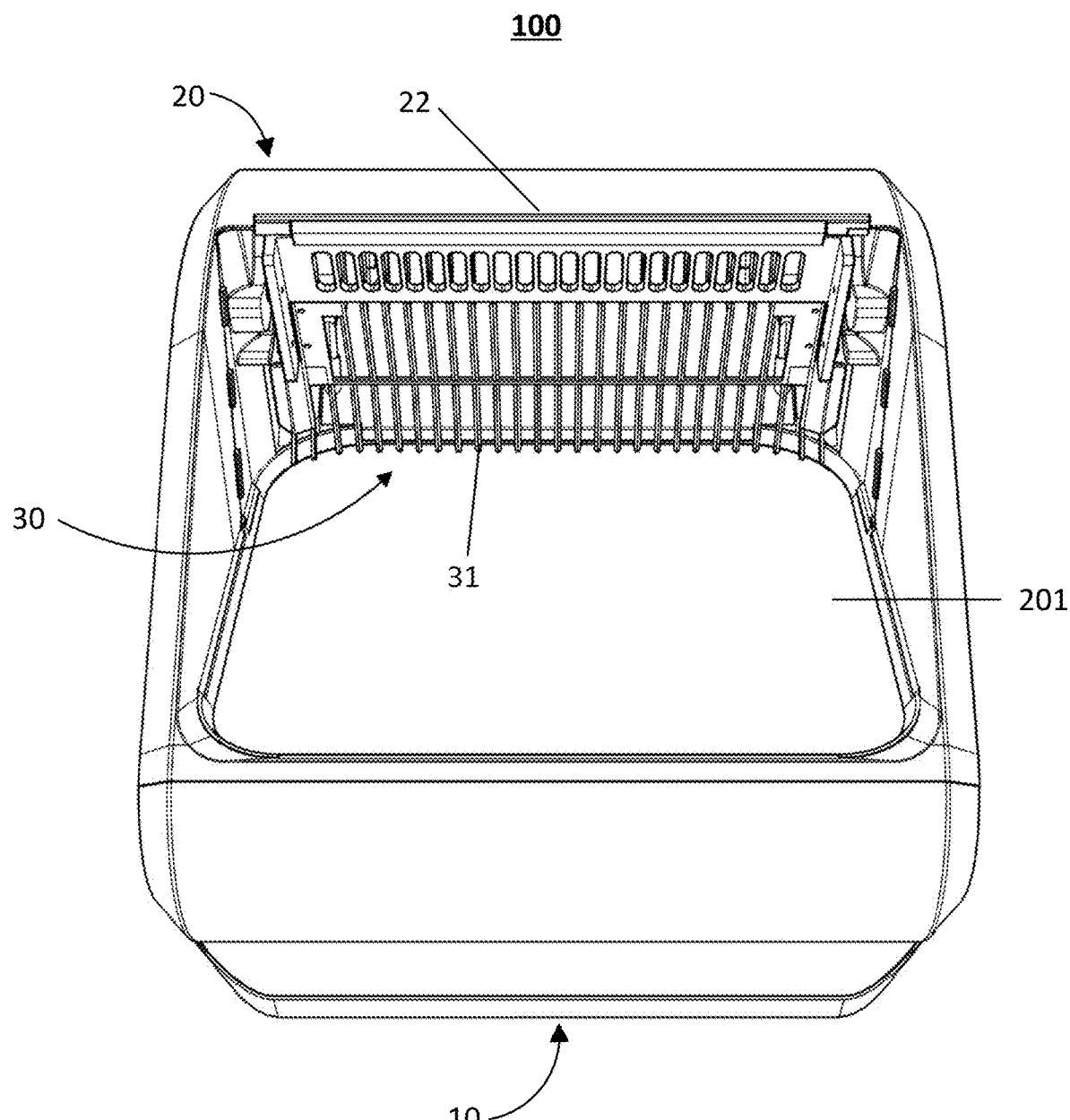
Figure 1D:
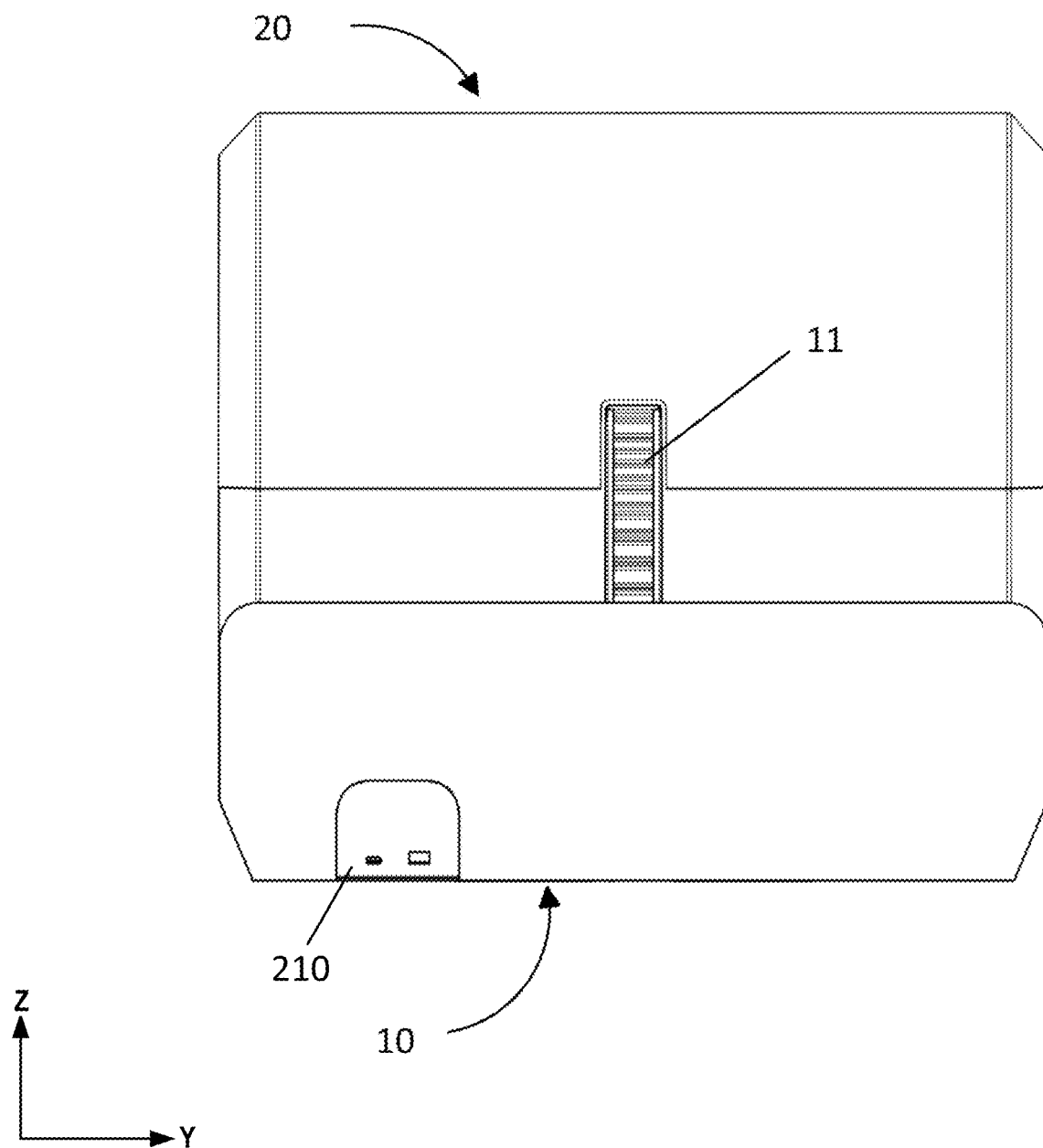
Figure 2:
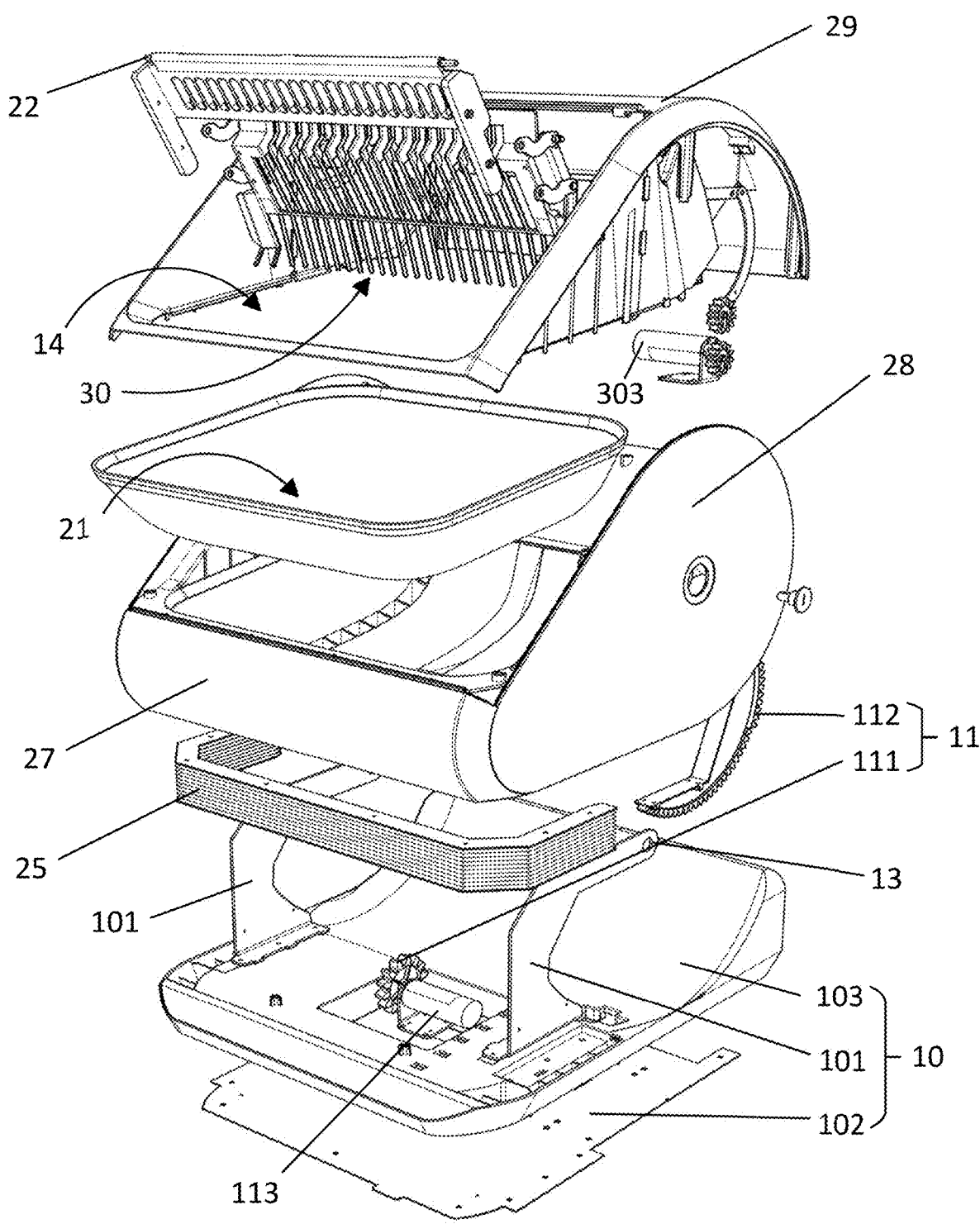
FIG. 2 illustrates an exploded perspective view of the animal waste handling device, according to certain embodiments of the present disclosure.

FIGS. 1A-1D respectively illustrate a perspective view, a side view, a front view and a back view of the animal waste handling device 100, according to certain embodiments of the present disclosure. FIG. 2 illustrates an exploded perspective view of the same. In some embodiments, the animal waste handling device 100 may include a support bracket 10, a chamber 20, and a screen filter 30. The chamber 20 may be attached to and supported by the support bracket 10 and have an opening 14 adapted to accommodate an animal to deposit waste inside the chamber 20. In some embodiments, the animal waste handling device 100 does not have a top cover on top of the chamber 20, which leaves the opening without a height limit for the animal. This structure permits enough light for the animal to use the device and better accommodates vision-impaired animals. Moreover, since the device 100 does not have a top cover, the height of the whole device 100 is substantially lower than those conventional devices that need one, thus saving a lot of living space for the owner. The animal waste handling device 100 may be sized to fit a domesticated animal within the chamber 20 to deposit the animal waste. For example, the chamber of the animal waste handling device 100 may have a substantially cuboid shape in its center region, such as that shown in FIGS. 1A and 1C, thus allowing an animal to enter and move around therein with a larger space while leaving considerable latitude for the maker to design the outside shape of the chamber and the device 100, which is a shape impossible to be achieved in conventional self-cleaning potty devices due to its different cleaning mechanism.

In some embodiments, the support bracket 10 is positioned at the bottom of the animal waste handling device 100 when being placed on a flat surface, such as a table or a floor in a living room, or a slightly inclined plane. The support bracket 10 may support the chamber 20 above the floor. For example, as shown in FIGS. 1B and 1D, the upper surface of the support bracket 10 may be adjacent to the lower side of the chamber 20 and extend through the entire horizontal length (along the x-direction shown in FIG. 1B) and width (along the y-direction shown in FIG. 1D) of the chamber 20. In some embodiments, as shown in FIG. 2, the support bracket 10 may include a pair of support arms 101, a bottom plate 102, and a base 103. The pair of the support arms 101 may be provided on each of the left and right sides of the device 100. The support arms 101 may be rested on the base 103, and also connected with the base 103 and the bottom plate 102 through a fastening mechanism, such as bolted joints, welding, adhesive bonding, or integrated formation. The bottom plate 102 may be adapted to place the animal waste handling device 100 on a flat surface. In some other embodiments (not shown in FIG. 2), the device 100 may be placed on a non-flat or curvy surface when the bottom plate 102 is made of a soft or elastic material. It is noted that the bottom plate 102 and the base 103 are optional in some other embodiments of the present disclosure (such as those described in conjunction with FIGS. 7A-7D and 8A-8D) where the support arms 101 can be directly rested on the floor. In such embodiments, the device 100 may be placed either on a flat surface or a slightly inclined plane, since the dispensed bottom plate 102 and base 103 leave a hollow bottom in the device 100. It is also understood that in some embodiments the support arm 101 can be an integrated structure instead of a pair of structures positioned on two sides of the device 100, thus reducing complexity of the support bracket 10.

Referring back to FIG. 2, each of the support arms 101 may have a rotation point 13 provided on the upper end thereof. The pair of rotation points 13 may be configured to fixate the position of the chamber 20 in the device 100 by, for example, a screw-and-bolt fastener, while also allowing the chamber 20 to rotate around an axis passing through the pair of rotation points 13. The rotation points 13 also provide at least partial support to the chamber 20 in order to stabilize its operation position. As a result, the chamber 20 is elevated while being rotated, and thus does not touch the floor. As shown in FIG. 1B, the support bracket 10 may be shaped like a slope curved towards the back of the device 100, and the top end of the curved slope on the back of the device 100 is the highest point of the support bracket 10. The curvature of the slope of the support bracket 10 may match that of the external bottom surface of the chamber 20, so that the support bracket 10 will not obstruct the rotation of the chamber 20. As shown in FIG. 2, the support bracket 10 having the support arms 101 may function as a stand that holds the chamber 20 in its position while being rotated. In some embodiments, the support bracket 10 may also include one or more feet 15 (shown in FIG. 1B) beneath the bottom thereof. The feet 15 may be made of rubber and provide sufficient friction to prevent lateral displacement of the device 100 when the chamber 20 is rotating or the device 100 is accidentally pushed. In some embodiments, at least one of the feet 15 may be a wheel, so that the animal waste handling device 100 can roll on the surface where it stands and avoid the necessity of being picked up, thus making it easy for a user to rearrange the position of the device 100, especially with heavy litter material in the chamber 20.

In some embodiments, the support bracket 10 also includes an animal sensor 19 adapted to detect entry into or exit from the chamber 20 by the animal. The animal sensor 19 may be located near the opening of the chamber 20 (as shown in FIG. 1A). In some embodiments, the sensor 19 is an infrared sensor or the like that detects change of light that indicates the animal's entry or exit of the chamber 20. In other embodiments (not shown), the sensor may be located inside the chamber 20 to carry out the detection of entry or exit by the animal. For example, the sensor can be a millimeter-wave radar positioned near or on a partition wall 23 (shown in FIG. 5A) or a pair of infrared sensors provided on the left and right inner sides of the chamber 20. The abovementioned sensors may be collectively referred to as "light wave sensors." Upon detection of entry, the device 100 may be activated after a predetermined time, such as 1, 2, 3, 4, 5 seconds, any range bounded by the upper end by any of these values, or in any range defined by any two of these values. The activated device 100 may monitor the presence of the animal inside the chamber 20, and prevent any movement of the chamber 20 or the screen filter 30 until no animal is inside. The activated device 100 may also sense the animal exits the chamber 20. After sensing an entry signal and an exit signal in sequence, the sensor 19 may activate, through a microprocessor or other components of the device 100, the rotation of the chamber 20 and the movement of the screen filter 30. Thus, the animal will not be trapped inside the chamber 20 or get hurt by the rotation or the movement. Upon completion of the animal waste disposition, the device 100 may hibernate after another predetermined time, such as 5, 10, 20, 30, 60, 120, 180 seconds, any range bounded by the lower end by any of these values, or in any range defined by any two of these values. Alternatively, the hibernation period may also be set by a user of the device 100 to a value not limited to the ones described above.

In other embodiments, the animal sensor 19 may include one or more weight sensors (not shown) provided below the chamber 20. The weight sensors may be used to detect any change of weight of the entire chamber 20, either caused by an entry or an exit of the animal or a weight change of the litter material and/or the animal waste. The weight sensors may include force collector sensors, piezoresistive strain sensors, capacitive sensors, electromagnetic sensors, optical sensors, force balancing sensors, or a combination of two or more thereof. In yet other embodiments, the animal sensor 19 may include one or more accelerometers and/or one or more gyroscopes, so that the device 100 may determine whether there is any movement or dislocation of the chamber 20 caused by the entry or exit of the animal. The light wave sensors, the weight sensors, the accelerometers, and the gyroscopes described above are not mutually exclusive, and some or all of them may be collectively employed in some embodiments consistent with the present disclosure. Signals from one or more animal sensors 19 may be supplied to the microprocessor to analyze and determine whether an animal has entered or exited, or is present within the chamber 20.

Referring to FIGS. 1D and 2, the animal waste handling device 100 may include a first driver 11. The first driver 11 may be turned on to drive the chamber 20 to rotate around the axis passing through the pair of rotation points 13, as described above. The first driver 11 may include one of a gearbox, a drive chain, a lever, a push rod, or a pull rod, or any other driving mechanism without departing from the spirit of this disclosure. FIG. 2 shows one example of the first driver 11 that includes a gearbox having a driving gear 111 and a driven gear 112. The driving gear 111 may be fixed to the bottom plate 102 of the support bracket 10 and connected to a motor 113. The motor 113 may be electrically powered. In other embodiments, the driving gear 111 and the motor 113 may be attached directly to one or both of the support arms 102. The driven gear 112 may be fixed to the bottom and/or back of the chamber 20. Therefore, when the driving gear 111 starts rotating, it drives the driven gear 112 to move the chamber 20 along the circumference of the driven gear 112, which may be circular, oval, or any other shape suitable for the purpose of the present disclosure. In some embodiments, at least one of the chamber 20 and the screen filter 30 may be driven manually by the user. For example, the rotation of the chamber 20 may be controlled by a roller (not shown), and the movement of the screen filter 30 may be controlled by a knob (not shown).

According to the present disclosure, the chamber 20 may have a front guard 27, a pair of side walls 28, and a back wall 29, as shown in FIG. 2, which jointly form the outer casing of the chamber 20. The pair of side walls 28 may be parallel to each other. When assembled, the front guard 27 and the back wall 29 may be perpendicularly connected to both of the side walls 28. The front guard 27 may shield internal components of the device 100 from being damaged by the animals. The back wall 29 may be a curvy wall having an arc shape, extending through and covering the back of the chamber 20 and at least a portion of the top of the chamber 20. The back wall 29 may have an opening 14 to allow the animal to enter or exit the chamber 20. In some embodiments, the front guard 27 may include a screen bar facing the front. In other embodiments, the screen bar and the sensor 19 may be combined at one location, such as at the front side of the base 103. The screen bar may include an LED screen that illustrates status information of the device 100, such as mode (in activation or hibernation), battery power, rotation speed, maximum rotation angle, wireless connectivity, etc. The screen bar may also include an LCD screen, an OLED screen, or any other screen component suitable for the purpose of the present disclosure. The device 100 may further include a foldable protector 25 positioned between the chamber 20 and the support bracket 10, which will be discussed in more detail in conjunction with FIGS. 12A-12E and 13A-13E.

Figure 5A:
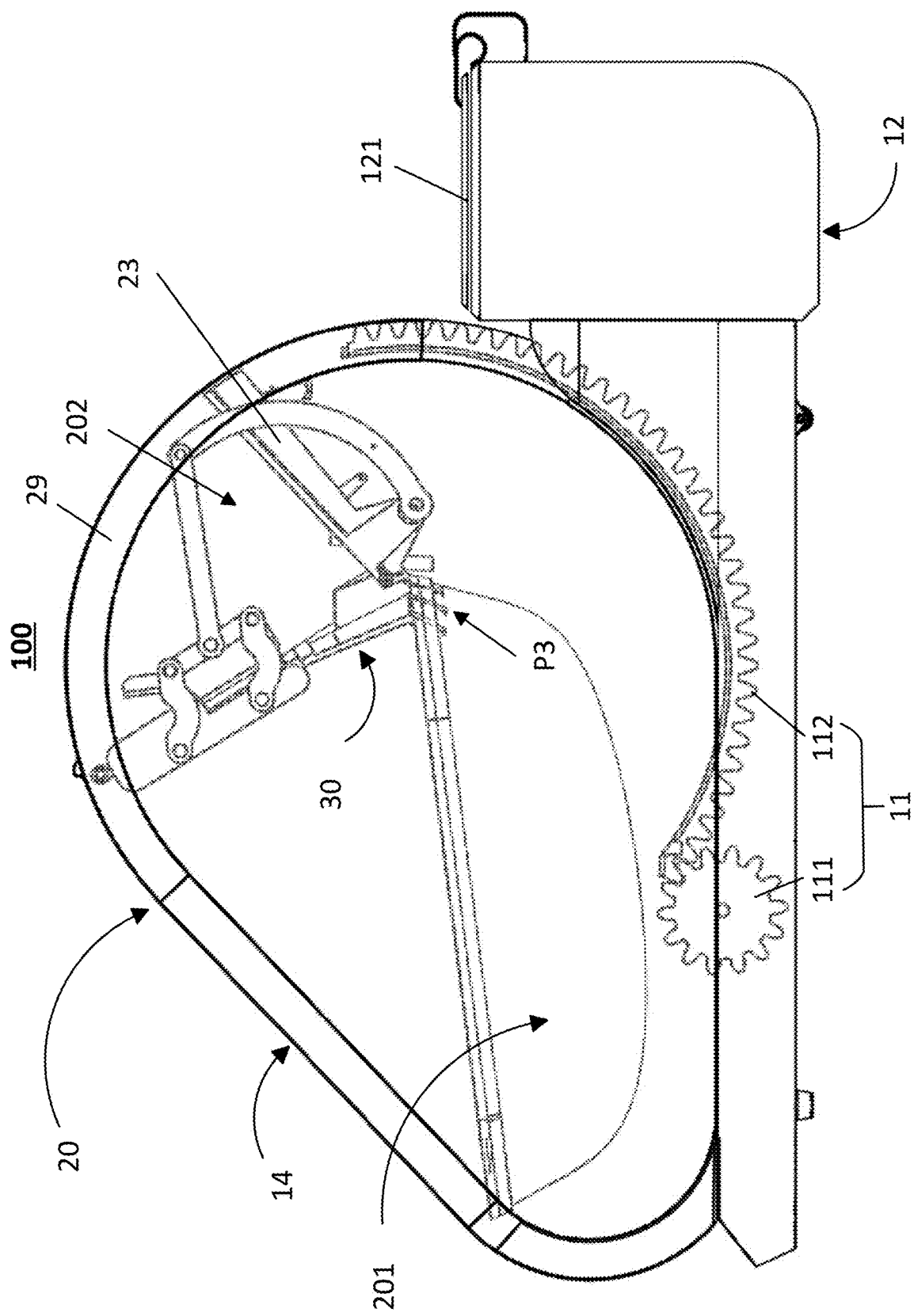
Figure 5B:
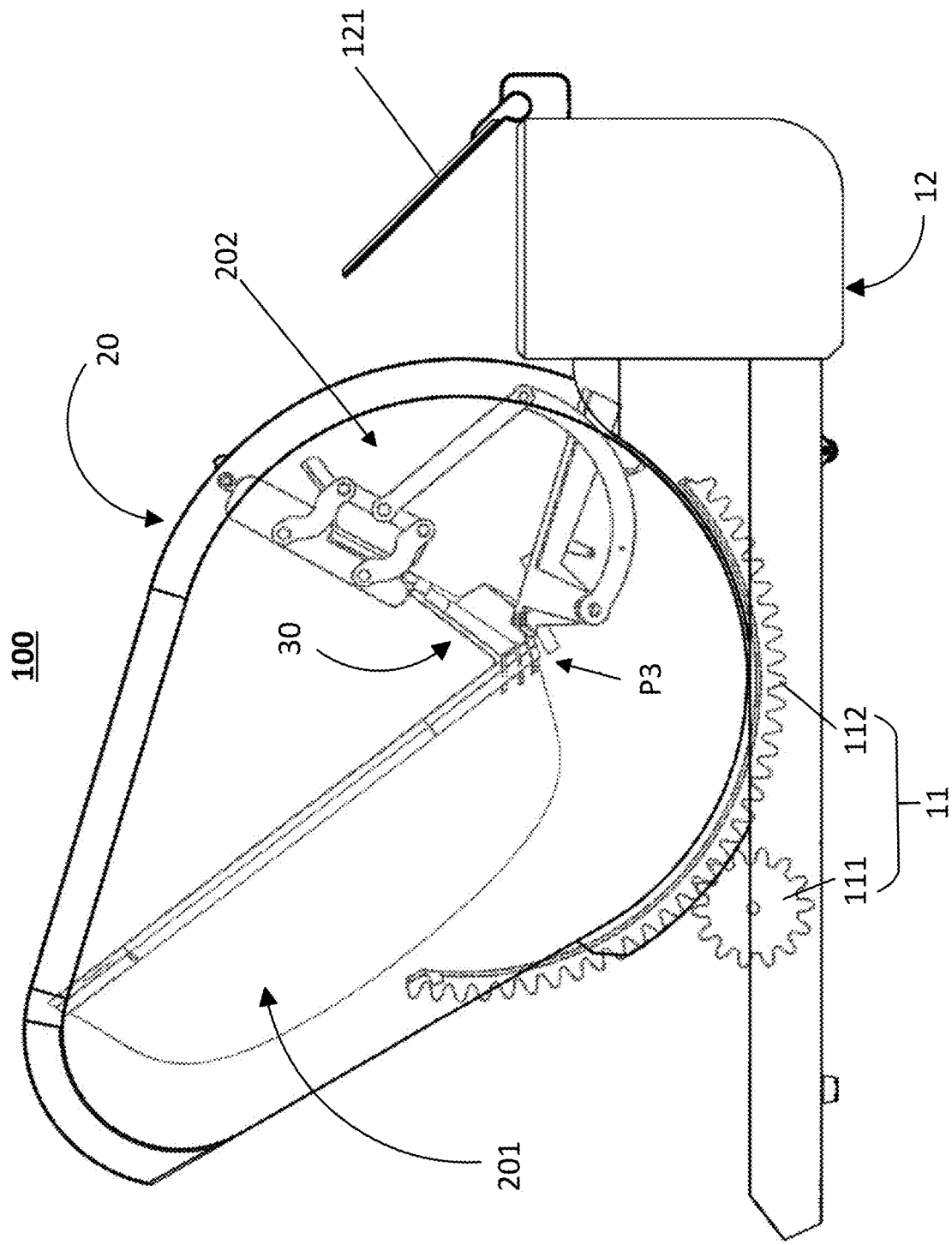

According to the present disclosure, the chamber 20 may have two inner spaces that hold litter material and animal waste when the device 100 operates at different positions, which are referred to herein as an opening container 201 and a storage container 202 (both shown in FIGS. 5A and 5B). These two containers 201 and 202 may be joined at least by one edge close to the rotation points 13 so that the litter material and the animal waste may be transferred between these two containers 201 and 202 when the chamber 20 is rotated (the details of which will be hereinafter discussed in conjunction with FIGS. 7A-7D). As shown in FIGS. 1A and 1C, the chamber 20 provides an opening 14 for an animal to come in and deposit animal waste into the opening container 201. The chamber 20 may be partially filled with litter material at the opening container 201 at the standby position, which refers to a position prior to any movement of the chamber 20, such as that shown in FIG. 1B. In some embodiments, the chamber 20 is rotatable around the axis passing through rotation points 13 and the litter material in the chamber 20 will roll and fall under gravity, thus achieving the goal of transferring the litter material between two containers 201 and 202.

The shape of the opening 14 of the chamber 20 may be square, rectangular, circular, oval, or any other similar shape suitable for the determined purpose. The outer contour of the chamber 20 may be circular, triangular, rectangular, pentagonal, hexagonal, elliptic cylinder, a combination of two or more such shapes, or any other similar shape suitable for the determined purpose. In some embodiments, the inner bottom of the chamber 20 has a flat surface, so that the thickness of the litter material can be evenly spread out over the bottom of the chamber 20. In other embodiments, the bottom of chamber 20 is slightly curved to accommodate additional components, such as a removable nonstick vessel 21 shown in FIG. 2. Whether the bottom is flat or slightly curved, the chamber 20 according to the present disclosure is superior to its sphere-shaped equivalent of the conventional animal waste handling devices in that the animal is less likely to stumble and the litter material is more evenly spread out inside the chamber.

According to the present disclosure, the bottom interior surface of the chamber 20 may include a removable nonstick vessel 21 and the litter material may be disposed on the nonstick vessel 21. Sometimes animal waste cannot totally be wrapped by or agglomerates with the litter material, or it falls too fast to the bottom by permeating through the litter material. This difficulty is especially eminent for animal urine. When this happens, the litter material will clump around the urine after the urine drips to the bottom of the chamber 20, thus becoming a sticky chunk of waste left on the bottom of the chamber 20 that cannot be automatically disposed outside the device 100. The nonstick vessel 21, which is positioned at the bottom of the chamber 20 and separates the chamber from the sticky waste, eliminates or significantly reduces the adhesiveness between the chamber 20 and the sticky chunk of waste, making it hard to stick thereon. Thus, when the chamber 20 rotates, perhaps other than a portion of the unsoiled litter material, the litter material soiled with the animal waste will roll off the bottom of the chamber 20 automatically, thus leaving the chamber 20 clear of animal waste. This reduces the need to clean the bottom of the chamber 20 too frequently. The nonstick vessel 21 can be made of plastic, paper, cloth, or any other material that has a lower adhesiveness with the waste than the inner surface of the chamber 20. The surface of the nonstick vessel 21 may be coated with a nonstick material to further reduce the adhesiveness between the waste and the nonstick vessel 21.

In some embodiments, the nonstick vessel 21 is removably attached to the inner surface of the chamber 20, such as being attached by only a few attachment points, attached only to the rim of the chamber 20, or limited by one or more bumps on the inner side of the chamber 20. This makes changing of litter material and cleaning of the chamber 20 much easier. In some embodiments, the nonstick vessel 21 is attached to the opening container 201, rather than the storage container 202, since the storage container 202 is unlikely to get in contact with animal waste when the chamber 20 is at the standby position. In some embodiments (shown in FIG. 11A), the nonstick vessel 21 may deform upon meeting certain conditions (e.g., when its gravity center crosses a certain line, such as a line vertically passing the center of rotation, as the chamber moves). The deformed nonstick vessel 21 may lift the remaining litter material away from the bottom of the chamber 20 and dump it into storage container 202, allowing the screen filter 30 to clean up the surface of the nonstick vessel 21 (the detail of which will be further discussed in conjunctions with FIGS. 11A-11C). In other embodiments, when the nonstick vessel 21 is made of a flexible or elastic material, the two sides of the nonstick vessel 21 can both be used, thus making it replaceable by simply turning it upside down and re-attaching to the inner surface of the chamber 20. This increases the usability of the nonstick vessel 21 and reduces the frequency of cleaning it up.

As shown in FIGS. 1A and 1C, the screen filter 30 is located within the chamber 20 prior to its movement, such as when the animal enters the chamber 20 to deposit the waste. The screen filter 30 is used to separate the animal waste from the litter material and is designed to transfer the animal waste outside the chamber 20. The screen filter may be made of plastic, metal or any other material suitable for the disclosed purpose. It may rotatably connect with the chamber 20 via a rotation axis 22. This configuration allows the screen filter 30 to rotate between different positions independently from the rotation of the chamber 20. The lower end of the screen filter 30, which is the end away from the rotation axis 22, may be in touch with or within a close distance from the bottom of the chamber 20. The screen filter 30 may include one or more filter elements 31, so that when the litter material falls through the openings between the filter elements 31, the animal waste will be filtered onto the screen filter 30 and subsequently transferred outside the chamber 20. In some embodiments, the screen filter 30 can be substituted with filters of different sizes of the openings. The substitution may be done by replacing the screen filter 30 entirely or only the filter elements 31. Therefore, the device 100 can handle animal waste of different sizes.

According to the present disclosure, a microprocessor (not shown) may be provided to control various electronic parts onboard the animal waste handling device 100 (e.g., motors, screens, LEDs, sensors, etc.). The microprocessor may be disposed inside the support bracket 10, such as being fixed to the inner sidewalls of any of the support arms 101. It may also be placed within the chamber 20. In some embodiments, the microprocessor is capable of processing the data detected by the sensors. Computer instructions may be automatically generated upon detection of animal movement by sensors or converted from user inputs. Such computer instructions may actuate or terminate the rotation of the chamber 20 or movement of the screen filter 30 in instances such as detection of an animal entering or exiting the chamber 20. In some embodiments, the computer instructions may determine the angle of rotation and the corresponding orientation of the rotation of the chamber 20 or the movement of the screen filter 30. The computer instructions may also determine the opening and sealing of a receptacle (such as the receptacle 12 shown in FIGS. 5A-5F) attached to the device 10.

In order to actuate any drivers, sensors, LEDs, microprocessors, and other electronic parts, electrical power may be supplied to the animal waste handling device 100. The electrical power can be supplied from a power source, such as a battery, a power bank, a power outlet, or alternatively through a voltage regulator. The power source can charge the device 100 by electrically coupling thereto (such as through an outlet 210 shown in FIG. 1D) from outside of or within the device 100. Interconnecting wiring and cables, power supply housing and other electronic parts may be used in the device 100. For convenience and simplicity, the electrical power and the respective electronic parts have not been shown in their entirety in the figures.

In some embodiments, the animal waste handling device 100 may also include a monitoring system (not shown) for monitoring the animal. For example, when the animal is releasing, the monitoring system in the device 100 may measure the weight, temperature, amount of the released waste, duration of release, or other physical characteristics of the animal. In some embodiments, these measured data may be stored and compared with the prior measurement(s) of the same physical characteristic(s) so that the monitoring system may determine the health of the animal based on the comparison result. Such measured data may be stored in and read from a storage or memory disposed in the device 100, or in the cloud, a separate system, or another device via wired (such as through the outlet 210) or wireless communication links between the device 100 and any of the cloud, the system, or the device.

In some embodiments, the operation and movement of the components of the animal waste handling device 100 can be automatic (e.g., upon detection of the exit of the animal) or periodical (e.g., regardless when or whether the animal uses the device 100). In other embodiments, they are remotely controlled by a user through a terminal device (e.g., smart phone, remote controller, etc.).

Figure 3A:
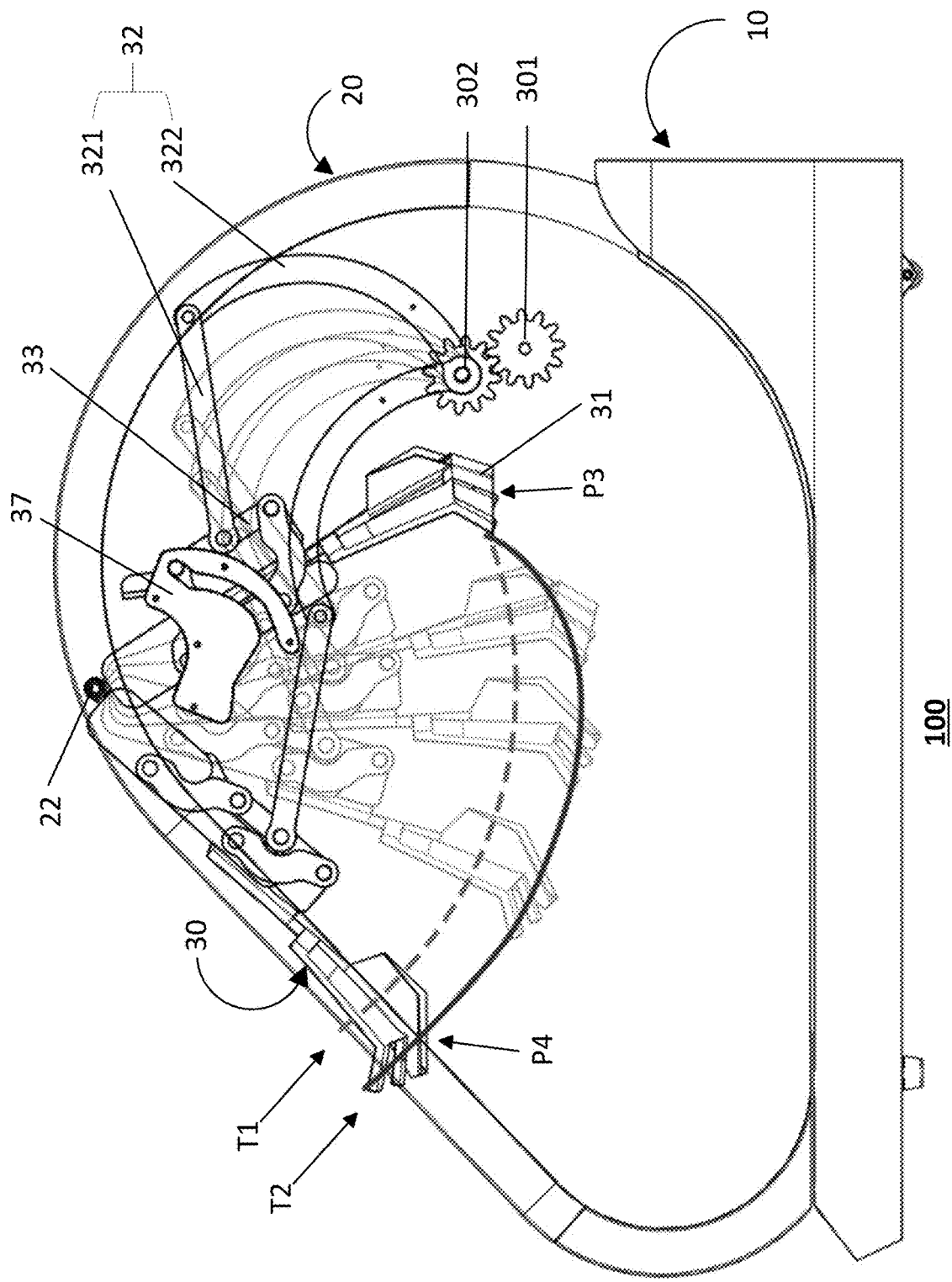
FIGS. 3A-3D illustrate various perspective views of the screen filter of the animal waste handling device, according to certain embodiments of the present disclosure.
Figure 3B:
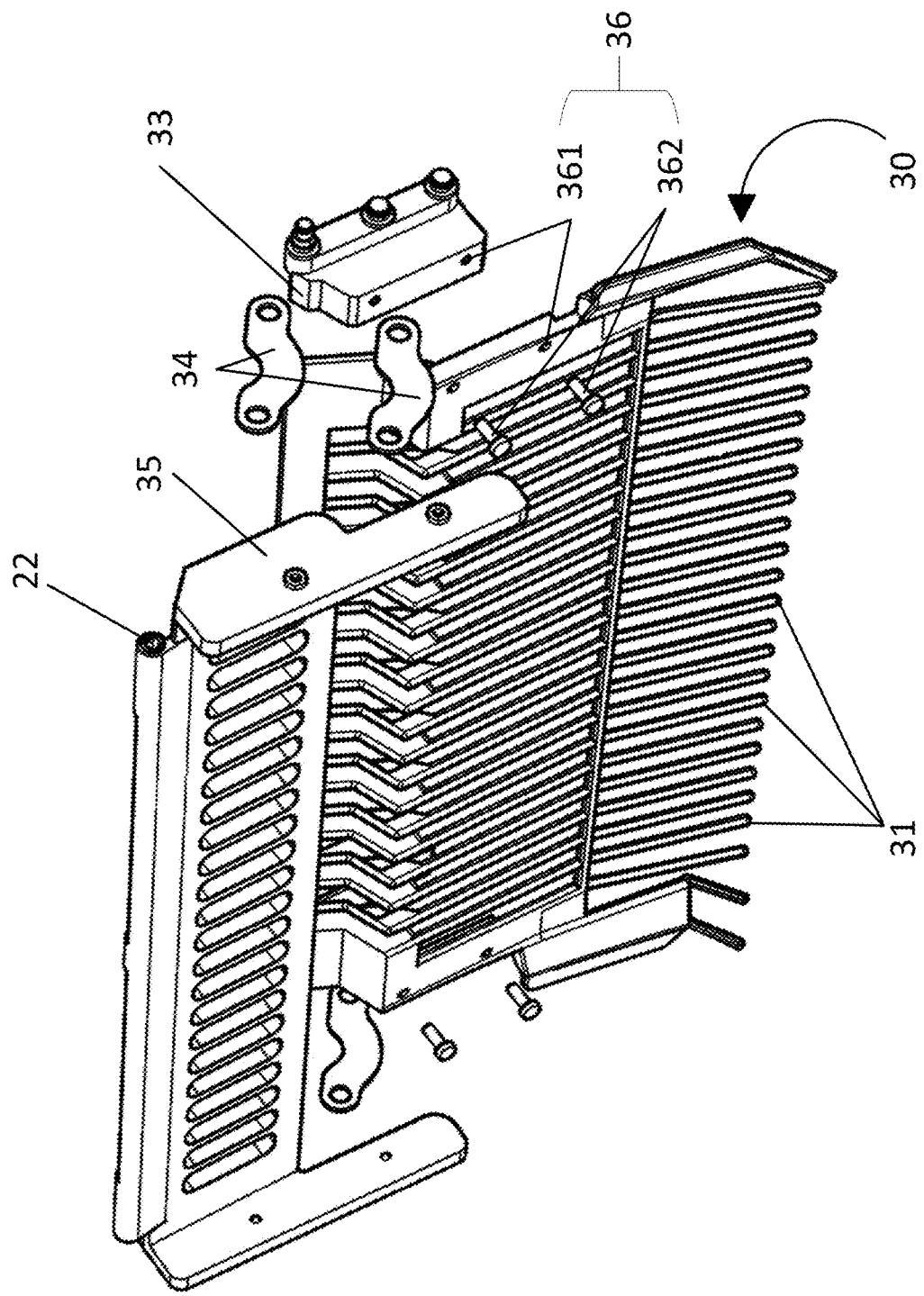
Figure 3C:
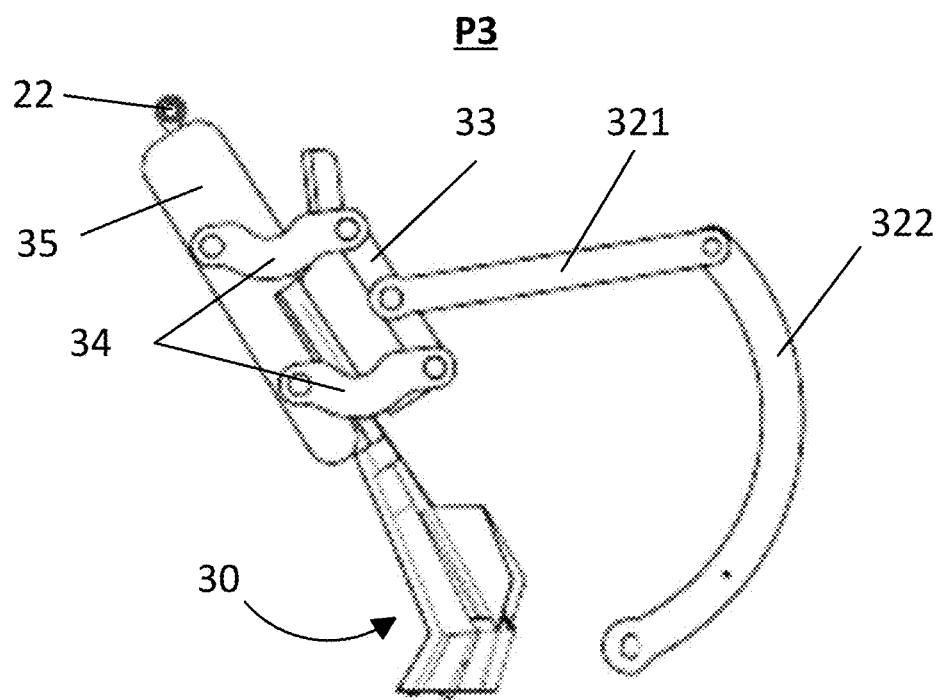
Figure 3D:
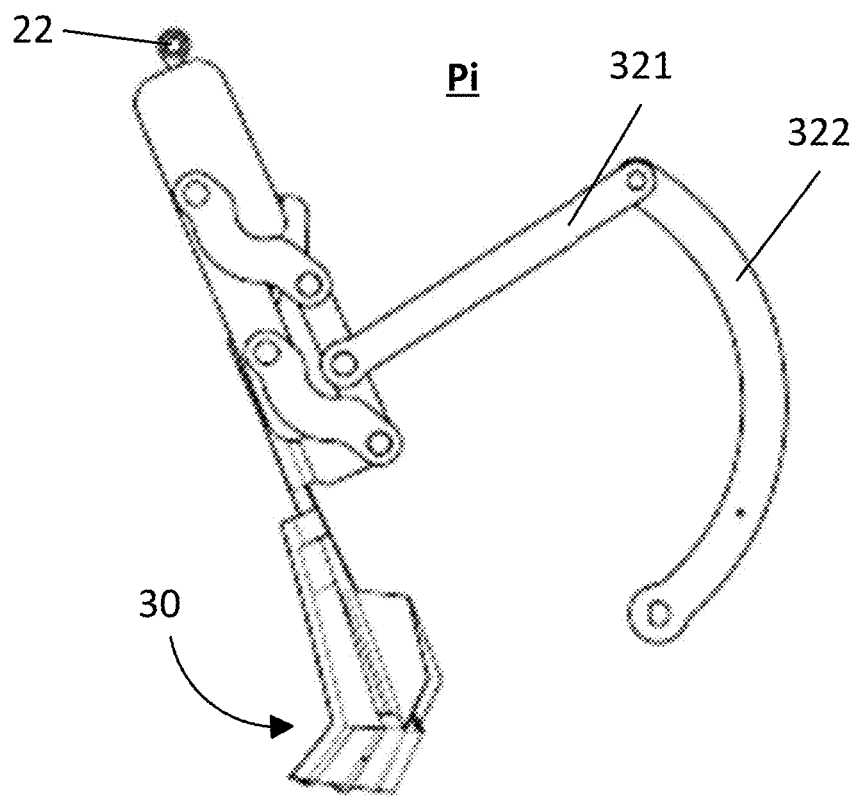

FIGS. 3A-3D illustrate various perspective views of the screen filter 30 of the animal waste handling device 100, according to certain embodiments of the present disclosure. FIG. 3A illustrates movement trajectories of the screen filter 30. It is understood that certain parts in FIG. 3A (e.g., 22, 30, 301, 302, 31, 321, 322, 323) are shown as if the sidewalls of the chamber 20 are transparent. These parts are actually shown in FIG. 3A for the purpose of easy reference. According to the present disclosure, the side walls of the chamber 20 may be designed to be transparent or non-transparent (such as translucent, opaque, etc.), which similarly applies to the chambers shown in other figures, such as FIGS. 5A-5E, 6A-6F, 7A-7D, 8A-8D, 11A-11C, 15A-15B, 16A-16C, and 17A-17C. FIG. 3B illustrates an exploded view of the screen filter 30. FIG. 3C illustrates the screen filter 30 at one position. FIG. 3D illustrates the screen filter 30 at another position.

As shown in FIG. 3A, the screen filter 30 according to the present disclosure may include various components that enable the screen filter 30 to move along one or more trajectories. The movement of the screen filter 30 may include at least one of a rotation around the rotation axis 22 and an extension/retraction, which can be an extension or a retraction of the screen filter 30 relative to the rotation axis 22. When the movement includes only the rotation, the screen filter 30 traverses a circular arc trajectory (e.g., trajectory T1). When the movement includes both, the rotation and the extension/retraction can be performed simultaneously, and the screen filter 30 traverses a curved trajectory (e.g., trajectory T2). It is understood that the movement of the screen filter 30 according to the present disclosure is not confined to the types described above; rather, with the teaching of the present disclosure, a person skilled in the art may design the screen filter 30 to have other configurations that allow it to traverse different trajectories.

An exemplary movement of the screen filter 30 will be described in conjunction with FIG. 3A. In some embodiments, the screen filter 30 rotates around the rotation axis 22 while extending away from it, thus traversing a path (trajectory T2) from the position P3 (where the screen filter 30 is in a retracted position) to the position P4 (where the screen filter 30 is in an extended position). In other embodiments, the screen filter 30 can rotate around the rotation axis 22 while maintaining a fixed distance from it, thus forming a circular arc path. For example, the screen filter 30 can rotate between the position P3 and the position P4 in a retracted position, thus traversing the trajectory T1. The screen filter 30 may extend via a foldable hinge or a telescopic rod, or any other mechanism suitable for the purpose described herein.

The screen filter 30 may be driven by a second driver, such as a gearbox, a drive chain, a lever, a push rod, a pull rod, manually, or any other driving mechanism suitable for the described purpose. The second driver may be used to drive the retraction or extension of the screen filter 30, the rotation of the screen filter 30 around the rotation axis 22, or both. When in motion, the screen filter 30 can rotate and stop at any position between position P3 and position P4 (e.g., an intermediate position Pi shown in FIG. 3D). In some embodiments, the position P3 of the screen filter 30 corresponds to a standby position of the animal waste handling device 100, and the position P4 of the screen filter 30 corresponds to a waste disposal position of the animal waste handling device 100.

An exemplary configuration of the screen filter 30 includes filter elements 31. The screen filter 30 may be fixated to the second driver through a fastening mechanism and driven by the second driver. In some embodiments, a configuration of the second driver is a mechanical arm 32. In some embodiments, as shown in FIGS. 3A, 3C and 3D, the mechanical arm 32 further includes an upper arm 321 and a lower arm 322. One end of the lower arm 322 may be rotatably connected to a filter gear 302, which in turn is intermeshed with a chamber gear 301 to form a gearwheel, so that rotational motion may be transmitted from the chamber gear 301 to the filter gear 302, and subsequently to the lower arm 322. The other end of the lower arm 322 may be rotatably connected to an end of the upper arm 321, thus further transmitting the rotational motion from the lower arm 322 to the upper arm 321. As a result, the other end of the upper arm 321 may push the screen filter 30 to move. In other embodiments (not shown), the mechanical arm 32 includes one single piece of component instead of two or more arms (e.g., one upper arm and one lower arm). The single piece may have one end connected to the gearwheel and the other end pushes the screen filter 30 to move. It is understood that the one-piece configuration can be an equivalent to the two-arm configuration according to the present disclosure in that it drives the movement of the screen filter 30 in the same or similar way as the two-arm configuration described herein.

In some embodiments, the chamber gear 301, and thus the second driver may be powered by a motor (such as the motor 303 shown in FIG. 2), which is different from the motor powering the first driver (such as the motor 113 shown in FIG. 2). In other embodiments, the first driver and the second driver may be powered by the same motor or driven by the same component (which will be discussed below in conjunction with FIGS. 6A-6F). Therefore, with independently provided two drivers, when the chamber 20 rotates, the screen filter 30 may remain unmoved relative to the chamber 20 as long as no rotational motion is transmitted to the filter gear 302, thus separating the rotation of the chamber 20 from the movement of the screen filter 30.

Referring to FIG. 3B, the screen filter 30 according to certain embodiments may resemble a rake in shape, with multiple filter elements 31 aligned like a comb. The shape of the filter elements 31 is not limited to the illustrated shape, and can also be in the shape of a mesh, a porous board, or any other shape that is capable of filtering and separating the animal waste from the litter material. The sizes of the openings or gaps between adjacent filter elements 31 of the same screen filter 30 can be the same, so that the filtering result can be consistent across the width of the screen filter 30. In some embodiments, the sizes of the openings or gaps between adjacent filter elements 31 can vary according to the size of the litter material used in the chamber 20 or the size of the animal waste from the particular animal that uses the device 100.

In some embodiments, a fastening mechanism 36 fastens the screen filter 30 to a fixation block 33 by one or more mounting screws 362 and one or more mounting holes 361. Thus, the screen filter 30 may be replaced by loosening the fastening mechanism 36 and re-fastening a new screen filter of a different configuration or size (e.g., having filter elements with smaller openings or gaps therebetween) to the mechanical arm. In other embodiments, the fastening mechanism 36 may fixate the screen filter 30 to the fixation block 33 through other methods, such as welding, adhesive bonding, or integrated formation. In some embodiments, rather than replacing the screen filter 30 in its entirety, the filter elements 31 can be conveniently removed and replaced from where they are connected to the other portion of the screen filter 30, such as from the middle of the screen filter 30.

In some embodiments, the end of the upper arm 321 that pushes the screen filter to move may be rotatably connected to the fixation block 33 on a side of the fixation block 33. As an example shown in FIG. 3C, the connection point is in the middle of the side of the fixation block 33. The two ends of the same side of the fixation block 33 may be rotatably connected to two stretchers 34, with each end adjoining one tip of one of the stretchers 34. The other tip of each of the stretchers 34 may be rotatably connected to a rotation arm 35. The rotation arm 35 may rotate around the rotation axis 22. Thus, the second driver according to these embodiments, such as the mechanical arm 32, may not only drive the screen filter 30 to rotate around the rotation axis 22, but also cause the screen filter 30 to extend or retract along the direction perpendicular to the rotation direction (e.g., clockwise or counterclockwise). It is understood that the second driver according to the present disclosure is not limited to the mechanical arm 32, and other forms of the second driver may be contemplated (such as by adding a guide rail 37 shown in FIG. 3A) so that the rotation and the extension/retraction movements do not necessarily have to be simultaneous.

FIG. 3C illustrates the screen filter 30 at position P3, which corresponds to the position P3 in FIG. 3A. FIG. 3D illustrate the screen filter 30 at position Pi, which is an intermediate position between positions P3 and P4 shown in FIG. 3A. The quadrangle consisting of the fixation block 33, the pair of stretchers 34, and a portion of the rotation arm 35 may be folded or unfolded when the screen filter 30 moves from one position to another. Therefore, as shown in FIG. 3D, when the screen filter 30 moves in one direction (e.g., from P3 to P4), the rotational motion from the filter gear 302 turns the lower arm 322 towards the screen filter 30, thus pushing the upper arm 321 to force the quadrangle to fold. As a result, the screen filter 30 extends away from the rotation axis 22 while rotating, thereby traversing the curved trajectory T2 (shown in FIG. 3A). When the screen filter 30 moves in an opposite direction (e.g., from P4 to P3), the rotational motion from the filter gear 302 may also reverse, so that the lower arm 322 may be pulled away from the screen filter 30, thus pulling the upper arm 321 to force the quadrangle to unfold. As a result, the screen filter 30 retracts towards the rotation axis 22 while rotating, thereby rolling back along the curved trajectory T2 (shown in FIG. 3A). It is understood that the above movement is just one example of the present screen filter 30 and its accompanying second driver, and other movements of the screen filter may be designed by adjusting the relative angle between the upper arm 321 and lower arm 322, the relative angular velocity between the rotation of the screen filter 30 around the rotation axis 22 and the rotation of the filter gear 302, or both.

Figure 4A:
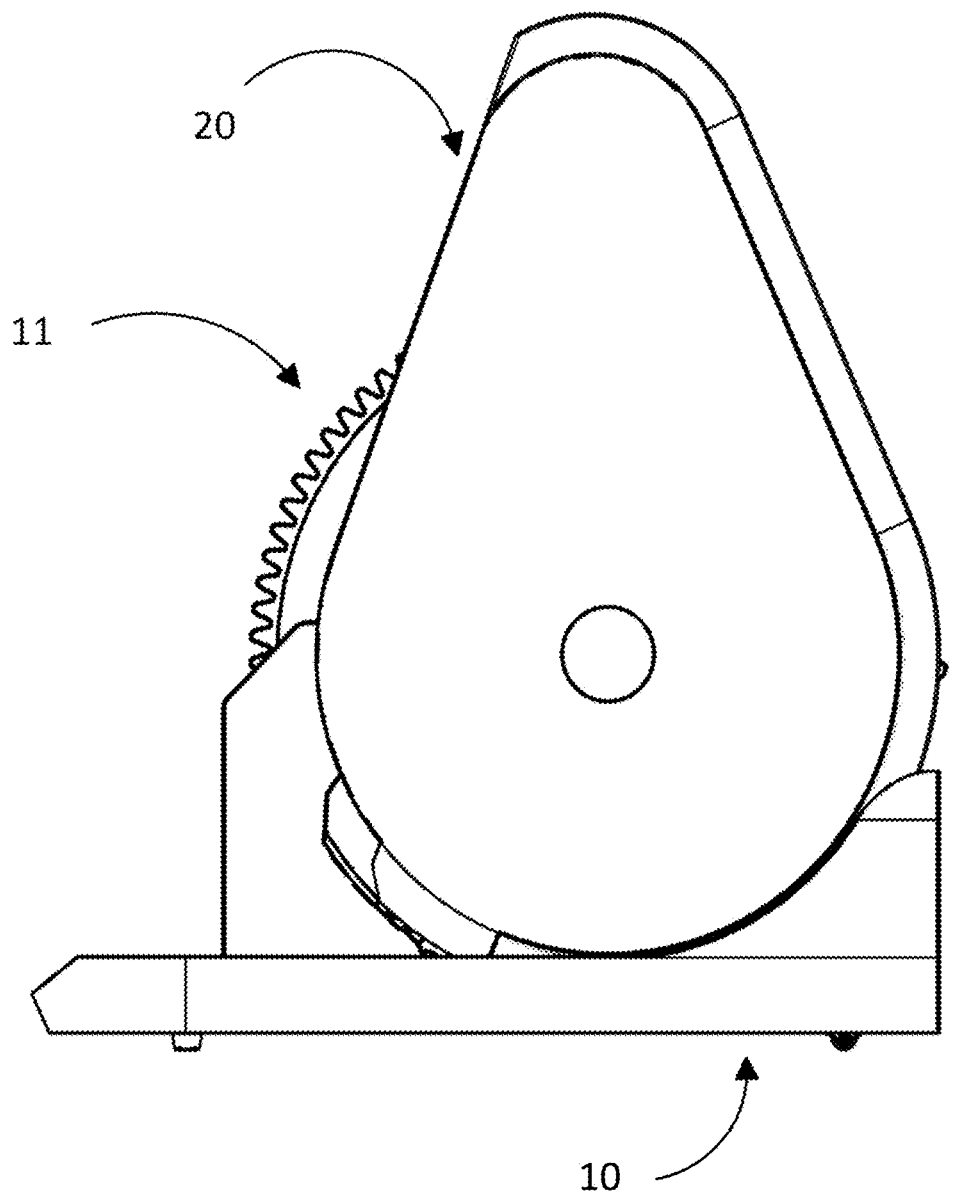
FIGS. 4A-4B respectively illustrate a side view and a perspective view of the rotated chamber of the animal waste handling device, according to certain embodiments of the present disclosure.
Figure 4B:
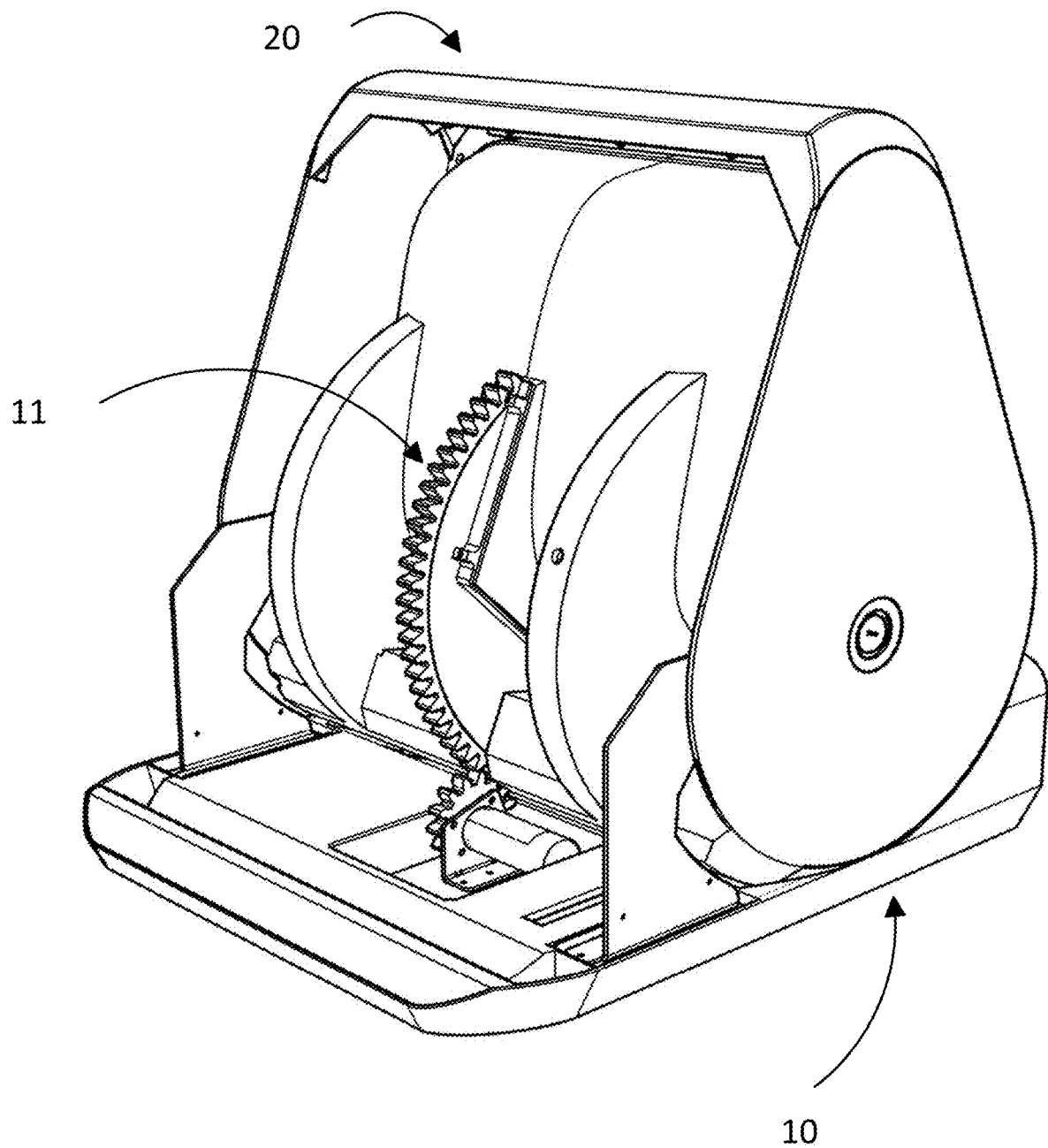

FIGS. 4A and 4B respectively illustrate a side view and a perspective view of the rotated chamber 20 of the animal waste handling device 100, according to certain embodiments of the present disclosure. As discussed above, the chamber 20 may be driven by actuating the first driver 11. The chamber 20 can rotate about the rotation point (not shown) from a standby position (shown in FIG. 1B) to a disposition position (shown in FIG. 4A). In some embodiments, the maximum angle of rotation of the chamber 20 between the standby position and the disposition position is between 75 and 150 degrees. Thus, the bottom of the chamber 20 may rotate to or across a vertical position, as shown in FIGS. 4A and 4B, so that a majority or all of the litter material in the chamber 20 can fall under gravity and through the screen filter 30. The support bracket 10 is designed to support the chamber 20 in different positions considering the change of the center of gravity when the chamber 20 and the litter material move.

FIG. 5A illustrates a perspective view of the animal waste handling device 100, according to certain embodiments of the present disclosure. The chamber 20 shown in FIG. 5A is in a standby position, prior to any rotation driven by the first driver 11 having the driving gear 111 and the driven gear 112. At the standby position, the litter material (not shown) is spread in the chamber 20 evenly in the opening container 201 and the bottom of the chamber 20 is at a substantially horizontal position. The screen filter 30 is retracted at position P3. When the animal waste handling device 100 is at this position, an animal can enter the chamber 20 through an opening 14 to excrete waste in the litter material in the opening container 201. In some embodiments, the chamber also includes the storage container 202 formed by the screen filter 30, the back wall 29, and a partition wall 23. The partition wall 23 may be seamlessly adjoined to the back wall 29, thus preventing the litter material from leaking to the further back of the chamber 20. The storage container 202 may be used to collect the litter material after the chamber 20 rotates to the disposition position to dump the animal waste.

In some embodiments, the animal waste handling device 100 may be provided with a receptacle 12 adjacent to or connected to the support bracket 10. The receptacle 12 can collect the animal waste dumped from the chamber 20. In some embodiments, the receptacle 12 may be designed to have a lid 121 that can open when the waste is about to fall from the chamber 20. The receptacle 12 may be controlled by the same microprocessor inside the device 100 or a separate microprocessor provided in the receptacle 12, so the receptacle 12 is able to determine when the screen filter 30 is about to or has started to move and thus open the lid 121 before the waste is dumped from the chamber 20. In some embodiments, the receptacle 12 is a sealable container, which may include a bag, a box, a bucket, or in any other form suitable to achieve the described purpose. The receptacle 12 may be made of plastic, paper, wood, metal, a combination of two or more thereof, or any other suitable material. The receptacle 12 may include a reusable container that the user can empty or a disposable container that the user can throw away after it is substantially full. In some embodiments, the device 100 may include one or more backup receptacles, each of which may have at least one of volume, size, shape, position of an opening, and connection to the device 100 that is different from that of the receptacle 12. Thus, the backup receptacles may accommodate the use of the device 100 by animals of different sizes or species.

According to the present disclosure, the receptacle 12 may include one or more weight sensors to monitor the weight of waste disposed inside the receptacle 12. For example, when the receptacle 12 is properly installed to the support bracket 10, the weight sensors are placed at various positions of the receptacle 12, which can be used to detect any change of weight of the receptacle 12 and the change of weight of the contents therein. The receptacle weight sensors can be force collector sensor, piezoresistive strain sensor, capacitive sensor, electromagnetic sensor, optical sensor, force balancing sensor, a combination of two or more thereof, or any other suitable sensor. One or more receptacle weight signals may be supplied to the microprocessor for determining whether the receptacle 12 is full of the animal waste (e.g., reaching the maximum capability of handling the waste). Besides, one or more waste level gauges may be provided inside the receptacle 12, which can detect the level of waste accumulated in the receptacle 12. A waste level gauge may be an infrared sensor, a laser sensor, a camera, a combination of two or more thereof, or any other suitable sensor. One or more waste level signals may be supplied to the microprocessor for determining whether the receptacle 12 is full or substantially full of the animal waste or not. "Substantially full" used in these embodiments may have the meaning that more than 80 percent of the volume of the receptacle 12 is occupied. In other embodiments, the meaning of "substantially full" may change according to a preset value of the animal waste handling device 100, or a value set by the user.

It is understood that the receptacle 12 described herein is not a necessary component of the animal waste handling device according to the present disclosure and may be dispensed in some embodiments. For example, the device 100 may be positioned near a sewage system to which the animal waste can be readily disposed. In another example, the device 100 may be positioned in an outside field, such as a backyard of a house or villa, and thus dumping the animal waste to the ground may help nourish the soil in the vicinity of the device 100.

FIG. 5B illustrates another perspective view of the animal waste handling device 100, according to certain embodiments of the present disclosure. As shown herein, the chamber 20 starts to rotate from the standby position towards the disposition position, while the screen filter 30 stays at the position P3. The first driver 11 drives the chamber 20 to move at an angular speed suitable for the litter material and the animal waste to gradually roll towards the storage container 202. When the chamber 20 rotates, the litter material and the animal waste start to roll over to the screen filter 30 due to gravity. The screen filter 30 subsequently filters out the animal waste, and the litter material sifts through the screen filter 30 and falls down to the storage container 202. In some embodiments, the receptacle 12 starts to open the lid 121 when the chamber 20 starts to rotate. The receptacle 12 can also wait until the chamber 20 stops, then open the lid 121 and get ready to receive the animal waste while the screen filter 30 starts to move.

Figure 5C:
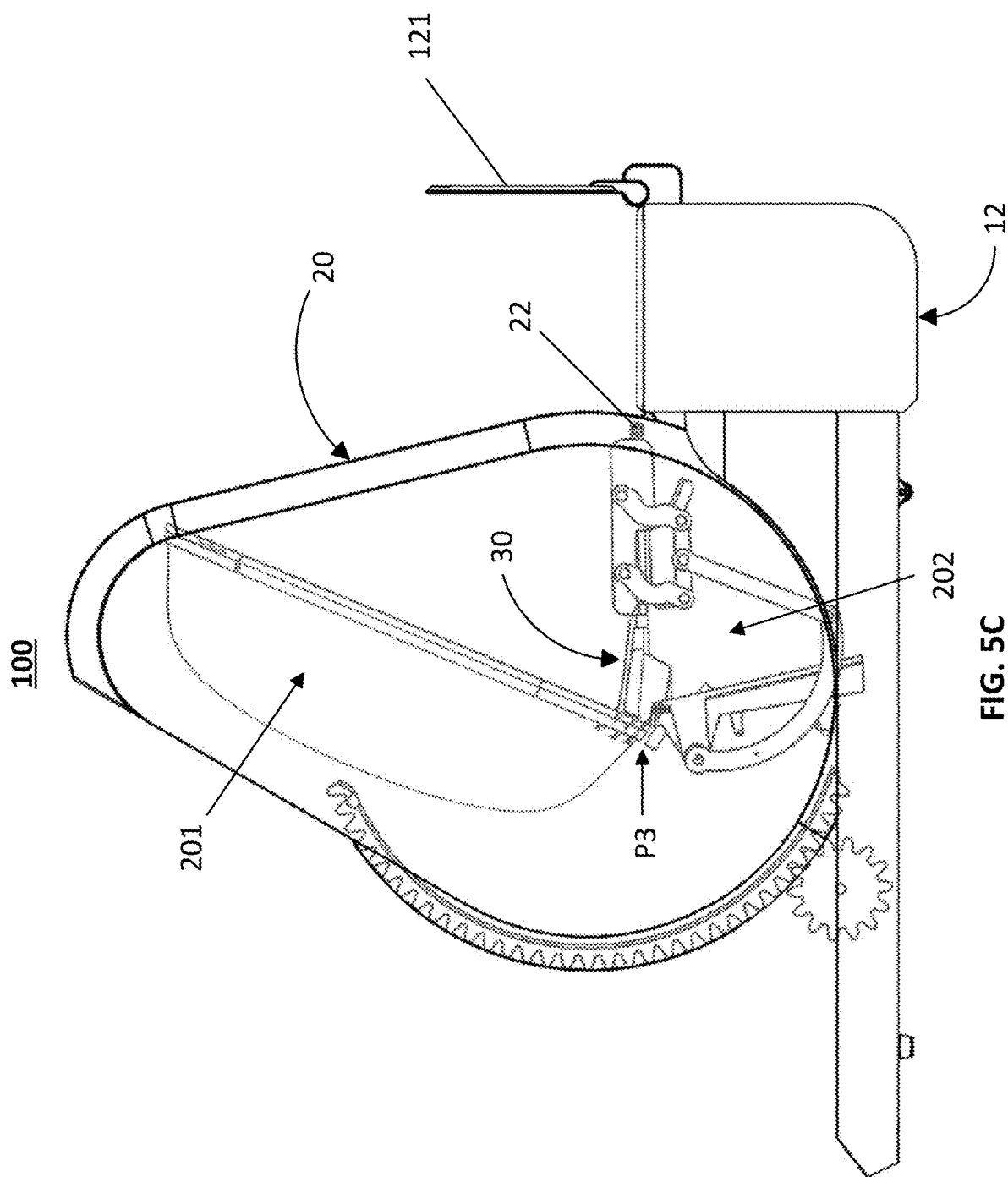

FIG. 5C illustrates another perspective view of the animal waste handling device 100, according to certain embodiments of the present disclosure. The chamber 20 stops at the disposition position and the screen filter 30 remains in the chamber 20 at the position P3. The rotation from the standby position to the disposition position of the chamber 20 can be between 75 to 150 degrees. The lid 121 of the receptacle 12 is fully open. In some embodiments, when the chamber 20 is at the disposition position, the screen filter 30 lies horizontally, or the tip of the screen filter 30 is not lower than the rotation axis 22, thus preventing the animal waste from rolling back into the opening container 201. The storage container 202 has a volume big enough to receive all litter material sifted through the screen filter 30, so that the upper surface of the litter material does not exceed the screen filter 30. The screen filter 30 can filter out the animal waste out of the litter material, and the litter material can slip under the screen filter 30.

Figure 5D:
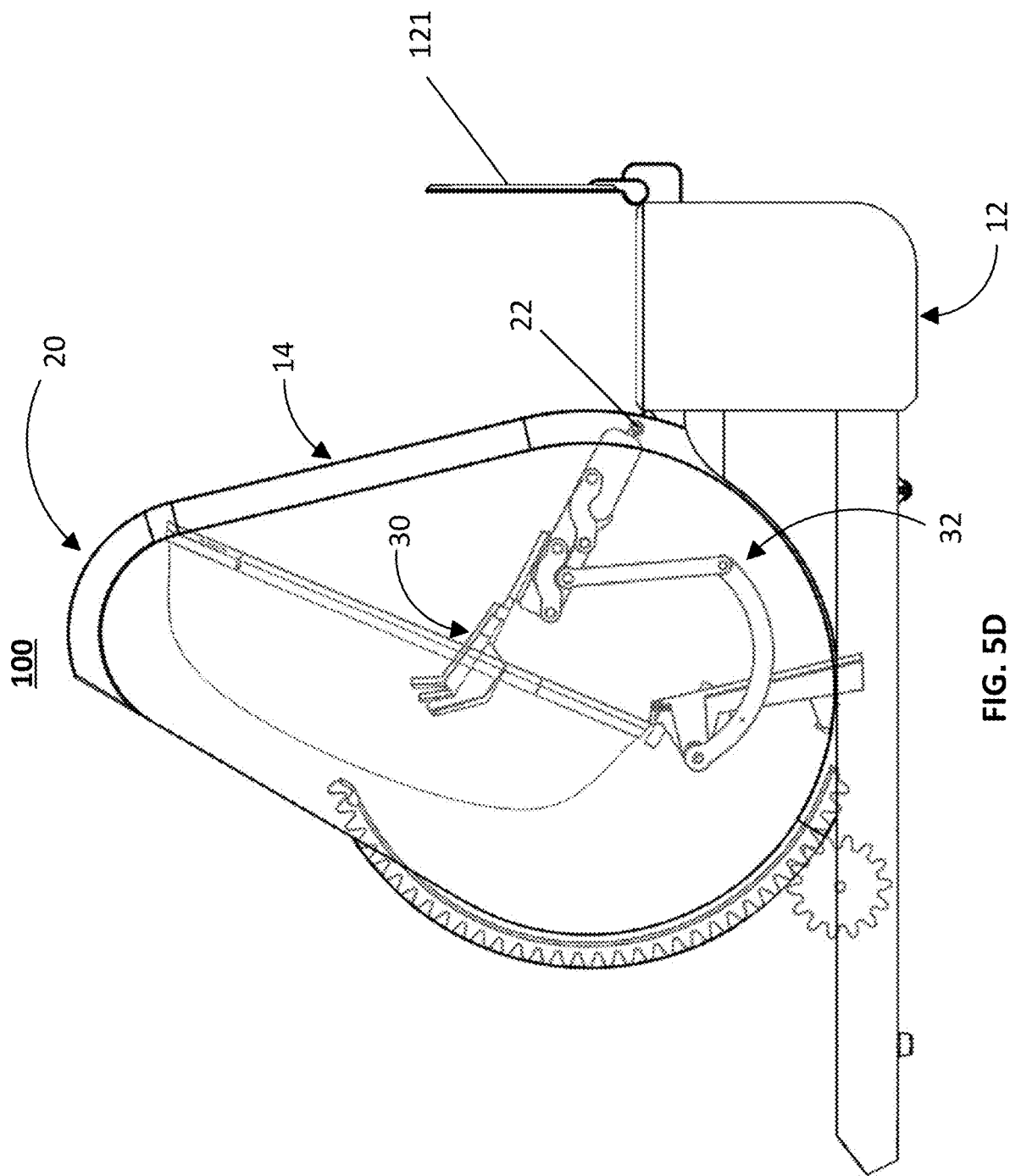

FIG. 5D illustrates another perspective view of the animal waste handling device 100, according to certain embodiments of the present disclosure. This time the chamber 20 remains still at the disposition position, while the screen filter 30 starts to move from the position P3 towards the position P4 after the chamber stops for a predetermined time, such as 0.1, 0.2, 0.3, 0.5, 1, 2, 3, 5 seconds, any range bounded by the upper end by any of these values, or in any range defined by any two of these values. Thus, the animal waste can be transported from inside the chamber 20 to the screen filter 30, and then dumped outside the chamber 20. Although not shown in the figures, it is understood that, in other embodiments, the movement of the screen filter 30 can also commence while the chamber 20 is still rotating, which accelerates the waste handling process. These movement sequences are made possible under the present disclosure because, as described herein, the rotation of the chamber 20 and the movement of the screen filter 30 are driven separately by different drivers.

In the embodiments where the screen filter 30 starts movement before or after the rotation of the chamber 20 completely stops, as distinguished from the embodiments where the screen filter 30 starts movement before the rotation of the chamber 20 starts (such as those described in conjunction with FIGS. 9A and 9B), such movements of the screen filter 30 are referred to in the present disclosure as following the rotation of the chamber 20. The term "follow" used herein has the meaning that the start of the screen filter movement comes after the start of the chamber movement.

In some embodiments, the screen filter 30 may move prior to the rotation of the chamber 20. For example, in order to create a larger filtering area prior to separating the litter material with the animal waste via chamber rotation, the screen filter 30 may first extend so that the end of the screen filter 30 that is further away from the rotation axis 22 may reach closer to the bottom of the chamber 20. After the extension, the chamber 20 may start to rotate from the standby position to the disposition position, and the remaining movement of the screen filter 30 (including the remaining portion of the extension or retraction, the rotation, or both) may follow the rotation of the chamber 20.

In some embodiments, the second driver (e.g., the mechanical arm 32) drives the screen filter 30 to extend from a retracted position to an extended position. The screen filter 30 may extend from the retracted position to the extended position while it rotates around the rotation axis 22. Alternatively, it may rotate while remaining at the retracted position, the extended position, or any intermediate position between these two positions. As the screen filter 30 moves, the animal waste starts to roll along the slope of the screen filter 30, passes through the opening 14 of the chamber 20, and falls down to the receptacle 12. The rotation axis 22 substantially aligns with the edge of the opening 14, and therefore the animal waste can completely and smoothly roll off the screen filter 30.

FIG. 5E illustrates another perspective view of the animal waste handling device 100, according to certain embodiments of the present disclosure. The screen filter 30 stops movement at the position P4. The maximum rotation angle of the screen filter 30 around the rotation axis 22 between the positions P3 and P4 can be between 45 and 90 degrees. This enables the animal waste to be separated from the screen filter 30 due to gravity, and to fall outside of the chamber 20. FIG. 5F illustrates a side view of the animal waste handling device 100 when the chamber 20 is at the disposition position.

According to the present disclosure, during the animal waste handling process, the specific rotation angle for the chamber 20 and the screen filter 30 can be set to be any degree between zero and their respective maximum rotation angles. In one example, when the maximum rotation angle of the chamber 20 is 135 degrees and that of the screen filter 30 around the rotation axis 22 is 90 degrees, the device 100 can be set (e.g., by user) to rotate the chamber 20 for 105 degrees and the screen filter 30 for 75 degrees, which, upon completion, has a position similar to that shown in FIG. 5E. In another example, when the maximum rotation angle of the chamber 20 is 90 degrees and that of the screen filter 30 around the rotation axis 22 is 45 degrees, the device 100 can be set (e.g., by user) to rotate the chamber 20 for 80 degrees and the screen filter 30 for 40 degrees, which, upon completion, has a position similar to that shown in FIG. 7D.

FIGS. 6A-6C respectively illustrate various views of another animal waste handling device 600, according to certain embodiments of the present disclosure. The components of the device 600 that are the same as those of the animal waste handling device 100 are identified with the same numbers, the description of which will not be repeated for brevity purpose. The device 600 differentiates from the device 100 in that the first driver driving the chamber 20 and the second driver driving the screen filter 30 may be actuated by the same component (e.g., a driving/chamber gear 304, a motor (not shown) powering the driving/chamber gear 304, etc.).

As shown in FIG. 6A, when the chamber 20 is in the standby position, the driven gear 112 and the driving/chamber gear 304 of the device 600 may intermesh in order to function in the similar way as the first driver 11 of the device 100. In some embodiments, the driving/chamber gear 304 may be powered by a motor (not shown). When the driving/chamber gear 304 rotates, the rotational motion may be transmitted to the chamber 20 via the driven gear 112, thereby driving the chamber 20 between different positions, such as the standby position and the disposition position. At the disposition position, the litter material in the chamber 20 may sift through the screen filter 30 down to the back portion of the chamber 20. When the chamber 20 is at the standby position, the screen filter 30 may be located within the chamber 20 at a position P3'. The screen filter 30 may be rotatably connected to the filter gear 302, which is adjacent to an end of the driven gear 112.

As shown in FIG. 6B, when the chamber 20 gradually rotates to the disposition position, the screen filter 30 may remain at the position P3'. In some embodiments, the rotation of the chamber 20 causes the driven gear 112 to traverse substantially its circumference until the driving/chamber gear 304 meets the filter gear 302. Thereafter, the driving/chamber gear 304 may intermesh with the filter gear 302 in order to function in the similar way as the second driver of the device 100. In some embodiments, the rotational motion from the driving/chamber gear 304 may be transmitted to the screen filter 30 via the filter gear 302 so that the screen filter 30 may rotate around the axis 22 between different positions, such as the position P3' and a position P4', as shown in FIG. 6C. In some embodiments, the screen filter 30 may also be extended or retracted before, during, or after it is rotated, such as by being connected to a mechanical arm or the like. At the position P4', the animal waste may be dumped outside the chamber 20 by the screen filter 30.

Figure 6F:
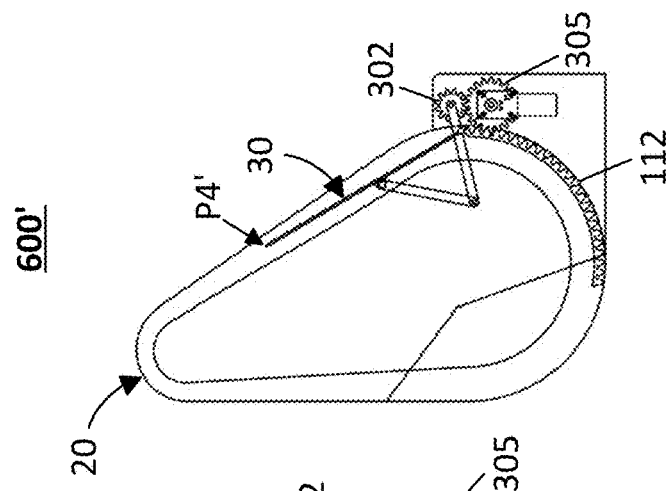
FIGS. 6D-6F respectively illustrate various views of yet another animal waste handling device, according to certain embodiments of the present disclosure.
Figure 6E:
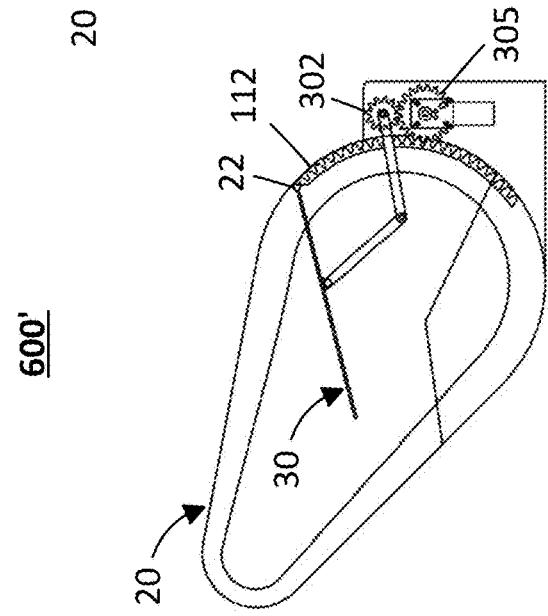
Figure 6D:
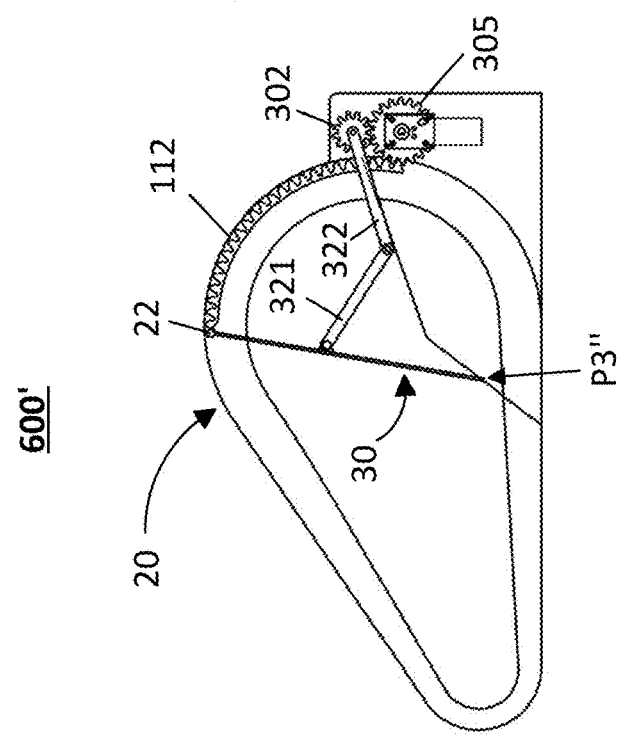

FIGS. 6D-6F respectively illustrate various views of yet another animal waste handling device 600', according to certain embodiments of the present disclosure. The components of the device 600' that are the same as those of the animal waste handling device 100 are identified with the same numbers, the description of which will not be repeated for brevity purpose. Similar to the device 600, the device 600' differentiates from the device 100 in that the first driver driving the chamber 20 and the second driver driving the screen filter 30 may be actuated by the same component (e.g., a driving/chamber gear 305, a motor (not shown) powering the driving/chamber gear 305, etc.). The device 600' differentiates from the device 600 in that the chamber 20 and the screen filter 30 of the device 600' may be simultaneously driven by the first driver and the second driver, respectively. In addition, the device 600' includes a mechanical arm having an upper arm 321 and a lower arm 322.

As shown in FIG. 6D, when the chamber 20 is in the standby position, the driven gear 112 and the driving/chamber gear 305 of the device 600 may intermesh in order to function in the similar way as the first driver 11 of the device 100, and the filter gear 302 and the driving/chamber gear 305 of the device 600 may intermesh in order to function in the similar way as the second driver of the device 100. In some embodiments, the driving/chamber gear 305 may be powered by a motor (not shown). When the driving/chamber gear 305 rotates, the rotational motion may be transmitted to the chamber 20 via the driven gear 112, thereby driving the chamber 20 between different positions, such as the standby position and the disposition position. The same rotational motion of the driving/chamber gear 305 may also be transmitted to the screen filter 30 via the filter gear 302, thereby causing the lower arm 322 and the upper arm 321 to push and pull the screen filter between different positions, such as a position P3" (the in-chamber position of the screen filter 30 when the chamber 20 is in the standby position) and a position P4" (the furthest position of the screen filter 30 to which it can be pushed by the lower arm 322 and the upper arm 321). Such movement of the screen filter 30 may involve at least one of a rotation around the axis 22 and an extension/retraction. Thus, the chamber rotation and the screen filter movement may occur simultaneously, though the duration of chamber rotation may or may not be the same as the duration of screen filter movement.

As shown in FIG. 6E, when the chamber 20 gradually rotates to the disposition position and the screen filter 30 moves towards the position P4", the litter material in the chamber 20 may begin to sift through the screen filter 30 down to the back portion of the chamber 20. In some embodiments, the rotation of the chamber 20 causes the driven gear 112 to traverse substantially its circumference until the driving/chamber gear 305 meets the end of the driven gear 112. In some embodiments, the screen filter 30 may also be extended or retracted before, during, or after it is rotated with the similar configuration between the mechanical arm and the screen filter 30 as described in conjunction with FIGS. 3A-3D. At the position P4", the animal waste may be dumped outside the chamber 20 by the screen filter 30, as shown in FIG. 6F.

FIGS. 7A-7D illustrate schematic diagrams of a process of waste handling by a device 700, according to certain embodiments of the present disclosure. The device 700 has the same components as the animal waste handling device 100 discussed above. These components are assigned the same numerals but simplified for the ease of illustration of the process. The waste disposition process is at least partially accomplished due to the gravity of the litter material and the animal waste. Therefore, intervals can be created between steps of the process to ensure the gravity-assisted process to complete, thus achieving the desired result.

Figure 7A:
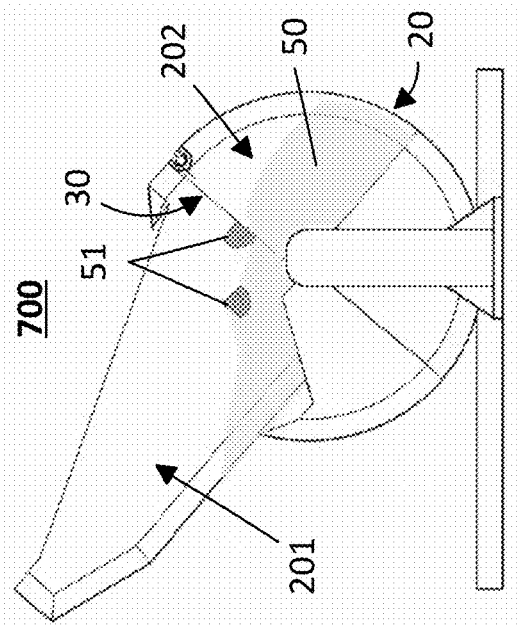
FIGS. 7A-7D illustrate schematic diagrams of a process of waste handling, according to certain embodiments of the present disclosure.

As shown in FIG. 7A, the chamber 20 is at the standby position and supported by the support bracket 10. The chamber 20 can hold a certain volume of litter material 50 in the opening container 201. An animal may enter the chamber 20 and excrete waste therein, which then soils or agglomerates with the litter material 50 to form the animal waste 51. After the animal exits the device 700, the device 700 may detect the departure of the animal and automatically initiate the process of waste handling. In other embodiments, the process can be triggered by user input. At the standby position, the screen filter 30 is yet to move and separates the opening container 201 from the storage container 202.

Figure 7B:
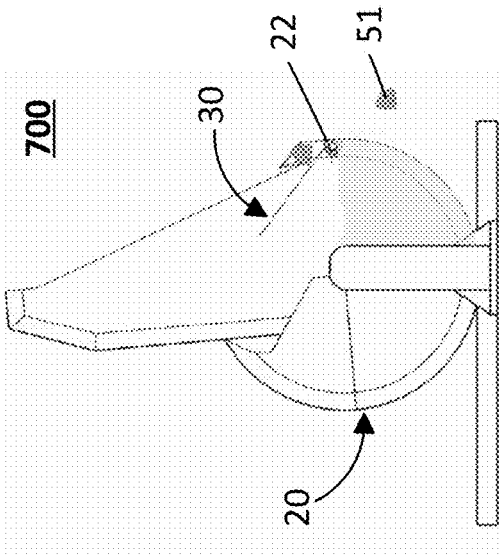

Referring to FIG. 7B, the chamber 20 starts to rotate from a substantially horizontal position towards a vertical position, while the screen filter 30 remains unmoved relative to the chamber 20. The litter material 50 starts to fall through the screen filter 30 from the opening container 201 to the storage container 202, and the animal waste 51 is separated and left on the screen filter 30.

Figure 7C:
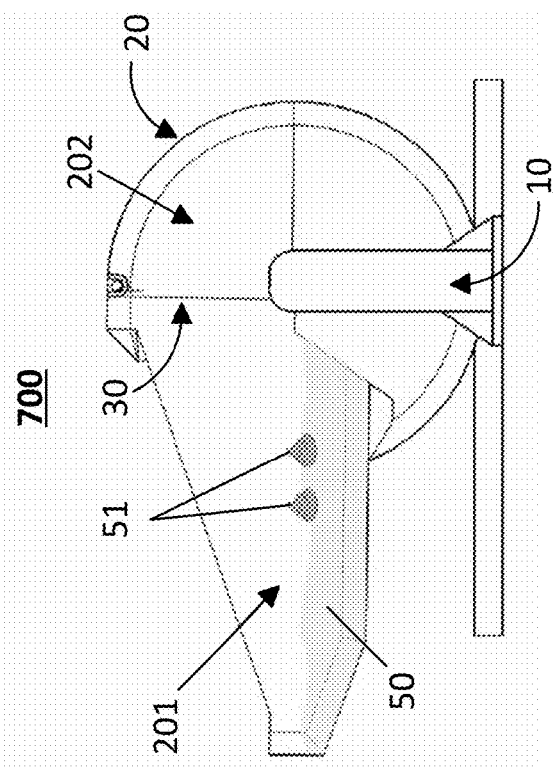

Referring to FIG. 7C, the chamber 20 stops rotating at the disposition position. The litter material 50 has completely fallen through the screen filter 30 and down to the storage container 202, which is formed by the chamber 20 and the partition wall 23. At the same time the animal waste 51 is left on the screen filter 30 to be disposed. The storage container 202 is spacious enough to receive all of the sifted litter material 50. The upper surface of the litter material 50 is below the screen filter 30. After the chamber 20 stops, the screen filter 30 starts to move.

Figure 7D:
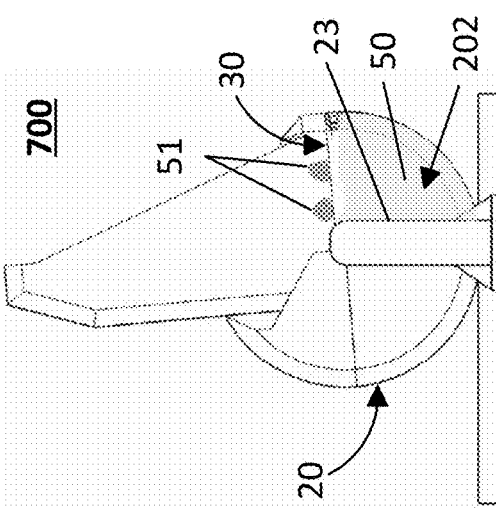

Referring to FIG. 7D, the screen filter 30 moves about the rotation axis 22 and disposes the animal waste 51. The screen filter 30 moves from a relatively horizontal position (shown in FIG. 7C) to a relatively vertical position, thus dumping the animal waste 51 out of the chamber 20 via gravity. The chamber 20 may remain still during this dumping step. After the animal waste 51 is disposed out of the chamber 20, the animal waste handling device 100 completes the animal waste handling process.

FIGS. 8A-8D illustrate schematic diagrams of a process of spreading out litter material in the animal waste handling device 700, according to certain embodiments of the present disclosure. After the process of animal waste handling, the device 700 can rotate back to the standby position and become ready for the next use by the animal. The litter material 50 can be restored to the standby level as well. The litter material spread-out process is at least partially accomplished due to the gravity of the litter material. Therefore, intervals can be created between steps of the process to ensure the gravity-assisted process to complete, thus achieving the desired result.

Figure 8A:
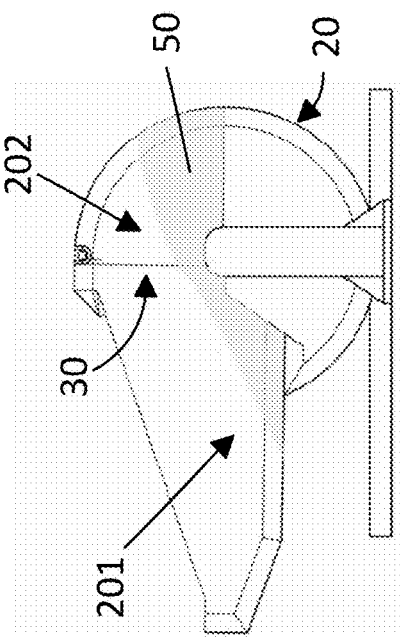
FIGS. 8A-8D illustrate schematic diagrams of a process of spreading out litter material in the animal waste handling device, according to certain embodiments of the present disclosure.
Figure 8B:
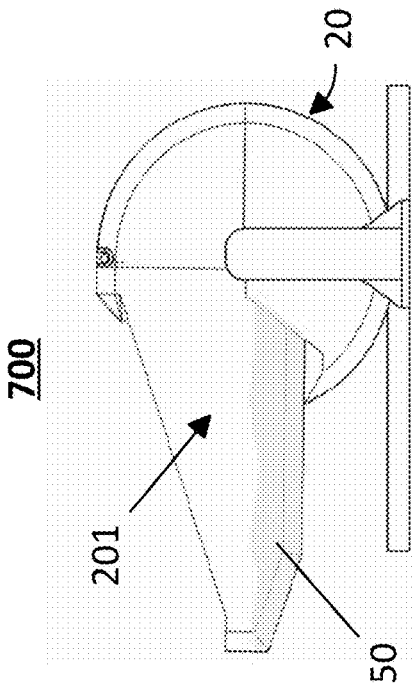

Referring to FIGS. 8A and 8B, the screen filter 30 moves back from the position P4 to the position P3 after it remains at the position P4 for a first predetermined time (e.g., 0.5, 1, 2, 3, 5, 10, 20, 30, 60 seconds, any range bounded by the upper end by any of these values, or in any range defined by any two of these values), and the chamber 20 rotates back from the disposition position to the standby position after it remains at the disposition position for a second predetermined time (e.g., 1, 2, 3, 5, 10, 20, 30, 60, 120 seconds, any range bounded by the upper end by any of these values, or in any range defined by any two of these values). In some embodiments, the rotation of the chamber 20 can start after the commencement or completion of the movement of the screen filter 30 from the position P4 to the position P3. In some embodiments, the movement of the screen filter 30 from the position P4 to the position P3 can start after the commencement or completion of the rotation of the chamber 20. In some embodiments, the screen filter 30 and the chamber 20 return to their respective starting positions (i.e., the position P3 for the screen filter 30 and the standby position for the chamber 20) at the same time or sequentially in any order. Although the litter material 50 starts to flow back to the chamber 20 from the storage container 202 to the opening container 201, sometimes it is not evenly spread out in the chamber 20 and some of it may be still left in the storage container 202. This is not ideal for the next use by the animal, because, due to the uneven spread of the litter material 50, the waste may be excreted directly on the bottom or sidewall of the chamber 20 instead of soiling the litter material 50 to form large-chunked animal waste (not shown).

Figure 8C:
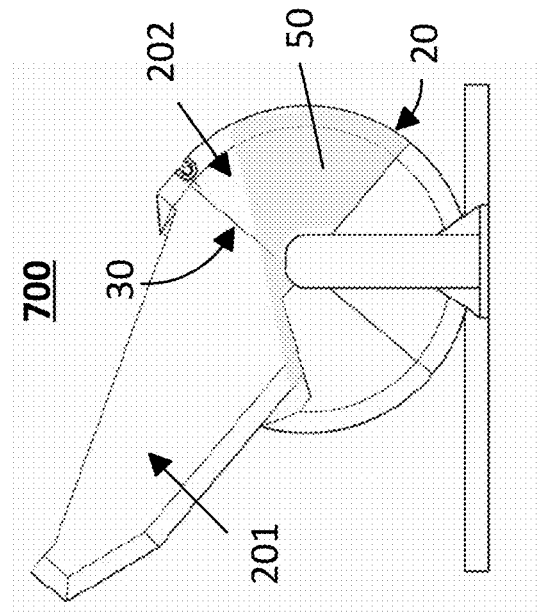

Referring to FIG. 8C, to resolve the above issue, the chamber 20 further rotates to a spread position after rotating back from the disposition position to the standby position. The rotation direction of the chamber 20 from the standby position to the spread position is the same as that from the disposition position to the standby position (e.g., counterclockwise as shown in FIGS. 8A-8C), so that the litter material 50 fully flows back to the opening container 201. In this position, the litter material 50 possibly left in the storage container 202 will fall back into the opening container 201 via gravity. The maximum rotation angle between the standby position and the spread position can be between 5 and 45 degrees. The specific rotation angle for the chamber 20 to rotate between the standby position and the spread position can be set (e.g., by user) to be any degree between zero and the maximum rotation angle.

Figure 8D:
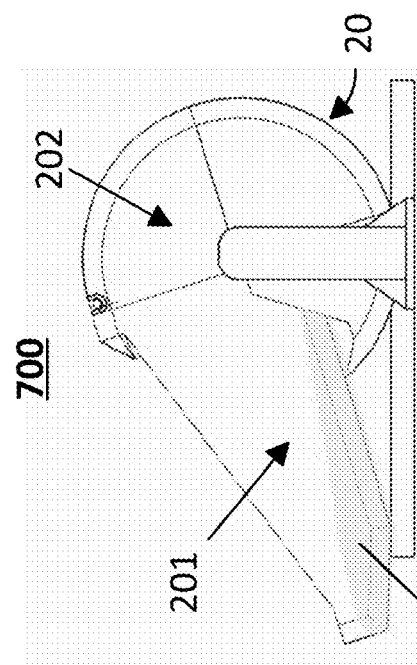

Referring to FIG. 8D, the chamber 20 subsequently rotates from the spread position back to the standby position. The litter material 50 can thus be evenly spread out in the opening container 201. If the evenness of the litter material 50 is not achieved, the steps of spreading out illustrated in FIGS. 8C and 8D can be repeated until it is achieved. Like the other steps, intervals can be created between steps of this spread-out process to ensure the gravity-assisted process to complete.

Figure 9B:
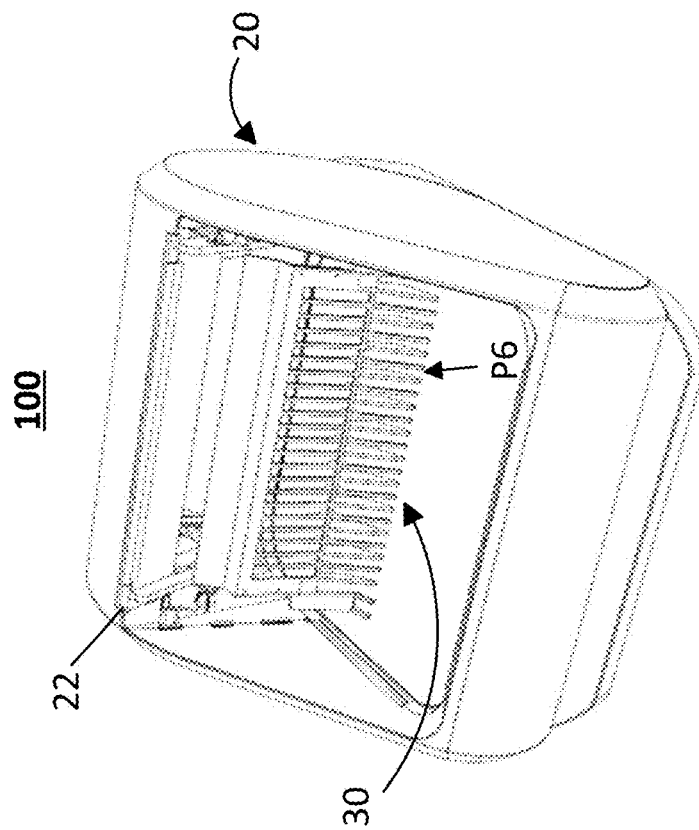
FIGS. 9A-9B illustrate perspective views of an operation of the animal waste handling device, according to certain embodiments of the present disclosure.
Figure 9A:
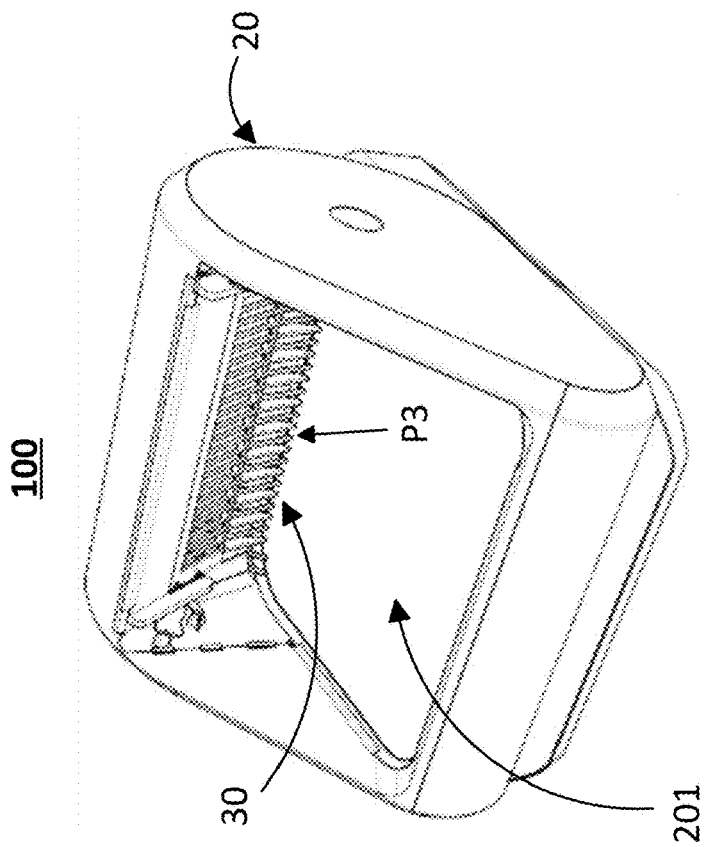

FIGS. 9A-9B illustrate perspective views of an operation of the animal waste handling device 100, according to certain embodiments of the present disclosure. To make the litter material (not shown) more evenly spread in the chamber 20, the screen filter 30 can be used to comb through the litter material. In some embodiments, the screen filter 30 can move between the position P3 and another position P6. The direction of the movement may be the same as the movement from the position P3 to the position P4 (e.g., clockwise as shown in FIGS. 9A-9B). It is understood that the position P6 may or may not match the position P4. As shown in FIG. 9A, when the screen filter 30 is at the position P3, it may be in a retracted position at or near the edge of the opening container 201. Its tip may be away from the bottom of the chamber 20 so that it will not interfere with the gravity-assisted spread-out process described in conjunction with FIGS. 8A-8D. As shown in FIG. 9B, when the screen filter 30 starts to move towards the position P6, it may include at least one of the two movements—rotation around the rotation axis 22 and extension driven by the mechanical arm (not shown). In this way, its end away from the rotation axis 22 may comb through the litter material in the chamber 20 and cause the litter material to be more evenly spread within the chamber 20. This combing process can be performed upon the user's request or employed as a periodical routine, such as once every three times of disposition.

Moreover, when the extension is involved, the screen filter 30 can reach deep and even touch with the bottom surface of the chamber 20 or the bottom surface of the removable nonstick vessel 21 (shown in FIGS. 10A-10B), and therefore the screen filter 30 is able to clean or scratch off any animal waste sticking thereon. This cleansing process can also be performed upon the user's request or employed as a periodical routine, such as once every three times of disposition.

Figure 10B:
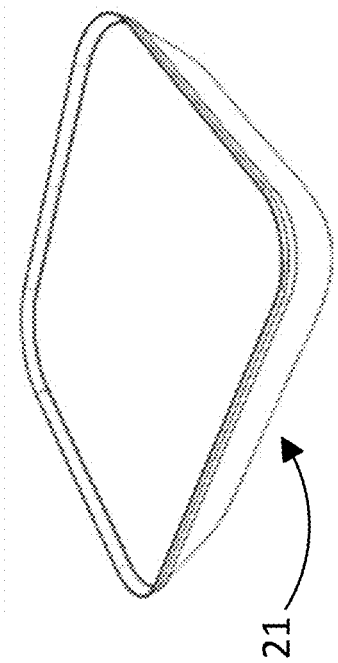
FIGS. 10A-10B illustrate perspective views of the removable nonstick vessel of the animal waste handling device, according to certain embodiments of the present disclosure.
Figure 10A:
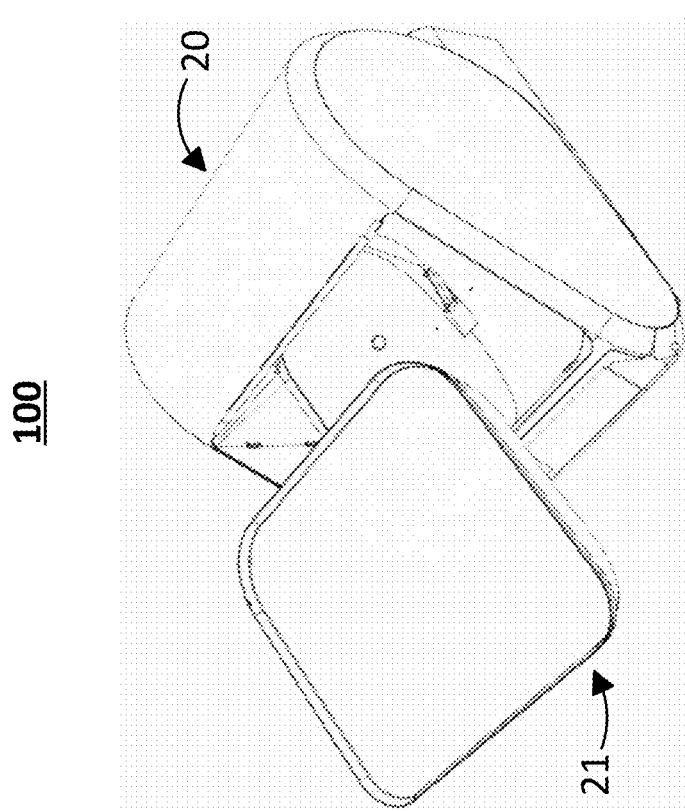

FIGS. 10A-10B illustrate perspective views of the removable nonstick vessel 21 of the animal waste handling device 100, according to certain embodiments of the present disclosure. As shown in FIG. 10A, the nonstick vessel 21 is removable from the chamber 20. In some embodiments, the nonstick vessel 21 is designed in a shape suitable to fit into the chamber 20, which can be circular, triangular, rectangular, pentagonal, hexagonal, elliptic cylinder, or any other similar shape suitable for the determined purpose. In some embodiments, the nonstick vessel 21 can have a flat inner bottom so that the thickness of the litter material layer inside the nonstick vessel 21 is even. The nonstick vessel 21 can be attached to the chamber 20 with a fixation mechanism easy to be removed by a user's hands. One example of such a fixation mechanism includes one or more snap joints. In some embodiments, the dimension of the opening of the chamber 20 is smaller than that of the nonstick vessel 21, which is made of flexible materials, such as rubber, polymer, plastic, paper, bamboo, etc., so that when being inserted into the chamber 20, the nonstick vessel 21 can fully extend and fit with the snap joints, making it more robustly attached to the chamber 20. The flexibility of the nonstick vessel 21 also allows it to deform under gravity when being rotated (such as that shown in FIG. 11A), and to restore to its original form when being laid down at the standby position.

Figure 11A:
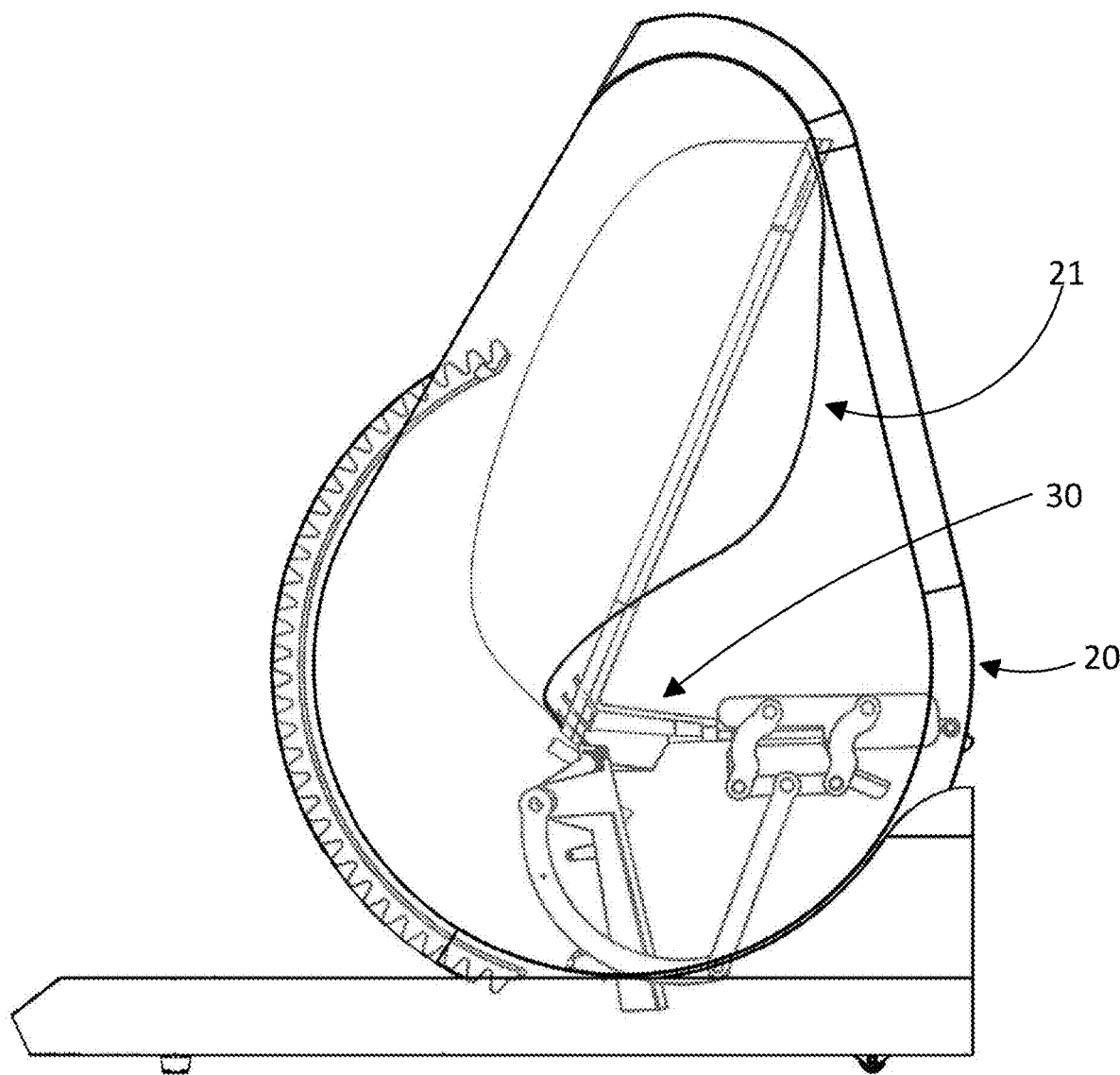
FIGS. 11A-11C illustrate perspective views of an operation of the animal waste handling device, according to certain embodiments of the present disclosure.
Figure 11B:
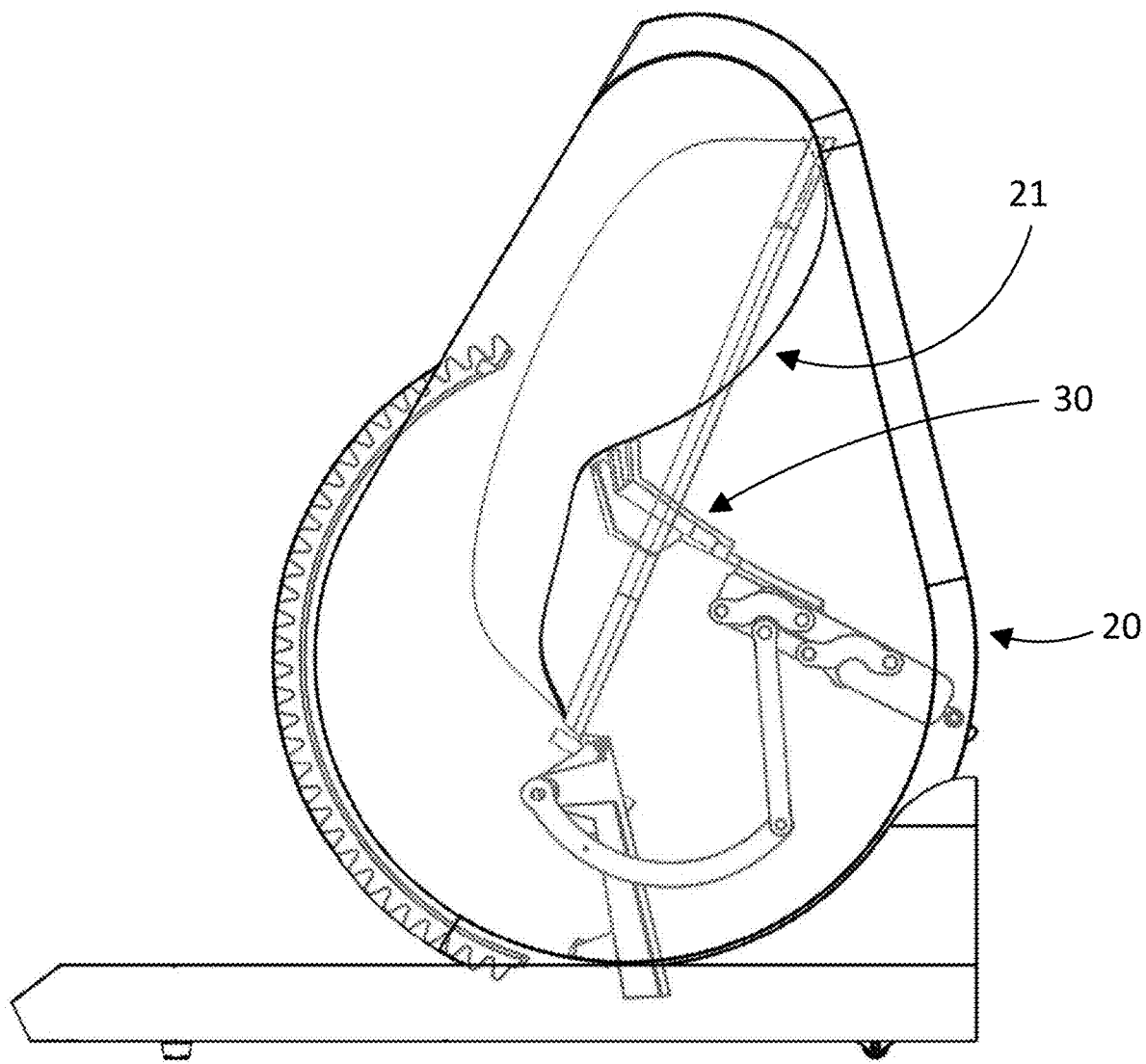
Figure 11C:
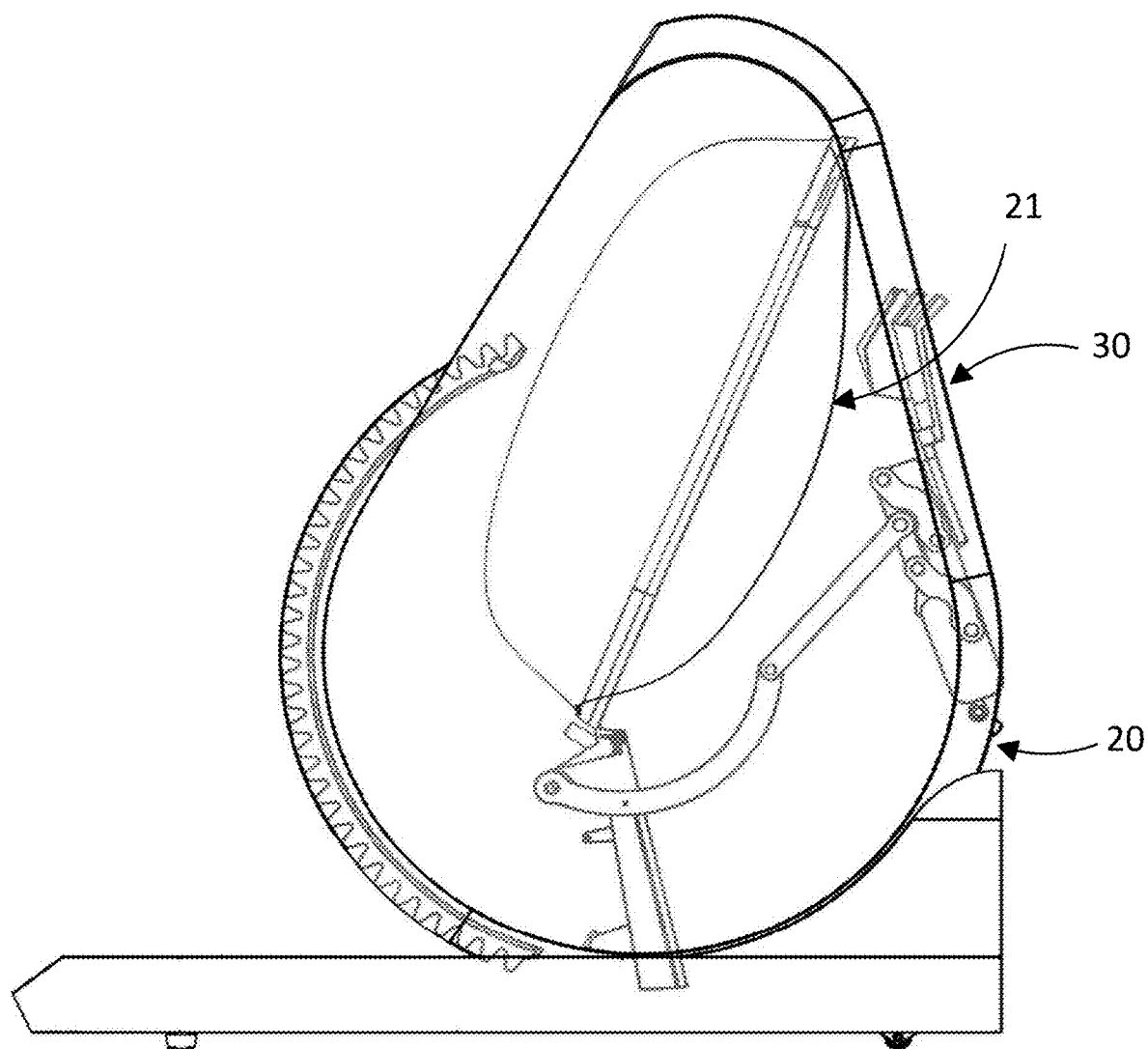

FIGS. 11A-11C illustrate perspective views of an operation of the animal waste handling device 100, according to certain embodiments of the present disclosure. In some embodiments, when the chamber 20 rotates and stops at the disposition position, the nonstick vessel 21 can deform and detach from the inner bottom of the chamber 20 under gravity. The deformation causes the animal waste (not shown) sticking to the nonstick vessel 21 to bounce off, thus achieving superior cleaning result. Moreover, if there is any remaining animal waste that does not bounce off, the screen filter 30 can chip away and clean off the sticky waste left on it, and then dump it outside the chamber 20, as shown in FIG. 11B. In some embodiments, the shape of the screen filter 30 resembles a shovel or a rake, making it easier to chip away the sticky waste. This cleansing process of the nonstick vessel 21 can be performed every time when the screen filter 30 disposes the animal waste and the chamber 20 is at the disposition position. Alternatively, it can be employed as a periodical routine, such as once every three times of disposition. In some embodiments, after the nonstick vessel 21 is removed, it can be rotated 90, 180, or 270 degrees and then installed back, so that each quarter or half of the nonstick vessel 21 can be regularly cleaned off. In some embodiments, the nonstick vessel 21 may be made of a flexible material, so that it can be turned upside down and installed back into the chamber 20, thus improving the durability and longevity of use for the nonstick vessel 21.

Figure 12B:
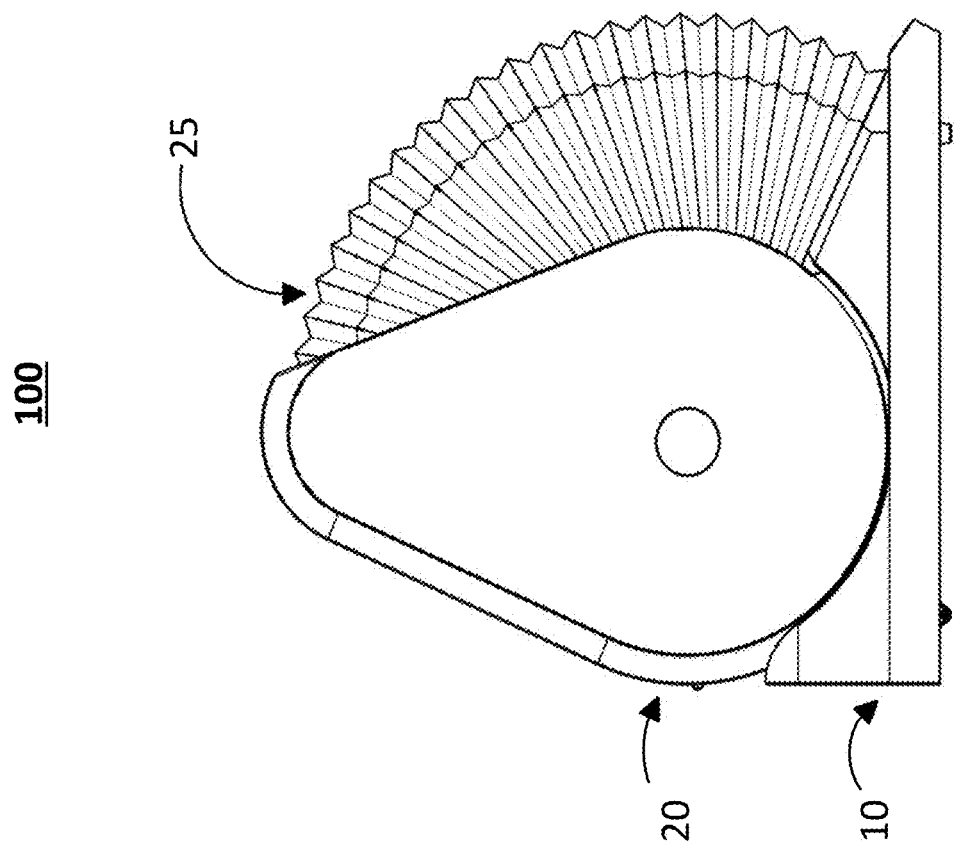
Figure 12A:
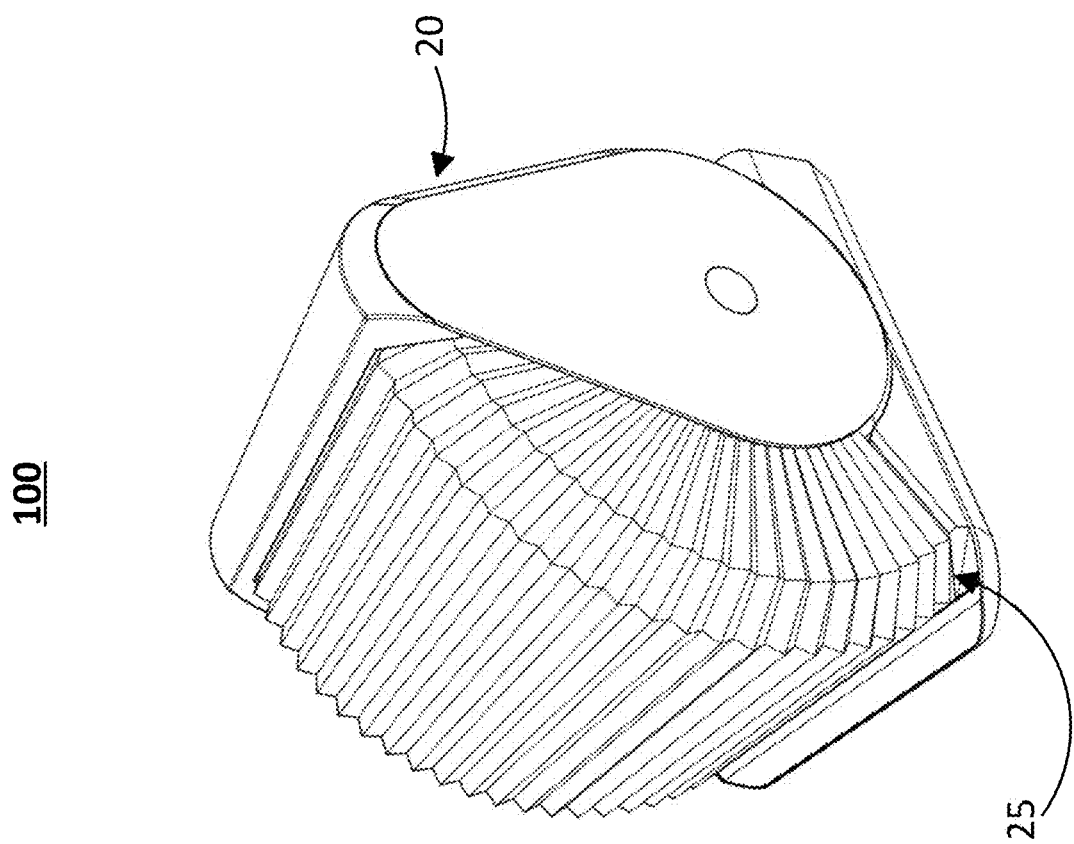

FIGS. 12A-12E illustrate various views of a foldable protector 25 of the animal waste handling device 100, according to certain embodiments of the present disclosure. In some embodiments described in conjunction with FIGS. 4A and 4B, the first driver 11 may be exposed out of the bottom of the chamber 20 when the chamber 20 rotates to the disposition position. To protect the first driver 11 from being tampered or damaged or to prevent the animal using the device 100 being squeezed or clamped therein while the chamber 20 is rotating, the device 100 may further include a foldable protector 25 that covers the outer bottom of the chamber 20 as it rotates, as shown in FIGS. 12A and 12B. The first driver 11 can thus be concealed beneath the foldable protector 25, whether the device 100 is in operation mode or standby mode. The foldable protector 25 can further cover the gap between the bottom portion of the chamber 20 and the upper portion of the support bracket 10, with one end of it attached to the bottom of the chamber 20 and the other end attached to a part of the device 100 other than the chamber 20 (such as the base 103 as shown in FIG. 2).

The foldable protector 25 shown in FIGS. 12A-12B has a bellow-like shape. The foldable protector 25 may include a plurality of leaves 26. The foldable protector 25 may fold and extend like an accordion. One example of the leaf 26 is shown in FIG. 12C. The plurality of leaves 26 may be adjoined together by, for example, mounting pins, adhesion, or integrated formation, so that the foldable protector 25 can spread and collect like a working accordion. The plurality of the leaves 26 can all have the same dimensions, so that when the chamber 20 rotates from the disposition position to the standby position, the foldable protector 25 can fold all together into the same dimensions as one single leaf 26 except that the folded protector 25 is thicker, as shown in FIG. 12D. Correspondingly, the foldable protector 25 can extend when the chamber 20 rotates from the standby position to the disposition position, as shown in FIG. 12E. The foldable protector 25 leaves no or very little space at the bottom of the animal waste handling device 100 at any position, so that no animal will get stuck therein. The foldable protector 25 can be made of paper, plastic, cloth, metal, alloy, or any other material suitable for the described purpose.

Figure 13B:
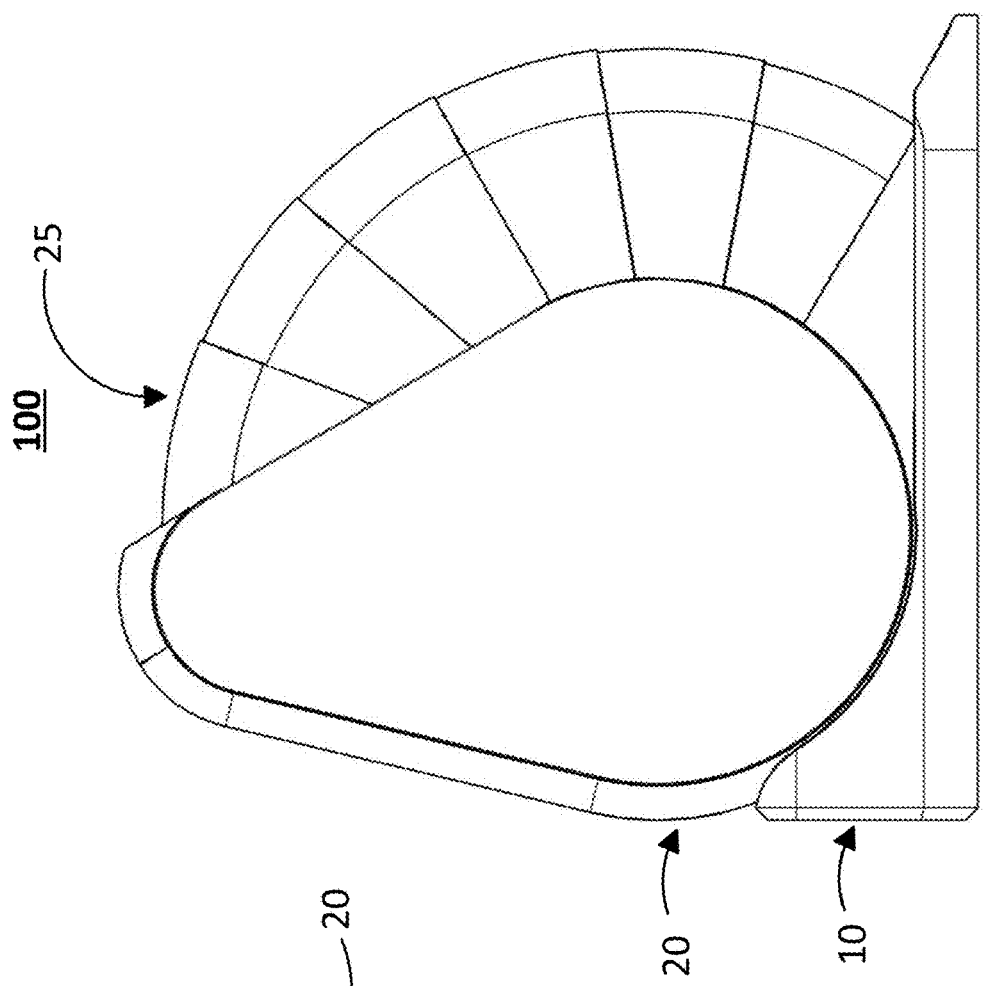
FIGS. 13A-13E illustrate various views of a foldable protector of the animal waste handling device, according to certain embodiments of the present disclosure.
Figure 13A:
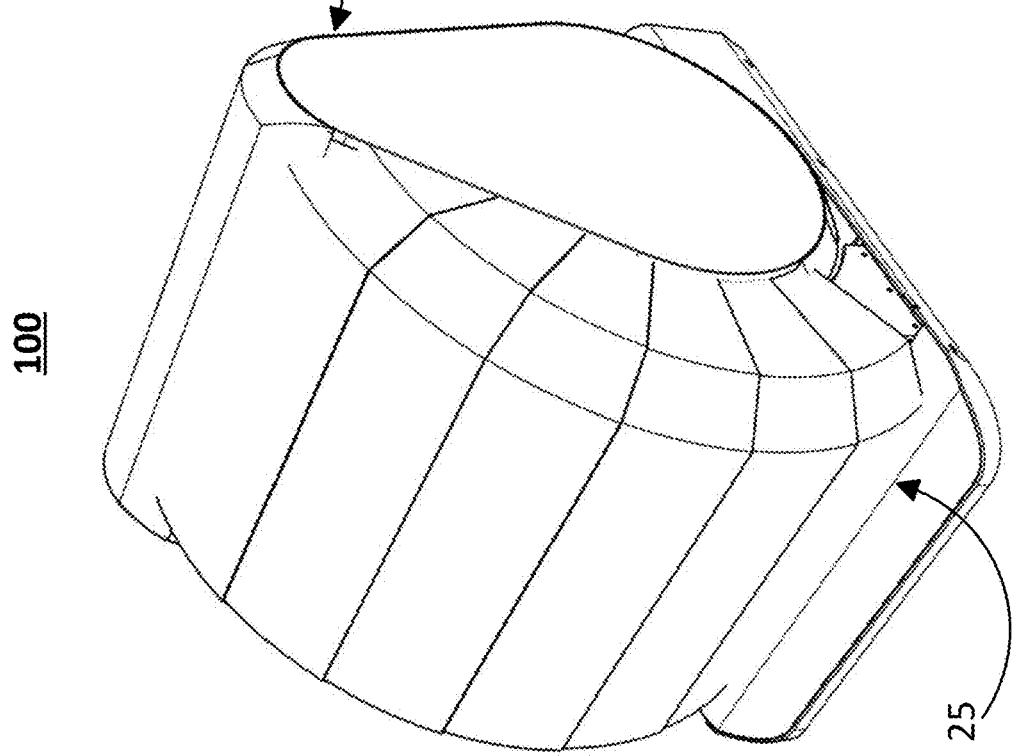
Figure 13D:
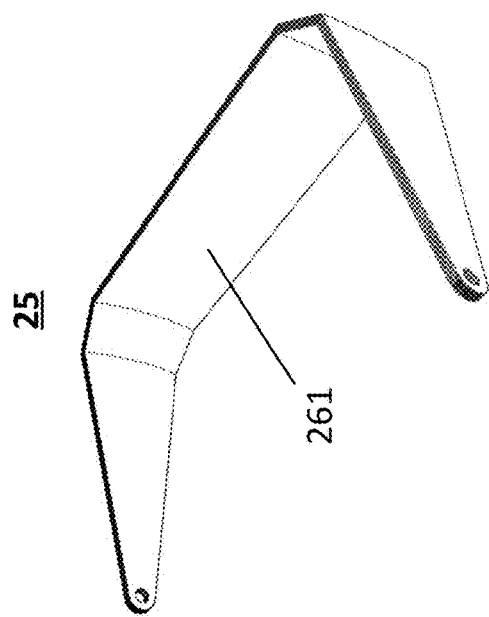
Figure 13E:
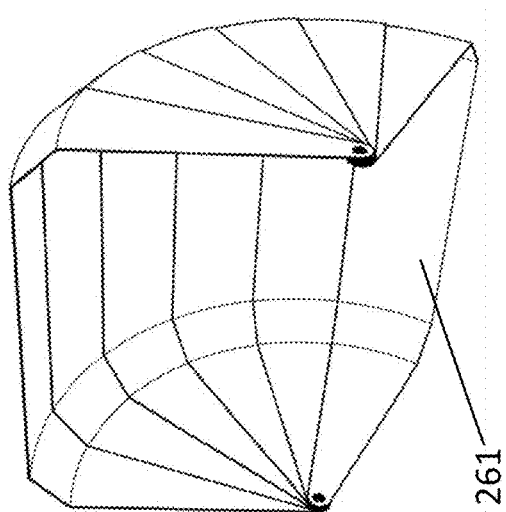
Figure 13C:
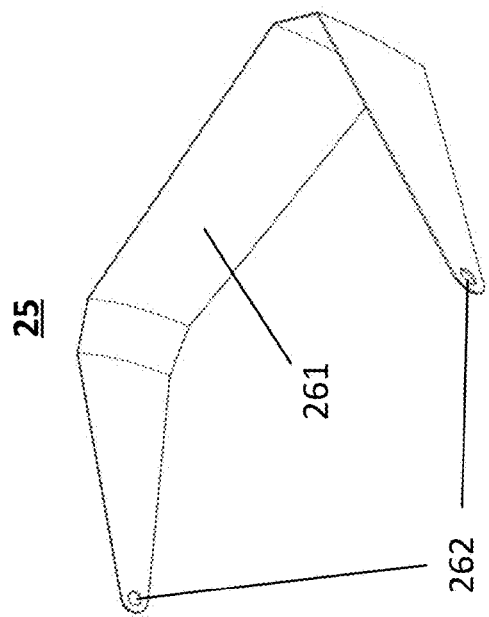

FIGS. 13A-13E illustrate various views of a foldable protector 25 of the animal waste handling device 100, according to certain embodiments of the present disclosure. The difference of the foldable protector 25 of these embodiments from that of the embodiments shown in FIGS. 12A-12E is that the foldable protector 25 here has a fan-shape. The foldable protector 25 may include a plurality of fins 261, instead of leaves 26. As a result, the foldable protector 25 in FIGS. 13A-13E may fold and extend like a hand fan. One example of the fin 261 is shown in FIG. 13C. Each fin 261 may include a pair of mounting pins 262. The plurality of fins 261 may be mounted via their respective pairs of mounting pins 262, so that the foldable protector 25 can spread and collect around the mounting pins 262. The plurality of the fins 261 can have substantially the same size and shape. In some embodiments, the size of the fin 261 on the inner side of the foldable protector 25 is smaller than that on the outer side, so that the inner-side fin 261 may fit within and immediately adjacent to the inner boundary of the outside-side fin 261, just like a foldable fan. Thus, when the chamber 20 rotates from the disposition position to the standby position, the foldable protector 25 can fold all together into the same dimensions as one single fin 261 except that the folded protector 25 is thicker, as shown in FIG. 13D. Correspondingly, the foldable protector 25 can extend when the chamber 20 rotates from the standby position to the disposition position, as shown in FIG. 13E. The foldable protector 25 leaves no or very little space at the bottom of the animal waste handling device 100 at any position, so that no animal will get stuck therein. Similar to the foldable protector 25 shown in FIGS. 12A-12E, the foldable protector 25 here can also be made of paper, plastic, cloth, metal, alloy, or any other material suitable for the described purpose.

Figure 14:
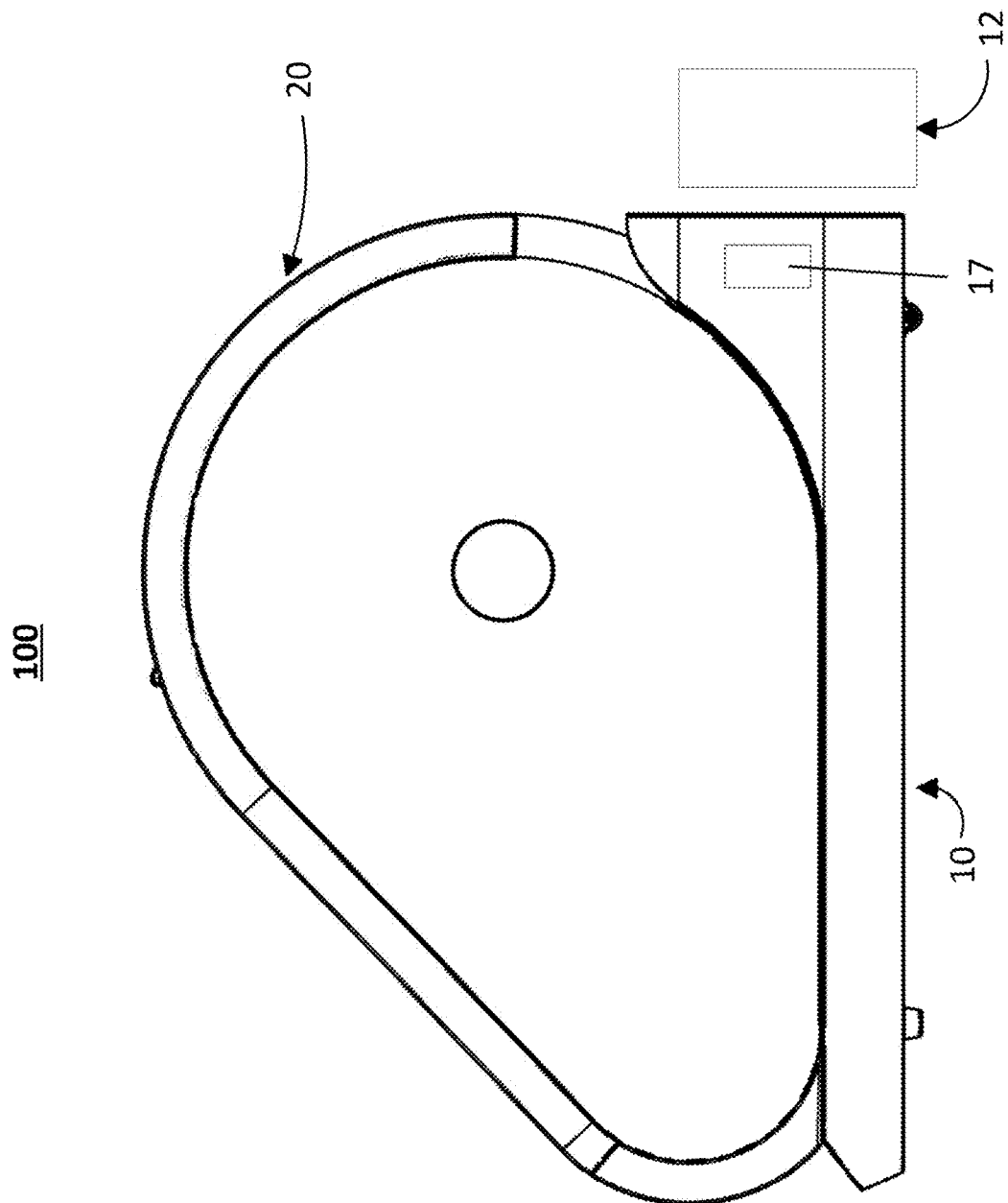
FIG. 14 illustrates a side view of the animal waste handling device 100, according to certain embodiments of the present disclosure.

FIG. 14 illustrates a side view of the animal waste handling device 100, according to certain embodiments of the present disclosure. The animal waste handling device 100 may further include a receptacle sensor 17. The receptacle sensor 17 may be located inside the chamber 20 (e.g., near the back of the chamber 20 as shown in FIG. 14), or in the support bracket 10 (not shown). The receptacle sensor 17 may detect the existence or operation mode of the receptacle 12, or the volume or weight level of the waste collected by the receptacle 12. When the receptacle 12 is placed adjacent to or connected to the chamber 20, the receptacle sensor 17 may determine the type of the receptacle 12 (which will be further discussed in conjunction with FIGS. 15A-17C), the position of the receptacle 12, the status of the lid (if any) of the receptacle 12. The receptacle sensor 17 may be a light sensor, a laser sensor, a Hall Effect sensor, a RFID sensor, or any other sensor suitable for the described purpose. The device 100 may be pre-installed with identifier information that allows the receptacle sensor 17 to recognize the key features of each type of the receptacle 12. The receptacle sensor 17 may also detect whether the receptacle 12 is placed or connected correctly to receive the animal waste dumped from the chamber 20. In some embodiments, the receptacle sensor 17 sends a feedback signal to the microprocessor, and the microprocessor will control the chamber 20 or the screen filter 30 to initiate the waste handling process when the receptacle sensor 17 detects that the receptacle 12 is correctly placed or connected, thus ready for use.

FIGS. 15A-15B, 16A-16C, and 17A-17C illustrate various examples of the receptacle 12. As previously discussed, the receptacle 12 can be used to collect the animal waste from the chamber 20. The receptacle 12 can be a bag, a box, a bucket, or in any other form suitable to achieve the described purpose. In some embodiments, the receptacle 12 includes an odor-removal substance, such as an inside cartridge with activated carbon to absorb odor from the animal waste. Thus, the device 100 can be used in a limited living space without unpleasant odor. In some embodiments, the receptacle 12 includes a cleaning component that automatically cleans the waste. The cleaning component may include a waste processing mechanism, such as a substance to decompose the waste, or a chemical to purify the waste. The cleaning component may also include an anti-bacterial substance that kills bacteria and prevent bacteria from growing inside the receptacle 12. In some embodiments, the receptacle 12 is further connected to a sewage system, and thus the animal waste can fall into the cleaning component and then be flushed away into the sewage system by water or air, saving the user's time from manually disposing the animal waste out of the receptacle 12. The opening and closing of the receptacle 12 can be controlled by the microprocessor. In some embodiments, the receptacle 12 is adapted to open after the chamber 20 stops at the disposition position and before the screen filter 30 moves to dump the animal waste. In some embodiments, the receptacle 12 is adapted to close after the screen filter 30 stops movement at the position P4 for a predetermined time, at which time the animal waste has had enough time to roll down into the receptacle 12. An additional benefit of providing the receptacle 12 adjacent to the chamber 20 with a decent height, as opposed to the conventional waste collector positioned underneath, could eliminate uneven stacking of the disposed waste inside the receptacle 12 and thus increase the usage efficiency to at least 50% of the volume of the receptacle 12. Moreover, as discussed above, each of the receptacles 12 disclosed herein is replaceable with a backup receptacle that is different from the receptacle 12 being replaced with respect to at least one of volume, size, shape, position of an opening, and connection to the device 100.

Figure 15B:
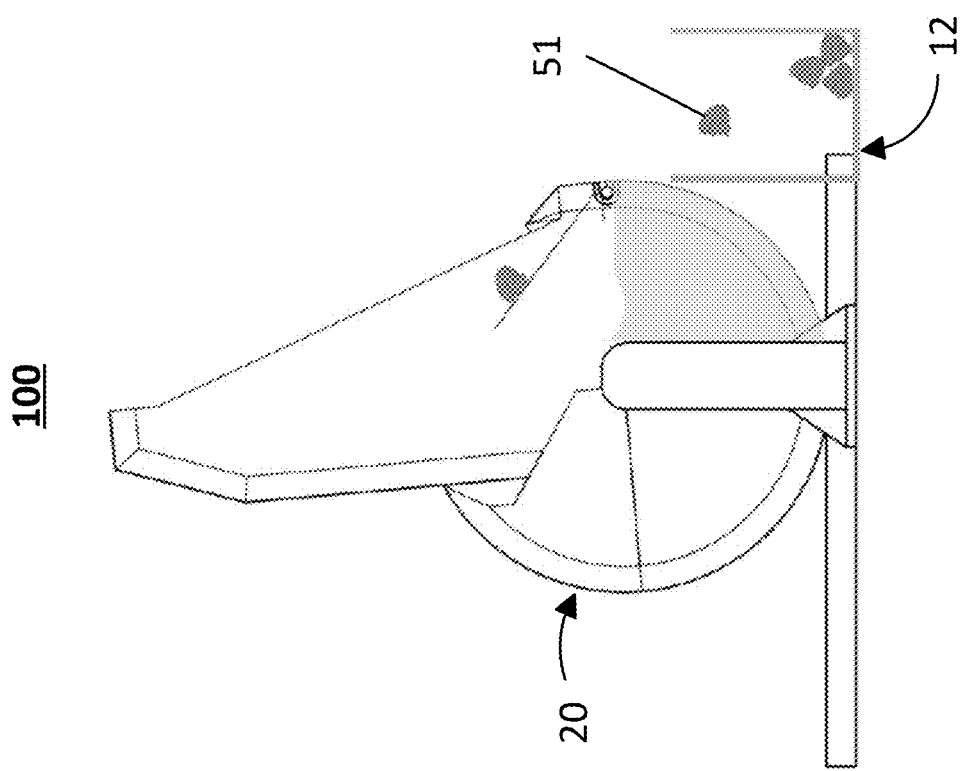
FIGS. 15A-15B illustrate schematic diagrams of an exemplary receptacle of the animal waste handling device, according to certain embodiments of the present disclosure.
Figure 15A:
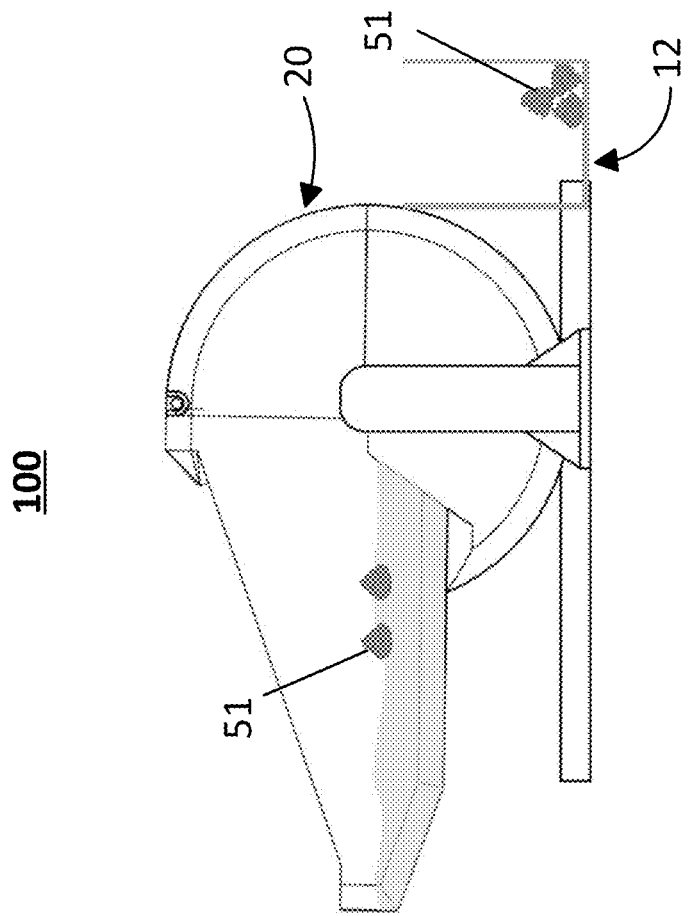

FIGS. 15A-15B illustrate schematic diagrams of an exemplary receptacle 12 of the animal waste handling device 100, according to certain embodiments of the present disclosure. In these embodiments, the receptacle 12 is positioned adjacent to the back of the chamber 20 and detached from the chamber 20. The receptacle 12 can be a box with or without a lid. The receptacle 12 remains at the same place when the chamber 20 rotates between different positions, thus minimizing the possibility of spilling the animal waste 51 and keeps the working environment of the device 100 clean.

Figure 16A:
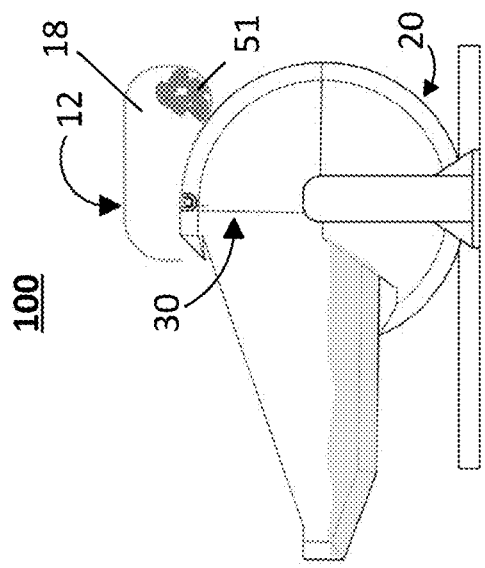
FIGS. 16A-16C illustrate schematic diagrams of another exemplary receptacle of the animal waste handling device, according to certain embodiments of the present disclosure.
Figure 16B:
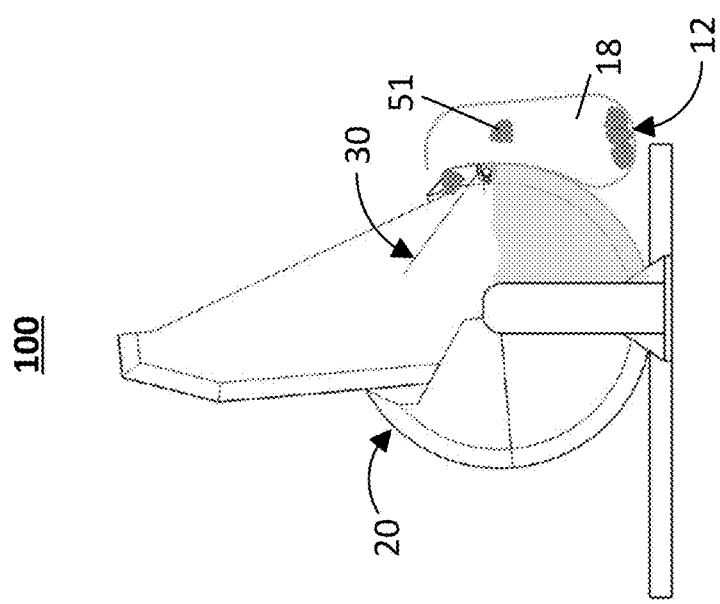
Figure 16C:
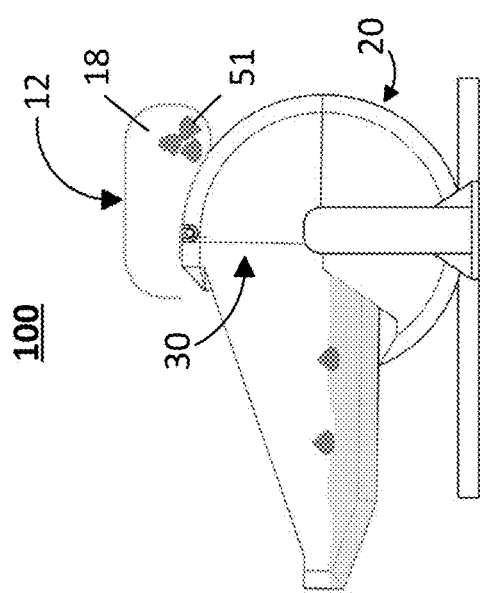

FIGS. 16A-16C illustrate schematic diagrams of another exemplary receptacle 12 of the animal waste handling device 100, according to certain embodiments of the present disclosure. In these embodiments, the receptacle 12 is attached to the chamber 20 and rotates along with the chamber 20. The receptacle 12 may include a box with a flippable or retractable lid, that can be opened and closed as needed. Alternatively, the lid may be dispensed when the animal waste 51 does not fall out when the chamber 20 is at, or rotates back to, the standby position, as shown in FIG. 16C. The receptacle 12 can rotate with the chamber 20, so that when the chamber 20 is at the standby position, the receptacle 12 is elevated above the surface where the device 100 stands, therefore saving the space occupied by the device 100. The receptacle 12 may be a container with a concave 18 within the receptacle 12, sunken toward the side adjacent to the chamber 20. The concave 18 is used to store the animal waste 51 when the receptacle 12 rotates with the chamber 20 to the standby position, so that the animal waste 51 will not fall out of the receptacle 12 from the opening under gravity. Occasionally, the animal using the device 100 may jump out of the chamber 20 after it uses the device, thus pushing the device 100 away from its initial location. When the receptacle 12 is connected to the chamber 20, the receptacle 12 will move with the chamber 20. This ensures that the opening of the receptacle 12 maintains its relative position to the chamber 20, thus minimizing the possibility that the screen filter 30 may dispose the animal waste 51 out of the receptacle 12.

Figure 17B:
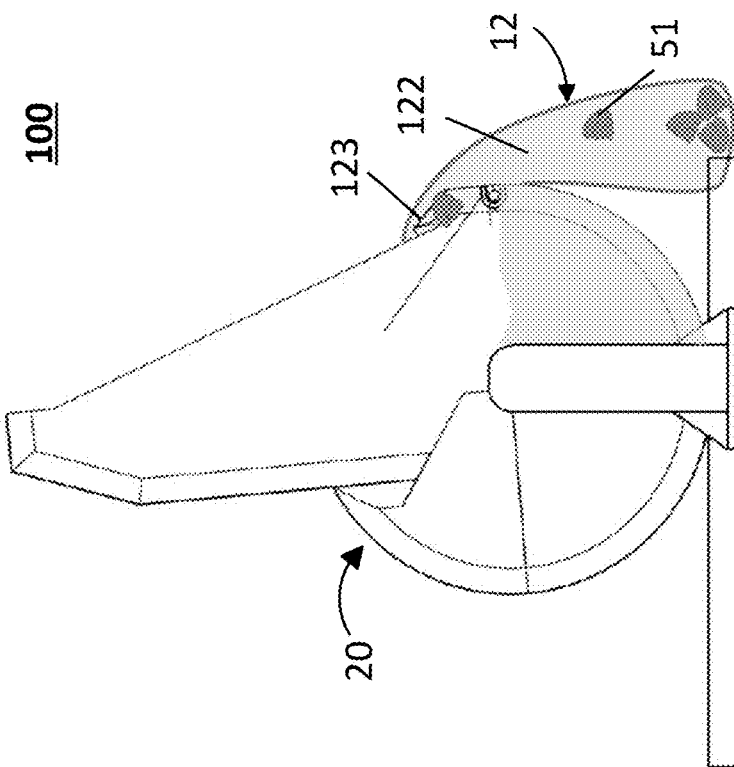
FIGS. 17A-17C illustrate schematic diagrams of yet another exemplary receptacle of the animal waste handling device, according to certain embodiments of the present disclosure.
Figure 17A:
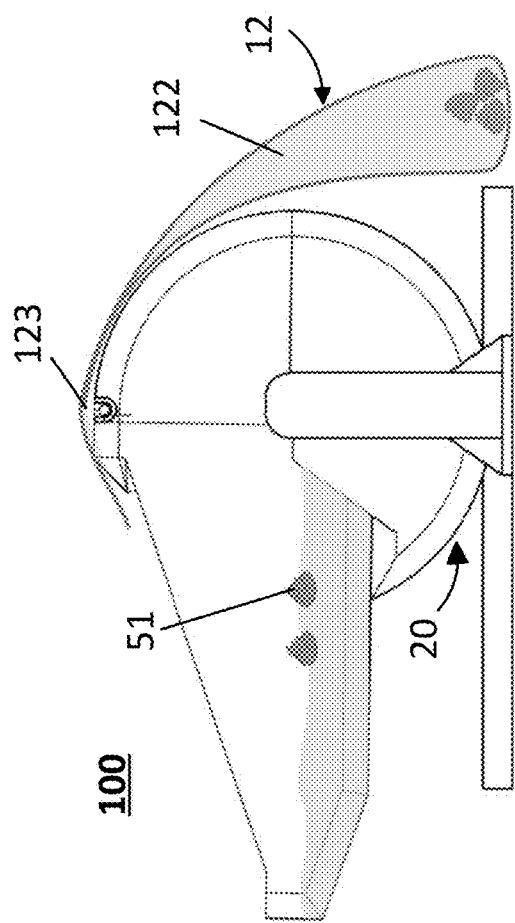
Figure 17C:
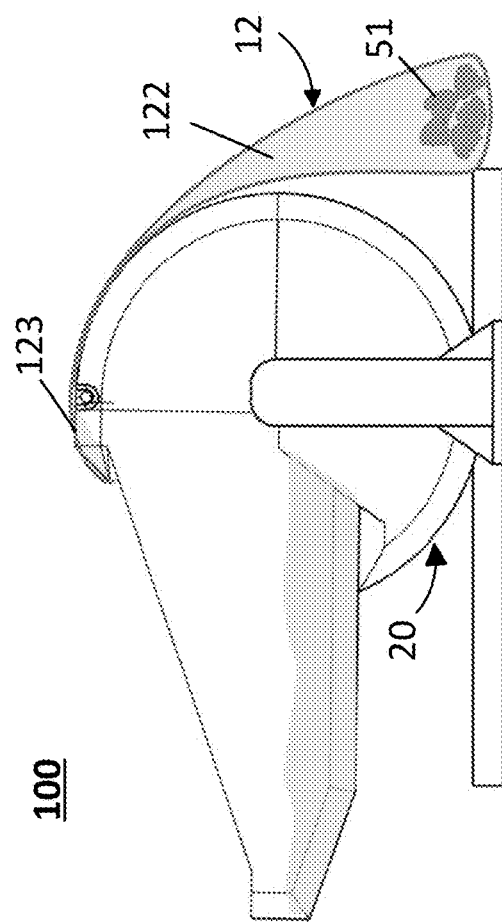

FIGS. 17A-17C illustrate schematic diagrams of yet another exemplary receptacle 12 of the animal waste handling device 100, according to certain embodiments of the present disclosure. In these embodiments, the receptacle 12 may include a bag 122 touching the floor surface where the device 100 stands. In some embodiments, the receptacle 12 may also include an opening 123 adjacent to the chamber 20 and rotates with the chamber 20. The receptacle 12 may be an elastic bag that can stretch when the opening 123 rotates with the chamber 20, with the body of the bag 122 remaining on the surface. The receptacle 12 may also be any other expandable container suitable for the described purpose. The receptacle 12 illustrated herein can ensure the opening 123 of the receptacle 12 to be at the appropriate location to accept the animal waste 51, as shown in FIG. 17B. Meanwhile, the animal waste 51 already in the receptacle 12 can remain unmoved while the chamber 20 rotates, therefore minimizing the possibility of spilling the animal waste 51 out of the receptacle 12. In some embodiments, the opening 123 can be sealed when a sensor in the device 100 or the receptacle 12 senses that the weight or height of the waste 51 inside the receptacle 12 has reached a threshold (e.g., substantially full as described above).

Figure 18:
FIG. 18 illustrates a flow chart of an exemplary method for handling animal waste with an animal waste handling device, according to certain embodiments of the present disclosure.
Figure 18:

FIG. 18 illustrates a flow chart of an exemplary method 1800 for handling animal waste with an animal waste handling device, according to certain embodiments of the present disclosure. It is understood that the steps shown in the method 1800 are not exhaustive and that other steps can be performed as well before, after, or between any of the illustrated steps. Furthermore, some of the steps may be performed simultaneously, or in a different order than that shown in FIG. 18. Examples of the animal waste handling device in FIG. 18 may refer to the animal waste handling devices 100, 600, 600' and 700 described hereinabove, which, according to Step 1800 (a pre-operation step), may include a support bracket (such as the support bracket 10), a chamber attached to the support bracket (such as the chamber 20), and a screen filter attached to the chamber (such as the screen filter 30).

Referring to FIG. 18, at Step 1802, the chamber is rotated between a first position and a second position. The first position may be a standby position, such as that shown in FIG. 1B, 5A, 6A, 6D, 7A, 8B, 15A, 16A, 16C, 17A or 17C.

At this position, the chamber may be partially filled with litter material. The second position may be a disposition position, such as that shown in FIG. 4A, 4B, 5C, 5D, 5E, 5F, 6B, 6C, 6F, 7C, 7D, 11A, 11B, 11C, 15B, 16B or 17B. At this position, the animal waste may be dumped outside the chamber 20. In some embodiments, the rotation of the chamber may be around a first axis (such as the axis passing through the pair of rotation points 13 shown in FIG. 2). In some embodiments, the chamber may rotate between the above two positions (the first and second positions) for an angle between zero and a maximum rotation angle, which is between 75 and 150 degrees.

At Step 1804, the screen filter may be moved between a third position and a fourth position. In some embodiments, the third position may be a position where the screen filter is within the chamber and also in a retracted position, such as the position P3 shown in FIG. 3A, 5A, 5B or 5C. The fourth position may be a position where the screen filter moves close to an opening (such as the opening 14 shown in FIG. 1A, 1B, 2, 5A or 5D) of the chamber and also in an extended position, such as the position P4 shown in FIG. 3A or 5E. In other embodiments, the third position may be a position where the screen filter is within the chamber (e.g., the position P3' shown in FIG. 6A or 6B), and the fourth position may be a position where the screen filter moves close to an opening of the chamber (e.g., the position P4' shown in FIG. 6C). In some embodiments, the movement of the screen filter may include a rotation around a second axis (such as the rotation axis 22 shown in FIG. 1A, 1C, 2, 3A, 3B, 3C, 3D, 5C, 5D, 5E, 6C, 6E, 7D or 9B), an extension/retraction (such as that described in conjunction with FIGS. 3A-3D), or both. In some embodiments, the movement of the screen filter may follow the rotation of the chamber, such as starting during the rotation of the chamber or stating within a predetermined time after the rotation of the chamber stops, so that the animal waste can be transported from inside the chamber to the screen filter, and then dumped outside the chamber, similar to the operations described in conjunction with FIGS. 5A-5E. In some embodiments, the screen filter may rotate between the above two positions (the third and fourth positions) for an angle between zero and a maximum rotation angle, which is between 45 and 90 degrees.

In some embodiments, similar to the operations described in conjunction with FIGS. 8A and 8B, the screen filter may move back to the third position after it remains at the fourth position for a first predetermined time (e.g., 0.5, 1, 2, 3, 5, 10, 20, 30, 60 seconds, any range bounded by the upper end by any of these values, or in any range defined by any two of these values), and the chamber may rotate back from the second position to the first position after it remains at the second position for a second predetermined time (e.g., 1, 2, 3, 5, 10, 20, 30, 60, 120 seconds, any range bounded by the upper end by any of these values, or in any range defined by any two of these values). In some embodiments, the first predetermined time is longer than the second predetermined time. In other embodiments, the first predetermined time is shorter than the second predetermined time.

In some embodiments, similar to the operations described in conjunction with FIGS. 8C and 8D, the chamber may further rotate to a fifth position after it rotates back from the second position to the first position. This operation may more evenly spread out the litter material inside the chamber after each animal waste handling process. The fifth position may be known as a spread position. The rotation direction of the chamber from the first position to the fifth position may be the same as that from the second position to the first position (e.g., clockwise shown in FIGS. 8C-8D). In some embodiments, the chamber may rotate between the above two positions (the first and fifth positions) for an angle between zero and a maximum rotation angle, which is between 5 and 45 degrees.

In some embodiments, similar to the operations described in conjunction with FIGS. 9A-9B and 11A-11C, the screen filter may further move between the third position and a sixth position. This operation may perform at least one of combing the litter material or scratching off or chipping away the animal waste sticking to the bottom of the chamber or a nonstick vessel. The sixth position may or may not match the fourth position. The rotation direction of the screen filter from the third position to the sixth position may be the same as that from the third position to the fourth position (e.g., clockwise as shown in FIGS. 11A-11C).

According to the present disclosure, the rotation of the chamber and the movement of the screen filter may be driven separately. For example, the rotation of the chamber may be driven by a first driver (such as the first driver 11 described in conjunction with FIGS. 1D and 2), while the movement of the screen filter may be driven by a second driver (such as the second driver described in conjunction with FIGS. 3A-3D). In some embodiments, the two drivers may be actuated by different components, such as the gearbox driving the first driver 11 shown in FIG. 2 and the gearwheel driving the second driver shown in FIG. 3A. In other embodiments, the two drivers may be powered by the same motor, or driven by the same component (as described in conjunction with FIGS. 6A-6F above). In some embodiments, both the first driver and the second driver may be driven by electrical power. In other embodiments, at least one of the first driver and the second driver may be driven manually by a user of the device.

According to one aspect of the present disclosure, a device for handling waste deposited by an animal is disclosed. The device includes a support bracket, a chamber attached to the support bracket, and a screen filter configured to locate within the chamber when the animal deposits the waste. The chamber has an opening adapted to accommodate the animal to deposit the waste inside the chamber. The chamber is rotatable between a first position and a second position. The screen filter is movable between a third position and a fourth position.

In some implementations, the rotation of the chamber and the movement of the screen filter are driven separately.

In some implementations, the rotation of the chamber is around a first axis and driven by a first driver.

In some implementations, the first driver includes a gearbox having a driving gear and a driven gear.

In some implementations, the movement of the screen filter is driven by a second driver and includes at least one of a rotation around a second axis and an extension/retraction.

In some implementations, the second driver includes a mechanical arm having a single piece. One end of the single piece is rotatably connected to a gearwheel. The other end of the single piece pushes the screen filter to move.

In some implementations, the second driver includes a mechanical arm having a lower arm and an upper arm. One end of the lower arm is rotatably connected to a gearwheel and the other end of the lower arm is rotatably connected to one end of the upper arm. The other end of the upper arm pushes the screen filter to move.

In some implementations, the gearwheel includes a filter gear and a chamber gear intermeshed with the filter gear. The gearwheel transmits a rotational motion to the mechanical arm to push the screen filter to move.

In some implementations, the extension/retraction of the screen filter is adjustable by at least one of the relative angle between the upper arm and the lower arm and the relative angular velocity between the rotation of the filter gear and that of the screen filter.

In some implementations, the first driver and the second driver are both actuated by a same component.

In some implementations, the movement of the screen filter follows the rotation of the chamber so that the waste is transported from inside the chamber to the screen filter, and then dumped outside the chamber.

In some implementations, the movement of the screen filter starts during the rotation of the chamber.

In some implementations, the movement of the screen filter starts within a predetermined time after the rotation of the chamber stops.

In some implementations, at least a portion of the extension/retraction of the screen filter precedes the rotation of the chamber so that the screen filter reaches closer to a bottom of the chamber.

In some implementations, at least one of the remaining portion of the extension/retraction and the rotation of the screen filter follows the rotation of the chamber.

In some implementations, the chamber accommodates the animal at the first position and transports the waste to the screen filter when rotating towards the second position.

In some implementations, the maximum rotation angle of the chamber between the first and second positions is between 75 and 150 degrees.

In some implementations, the screen filter is within the chamber at the third position and dumps the waste outside the chamber when it rotates towards the fourth position.

In some implementations, the maximum rotation angle of the screen filter between the third and fourth positions is between 45 and 90 degrees.

In some implementations, the screen filter is adapted to move back to the third position after it remains at the fourth position for a first predetermined time.

In some implementations, the chamber is adapted to rotate back to the first position after it remains at the second position for a second predetermined time.

In some implementations, the first predetermined time is longer than the second predetermined time.

In some implementations, the first predetermined time is shorter than the second predetermined time.

In some implementations, the chamber is adapted to further rotate to a fifth position after it rotates back to the first position. A direction of the rotation from the first position to the fifth position is the same as a direction of the rotation from the second position to the first position.

In some implementations, the maximum rotation angle of the chamber between the first and fifth positions is between 5 and 45 degrees.

In some implementations, the chamber includes a nonstick vessel disposed inside the chamber. The chamber is adapted to receive litter material disposed on the nonstick vessel.

In some implementations, the nonstick vessel is adapted to deform when the chamber rotates toward the second position. At least a portion of the litter material is lifted away from the bottom of the chamber by the deformed nonstick vessel.

In some implementations, the inner bottom of the chamber includes a flat surface.

In some implementations, the chamber includes a substantially cuboid shape in a center region.

In some implementations, the screen filter is adapted to move between the third position and a sixth position. A direction of the movement from the third position to the sixth position is the same as a direction of the movement from the third position to the fourth position.

In some implementations, an end of the screen filter away from the second axis combs through the litter material disposed in the chamber when the screen filter rotates between the third position and the sixth position.

In some implementations, an end of the screen filter away from the second axis scratches a surface of the nonstick vessel or a bottom surface of the chamber when the screen filter rotates between the third position and the sixth position.

In some implementations, when the chamber is at the second position, the screen filter chips away sticky waste from the nonstick vessel and dumps it outside the chamber.

In some implementations, the screen filter includes a plurality of filter elements adapted to allow the litter material to pass through the screen filter and to prevent the waste from passing through the screen filter.

In some implementations, at least one of the screen filter or the plurality of filter elements is replaceable.

In some implementations, the device further includes a receptacle adjacent to the support bracket. The receptacle is adapted to collect the waste dumped from the chamber.

In some implementations, the device further includes a receptacle connected to the chamber. The receptacle is adapted to rotate along with the chamber and to collect the waste dumped from the chamber following the rotation of the chamber and the movement of the screen filter.

In some implementations, the receptacle includes an opening adapted to open or close according to at least one of the rotation of the chamber and the movement of the screen filter.

In some implementations, the receptacle is adapted to seal the waste when a first predetermined threshold is reached. The first predetermined threshold includes at least one of a weight of the waste or a height of the waste within the receptacle.

In some implementations, the receptacle is replaceable with a backup receptacle that is different from the receptacle with respect to at least one of volume, size, shape, position of an opening, and connection to the device.

In some implementations, a sensor is provided in the support bracket or in the chamber. The sensor is adapted to sense the type of the receptacle adjacent to the support bracket or connected to the chamber.

In some implementations, at least one of the rotation of the chamber and the movement of the screen filter is driven manually by a user of the device.

In some implementations, the device further includes a sensor adapted to sense entry into or exit from the chamber by the animal. The sensor activates the rotation of the chamber and the movement of the screen filter after it senses an entry and an exit in sequence.

In some implementations, the device further includes a foldable protector. One end of the foldable protector is attached to the chamber and the other end of the foldable protector is attached to a part of the device other than the chamber. The foldable protector is folded when the chamber is in the first position. The foldable protector is extended when the chamber is in the second position.

In some implementations, the shape of the foldable protector includes at least one of a bellow-like shape and a fan-like shape.

In some implementations, the device further includes a power source electrically coupled to the device from outside of or within the device.

In some implementations, the device further includes a plurality of wheels attached to the bottom of the device.

According to one aspect of the present disclosure, a method for handling animal waste with a device is disclosed. The device includes a support bracket, a chamber attached to the support bracket, and a screen filter attached to the chamber. The method includes rotating the chamber between a first position and a second position, and moving the screen filter between a third position and a fourth position.

In some implementations, the rotation of the chamber and the movement of the screen filter are driven separately.

In some implementations, rotating the chamber includes rotating the chamber around a first axis.

In some implementations, moving the screen filter includes at least one of a rotation around a second axis and an extension/retraction.

In some implementations, the chamber is rotated by a first driver having a gearbox.

In some implementations, the screen filter is moved by a second driver having a mechanical arm.

In some implementations, the first driver and the second driver are both actuated by a same component.

In some implementations, the movement of the screen filter follows the rotation of the chamber so that the waste is transported from inside the chamber to the screen filter, and then dumped outside the chamber.

In some implementations, the movement of the screen filter starts during the rotation of the chamber.

In some implementations, the movement of the screen filter starts within a predetermined time after the rotation of the chamber stops.

In some implementations, at least a portion of the extension/retraction of the screen filter precedes the rotation of the chamber so that the screen filter reaches closer to the bottom of the chamber.

In some implementations, at least one of the remaining portion of the extension/retraction and the rotation of the screen filter follows the rotation of the chamber.

In some implementations, the maximum rotation angle of the chamber between the first and second positions is between 75 and 150 degrees.

In some implementations, the maximum rotation angle of the screen filter between the third and fourth positions is between 45 and 90 degrees.

In some implementations, the screen filter is adapted to move back to the third position after it remains at the fourth position for a first predetermined time.

In some implementations, the chamber is adapted to rotate back to the first position after it remains at the second position for a second predetermined time.

In some implementations, the first predetermined time is longer than the second predetermined time.

In some implementations, the first predetermined time is shorter than the second predetermined time.

In some implementations, the chamber is adapted to further rotate to a fifth position after it rotates back to the first position. The direction of rotation from the first position to the fifth position is the same as that from the second position to the first position.

In some implementations, the maximum rotation angle of the chamber between the first and fifth positions is between 5 and 45 degrees.

In some implementations, the screen filter is adapted to move between the third position and a sixth position. The direction of the movement from the third position to the sixth position is the same as that from the third position to the fourth position.

In some implementations, at least one of the rotation of the chamber and the movement of the screen filter is driven manually by a user of the device.

The foregoing description of the specific implementations will so reveal the general nature of the present disclosure that others can, by applying knowledge within the skill of the art, readily modify and/or adapt for various applications of such specific implementations, without undue experimentation, and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Implementations of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary implementations of the present disclosure as contemplated by the inventor(s), and thus, are not intended to limit the present disclosure and the appended claims in any way.

The breadth and scope of the present disclosure should not be limited by any of the above-described exemplary implementations, but should be defined only in accordance with the following claims and their equivalents.

What is claimed is:

1. A device for handling waste deposited by an animal, comprising:
   a support bracket;
   a chamber attached to the support bracket, the chamber having an opening adapted to accommodate the animal to deposit the waste inside the chamber; and
   a screen filter located within the chamber when the animal deposits the waste,
   wherein the chamber is configured to rotate between a first position and a second position,
   wherein the screen filter is configured to move between a third position and a fourth position,
   wherein the rotation of the chamber and the movement of the screen filter are driven separately, and
   wherein, in response to the screen filter moving between the third position and the fourth position, the waste passes through the opening from inside the chamber to outside the chamber.

2. The device of claim 1, wherein the rotation of the chamber is around a first axis and driven by a first driver, and wherein the movement of the screen filter is driven by a second driver and comprises at least one of a rotation around a second axis and an extension/retraction.

3. The device of claim 2, wherein the second driver comprises a mechanical arm having a single piece,
   wherein one end of the single piece is rotatably connected to a gearwheel, and
   wherein another end of the single piece pushes the screen filter to move.

4. The device of claim 2, wherein the second driver comprises a mechanical arm having a lower arm and an upper arm,
   wherein one end of the lower arm is rotatably connected to a gearwheel and the other end of the lower arm is rotatably connected to one end of the upper arm, and
   wherein another end of the upper arm pushes the screen filter to move.

5. The device of claim 2, wherein the first driver and the second driver are adapted to be both actuated by a same component.

6. The device of claim 2, wherein at least a portion of the extension/retraction of the screen filter precedes the rotation of the chamber so that the screen filter reaches closer to a bottom of the chamber.

7. The device of claim 6, wherein at least one of a remaining portion of the extension/retraction and the rotation of the screen filter follows the rotation of the chamber.

8. The device of claim 1, wherein the movement of the screen filter is adapted to follow the rotation of the chamber, and
   wherein the waste is transported from inside the chamber to the screen filter, and then dumped outside the chamber.

9. The device of claim 1, wherein the screen filter is within the chamber at the third position and is adapted to dump the waste outside the chamber when the screen filter moves towards the fourth position.

10. The device of claim 1, wherein the chamber comprises a nonstick vessel disposed inside the chamber, and
    wherein the chamber is adapted to receive litter material disposed on the nonstick vessel.

11. The device of claim 10, wherein the nonstick vessel is adapted to deform when the chamber rotates toward the second position, and
    wherein at least a portion of the litter material is lifted away from a bottom of the chamber by the deformed nonstick vessel.

12. The device of claim 1, wherein an inner bottom of the chamber comprises a flat surface.

13. The device of claim 1, wherein the chamber comprises a substantially cuboid shape in a center region.

14. The device of claim 1, further comprising a receptacle adjacent to the support bracket,
    wherein the receptacle is adapted to collect the waste dumped from the chamber.

15. The device of claim 14, wherein a sensor is provided in the support bracket or in the chamber, and
    wherein the sensor is adapted to sense a type of the receptacle adjacent to the support bracket or connected to the chamber.

16. A method for handling animal waste with a device having a chamber with an opening and a screen filter attached to the chamber, comprising:
    rotating the chamber between a first position and a second position, and
    moving the screen filter between a third position and a fourth position,
    wherein the rotation of the chamber and the movement of the screen filter are driven separately,
    wherein the opening is adapted to accommodate an animal to deposit waste inside the chamber, and
    wherein, in response to the screen filter being moved between the third position and the fourth position, the waste passes through the opening from inside the chamber to outside the chamber.

17. The method of claim 16, wherein rotating the chamber comprises rotating the chamber around a first axis, and
    wherein moving the screen filter comprises at least one of a rotation around a second axis and an extension/retraction.

18. The method of claim 17, wherein at least a portion of the extension/retraction of the screen filter precedes the rotation of the chamber so that the screen filter reaches closer to a bottom of the chamber.

19. The method of claim 16, wherein the movement of the screen filter follows the rotation of the chamber so that the waste is transported from inside the chamber to the screen filter, and then dumped outside the chamber.

20. The method of claim 16, wherein the screen filter is adapted to move back to the third position after it remains at the fourth position for a first predetermined time,
    wherein the chamber is adapted to rotate back to the first position after it remains at the second position for a second predetermined time, and
    wherein the first predetermined time is shorter than the second predetermined time.

* * * * *